US007617096B2

(12) United States Patent
Thyssen

(10) Patent No.: US 7,617,096 B2
(45) Date of Patent: Nov. 10, 2009

(54) ROBUST QUANTIZATION AND INVERSE QUANTIZATION USING ILLEGAL SPACE

(75) Inventor: Jes Thyssen, Laguna Niguel, CA (US)

(73) Assignee: Broadcom Corporation, Irvine, CA (US)

( * ) Notice: Subject to any disclaimer, the term of this patent is extended or adjusted under 35 U.S.C. 154(b) by 589 days.

(21) Appl. No.: 10/163,378

(22) Filed: Jun. 7, 2002

(65) Prior Publication Data

US 2003/0083865 A1 May 1, 2003

Related U.S. Application Data

(60) Provisional application No. 60/312,543, filed on Aug. 16, 2001.

(51) Int. Cl.
*G10L 19/06* (2006.01)
*G01L 19/04* (2006.01)

(52) U.S. Cl. ...................................... 704/219; 704/222

(58) Field of Classification Search ................ 704/222, 704/230, 205
See application file for complete search history.

(56) References Cited

U.S. PATENT DOCUMENTS

| | | | | |
|---|---|---|---|---|
| 4,393,272 | A | 7/1983 | Itakura et al. | 179/1 SA |
| 5,195,137 | A | 3/1993 | Swaminathan | |
| 5,396,576 | A | 3/1995 | Miki et al. | |
| 5,651,026 | A | 7/1997 | Lin et al. | |
| 5,651,091 | A | 7/1997 | Chen | |
| 5,717,823 | A | 2/1998 | Kleijn | |
| 5,717,824 | A | 2/1998 | Chhatwal | |
| 5,774,839 | A | 6/1998 | Shlomot | |
| 5,787,391 | A | 7/1998 | Moriya et al. | |
| 6,148,283 | A * | 11/2000 | Das | 704/222 |
| 6,161,086 | A | 12/2000 | Mukherjee et al. | |
| 6,173,257 | B1 * | 1/2001 | Gao | 704/220 |
| 6,188,980 | B1 | 2/2001 | Thyssen | 704/230 |
| 6,269,333 | B1 | 7/2001 | Ravishankar | |
| 6,397,176 | B1 | 5/2002 | Su | |
| 6,952,671 | B1 | 10/2005 | Kolesnik et al. | |
| 6,980,951 | B2 * | 12/2005 | Chen | 704/222 |
| 2002/0077812 | A1 | 6/2002 | Suzuki et al. | |
| 2003/0078773 | A1 | 4/2003 | Thyssen | |
| 2003/0078774 | A1 | 4/2003 | Thyssen | |

FOREIGN PATENT DOCUMENTS

| | | | |
|---|---|---|---|
| EP | 0 573 216 | | 12/1993 |
| EP | 831457 | A2 * | 3/1998 |

OTHER PUBLICATIONS

Itakura, F., "Line Spectrum representation of linear predictor coefficients of speech signals", *The Journal of the Acoustical Society of America*, American Institute of Physics for the Acoustical Society of America, Spring 1975, vol. 57, Supplement No. 1, p. S35.

(Continued)

*Primary Examiner*—Talivaldis Ivars Smits
(74) *Attorney, Agent, or Firm*—Sterne, Kessler, Goldstein & Fox P.L.L.C.

(57) ABSTRACT

A quantizer for quantization of a vector comprises a codevector generator that generates a set of candidate codevectors and a memory for storing an illegal space definition representing illegal vectors. The quantizer also includes a legal status tester that determines legal candidate codevectors among the set of candidate codevectors using the illegal space definition, and a codevector selector that determines a best legal candidate codevector among the one or more legal candidate codevectors. The vector includes parameters relating to a speech and/or audio signal, such as Line Spectral Frequencies (LSFs).

93 Claims, 31 Drawing Sheets

OTHER PUBLICATIONS

Kabal, P. And Ramachandran, R.P., "The Computation of Line Spectral Frequencies Using Chebyshev Polynomials", *IEEE Transactions on Acoustics, Speech, and Signal Processing*, IEEE, Dec. 1986, vol. ASSP-34, No. 6, pp. 1419-1426.

Rabner, L.R. and Schafer, R.W., "Digital Procesing of Speech Signals", Prentice Hall, 1978, pp. 401-403 and 411-413.

European Search Report dated Jul. 15, 2004 in European Appl. No. 02255723.5, (4 pages).

Wai-Yip Chan, "The Design Of Generalized Product-Code Vector Quantizers", IEEE, Digital Signal Processing 2, Estimation, VLSI, San Francisco, Mar. 23, 1992, vol. 5, Conf. 17, pp. 389-392.

Bishnu S. Atal and M. R. Schroeder. Predictive coding of speech signals and subjective error criteria. IEEE Transactions on Acoustics, Speech and Signal Processing, pp. 247- 254, Jun. 1979.

European Search Report dated Jul. 6, 2004 in European Appl. No. 02255719.3, (4 pages).

European Search Report dated Jul. 9, 2004 in European Appl. No. 02255722.7, (3 pages).

Smith, A.M., et al., "Normalization And Polygon Error Detection For Split VQ Of Line Spectral Frequencies", *2000 IEEE Workshop On Speech Coding Proceedings*, Sep. 17, 2000, pp. 123-125.

Shoham, Y., "Coding The Line Spectral Frequencies By Jointly Optimized MA Prediction And Vector Quantization", *Speech Coding Proceeding*, 1999, *IEEE Workshop on Porvoo*, Jun. 20-23, 1999, pp. 46-48.

Kim, Sung-Joo, et al., "Split Vector Quantization Of LSF Parameters With Minimum Of dLSF Constraint", *IEEE Signal Processing Letters*, vol. 6, No. 9, Sep. 1999, pp. 227-229.

Ohmuro, Hitoshi, et al., "Coding of LSP Parameters Using Interframe Moving Average Prediction And Multi-Stage Vector Quantization", *IEICE Trans. Fundamentals*, vol. #76-A, No. 7, pp. 1181-1183.

Cox, Richard V., et al., "Robust CELP Coders For Noisy Backgrounds And Noisy Channels", *1982 International Conference on Acoustics, Speech and Signal Processing Proceedings*, May 23, 1989, pp. 739-742.

* cited by examiner

FIG. 1: Codec (Encoder/Decoder System)
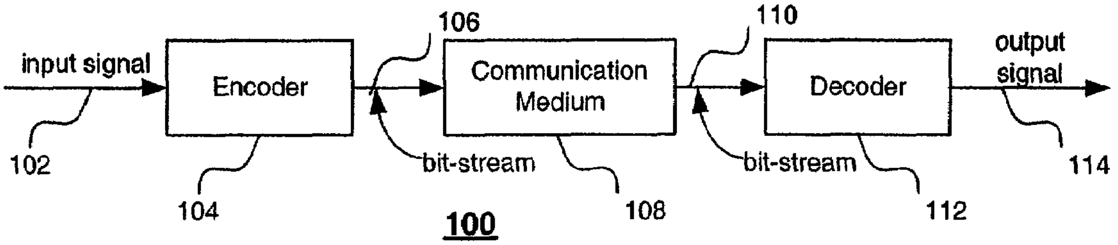
FIG. 2: Encoder
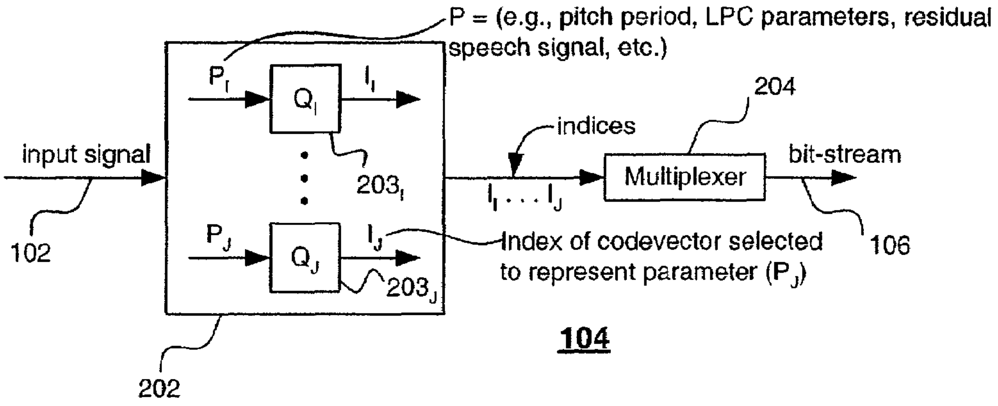
FIG. 3: Decoder
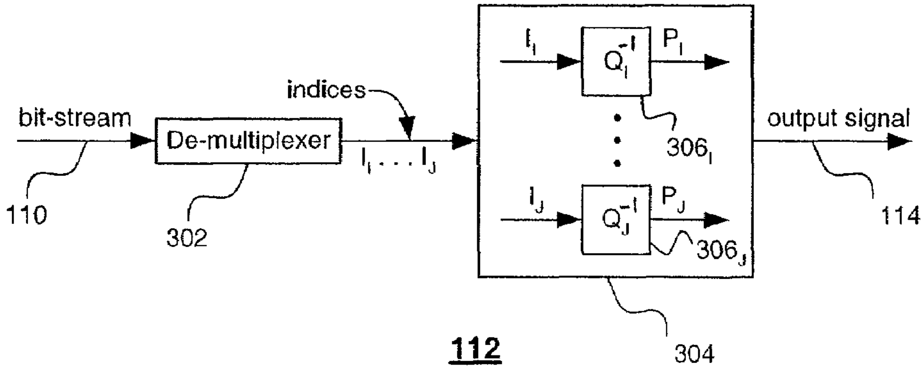

FIG. 4A: Quantizer (Encoder)
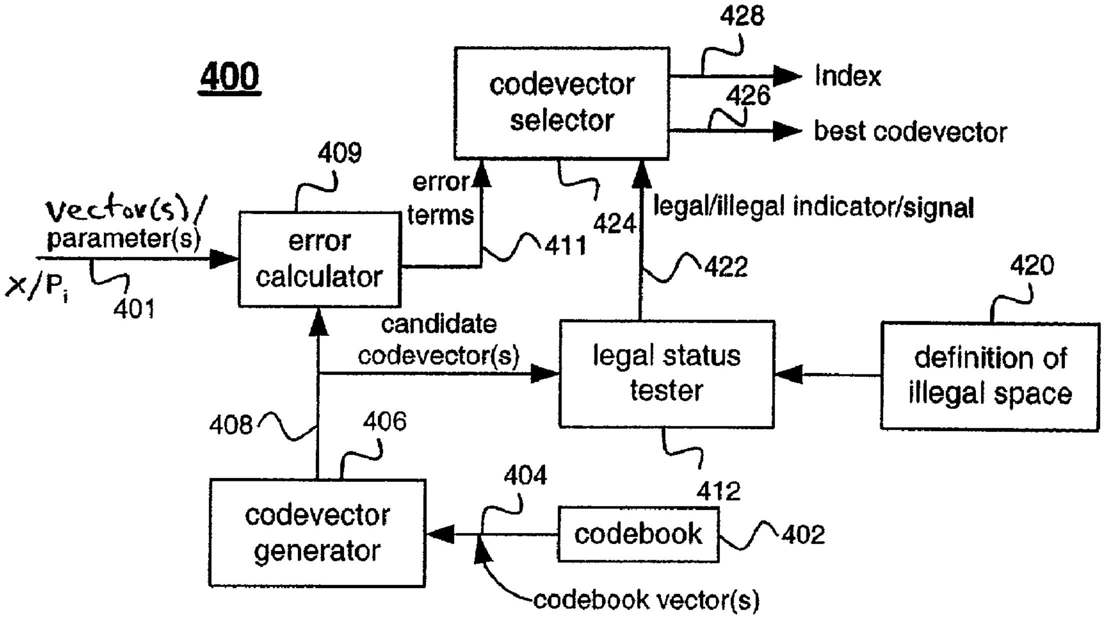
FIG. 4B: Quantizer (Encoder)
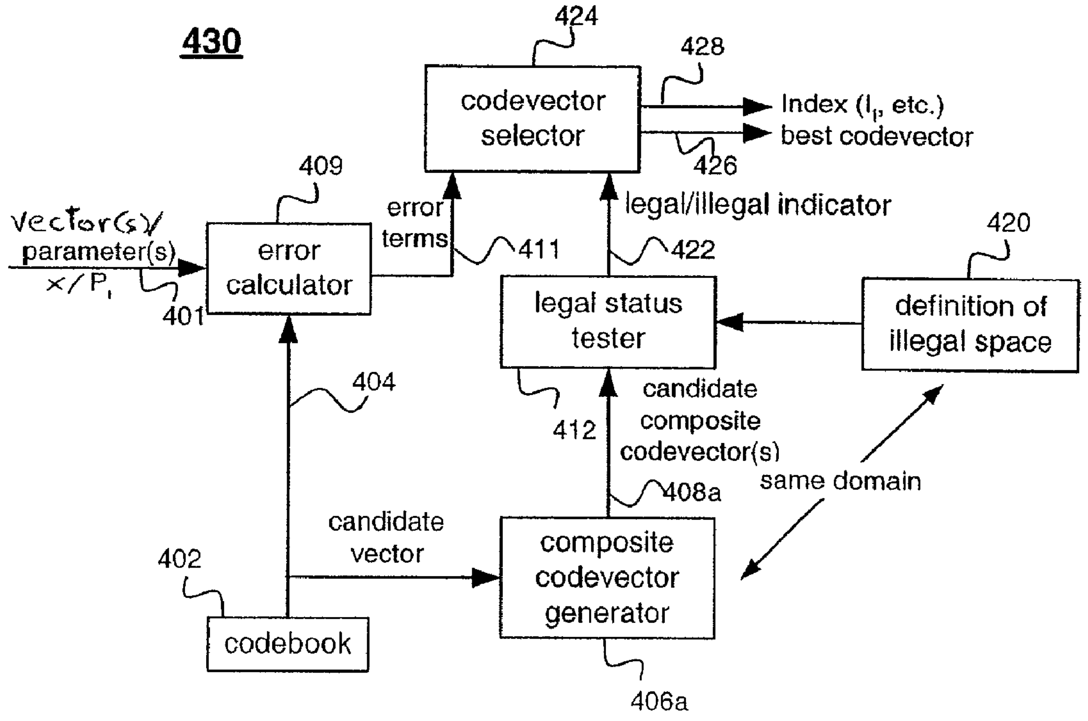

FIG. 5A: Detection of Transmission Errors (Decoder)
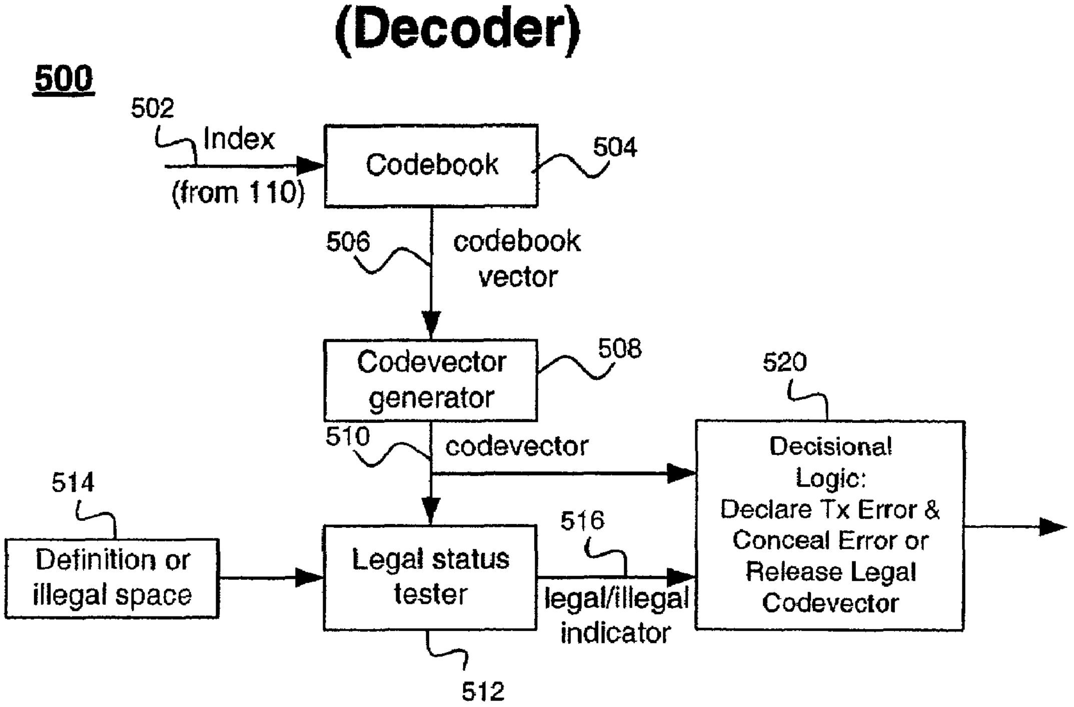
FIG. 5B: Detection of Transmission Errors (Decoder)
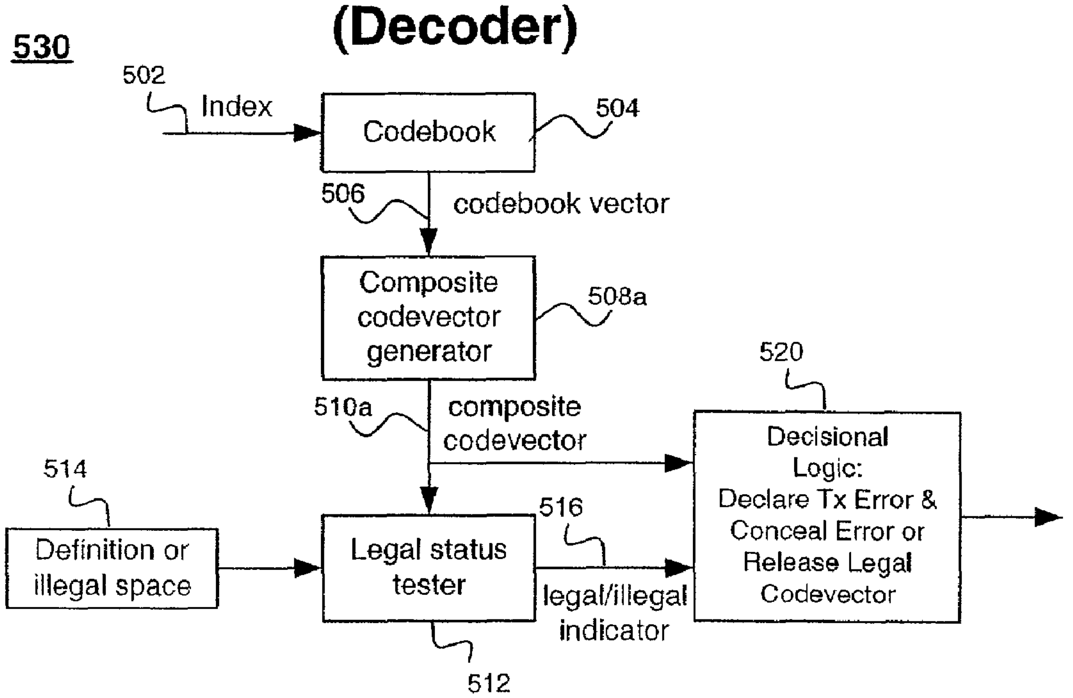

FIG. 6A: Quantizer with Illegal Space (encoder).
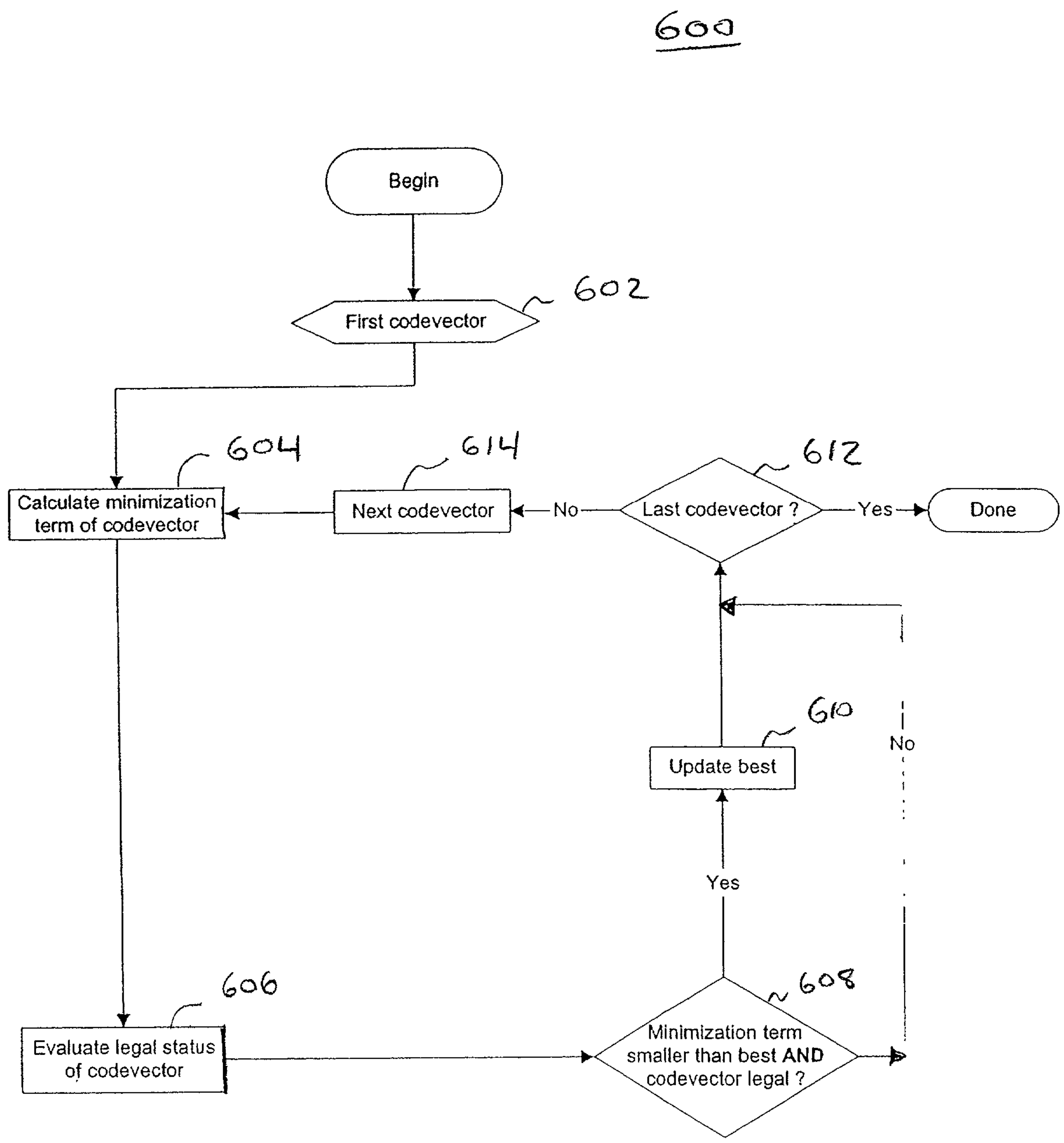

FIG. 6B: Quantizer with Illegal Space (encoder).
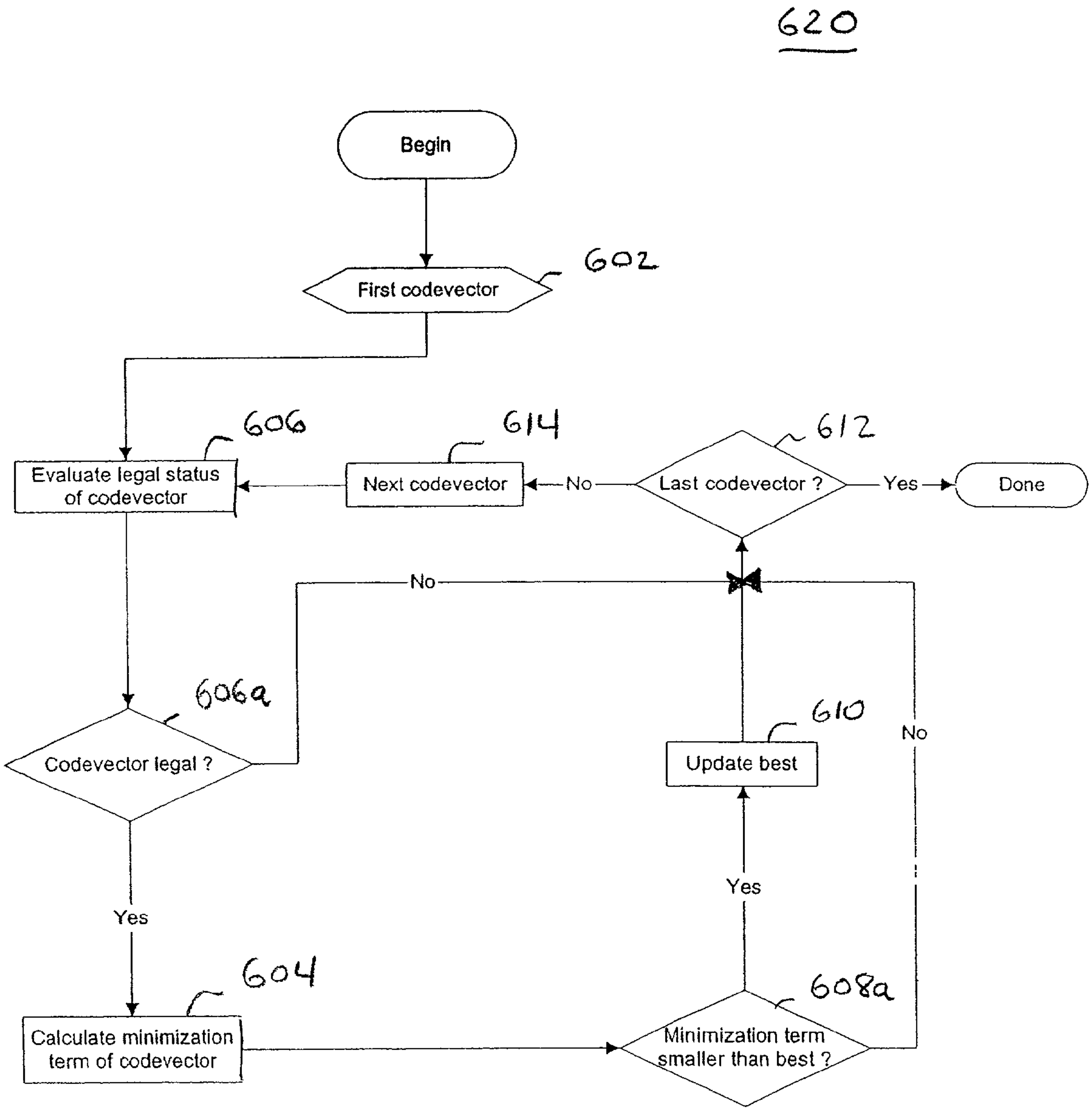

FIG. 6C: Quantizer with Illegal Space (encoder).
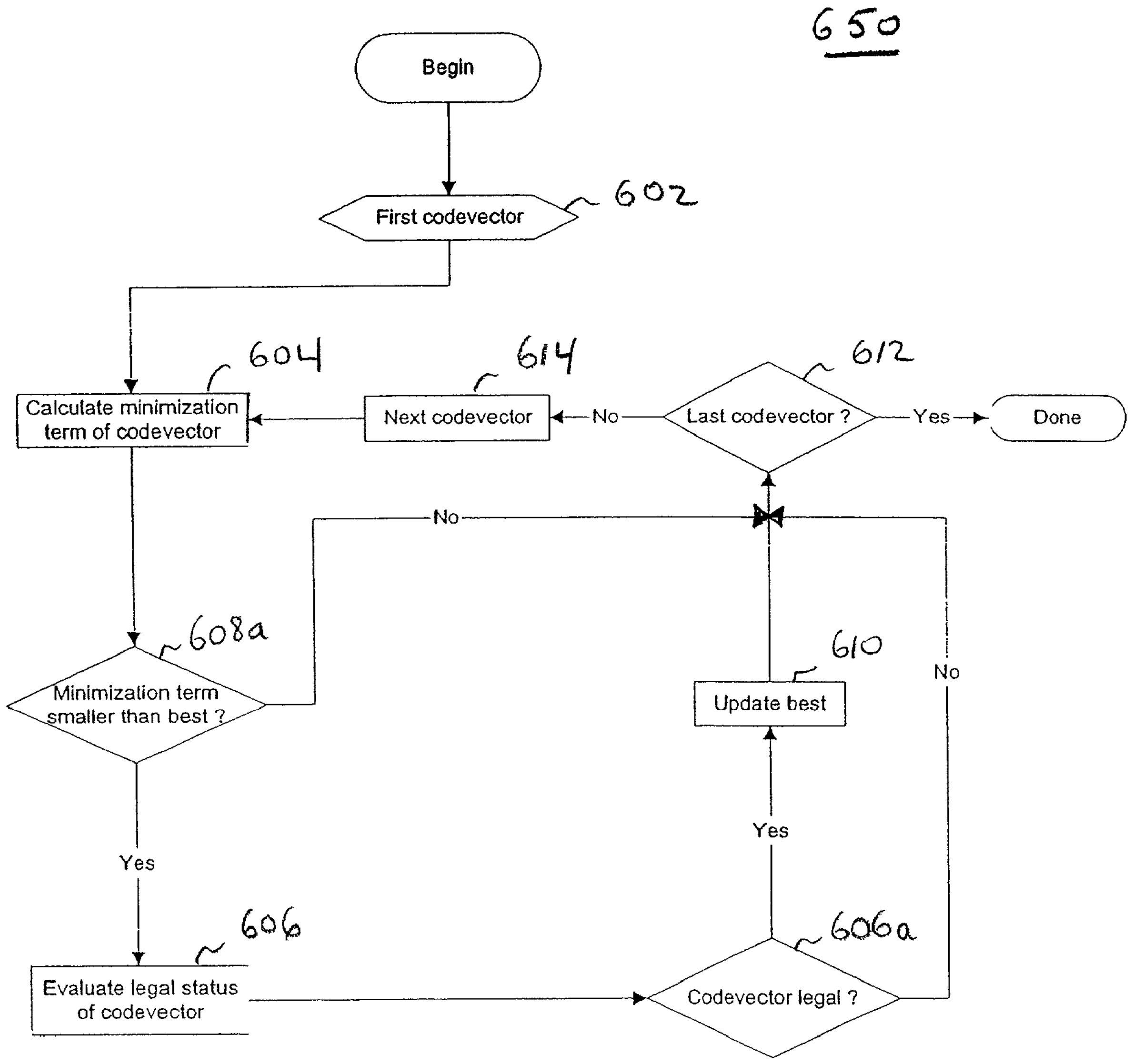

FIG. 6D: Quantizer with Illegal Space with Protection Against Absence of Legal Codevector (encoder).
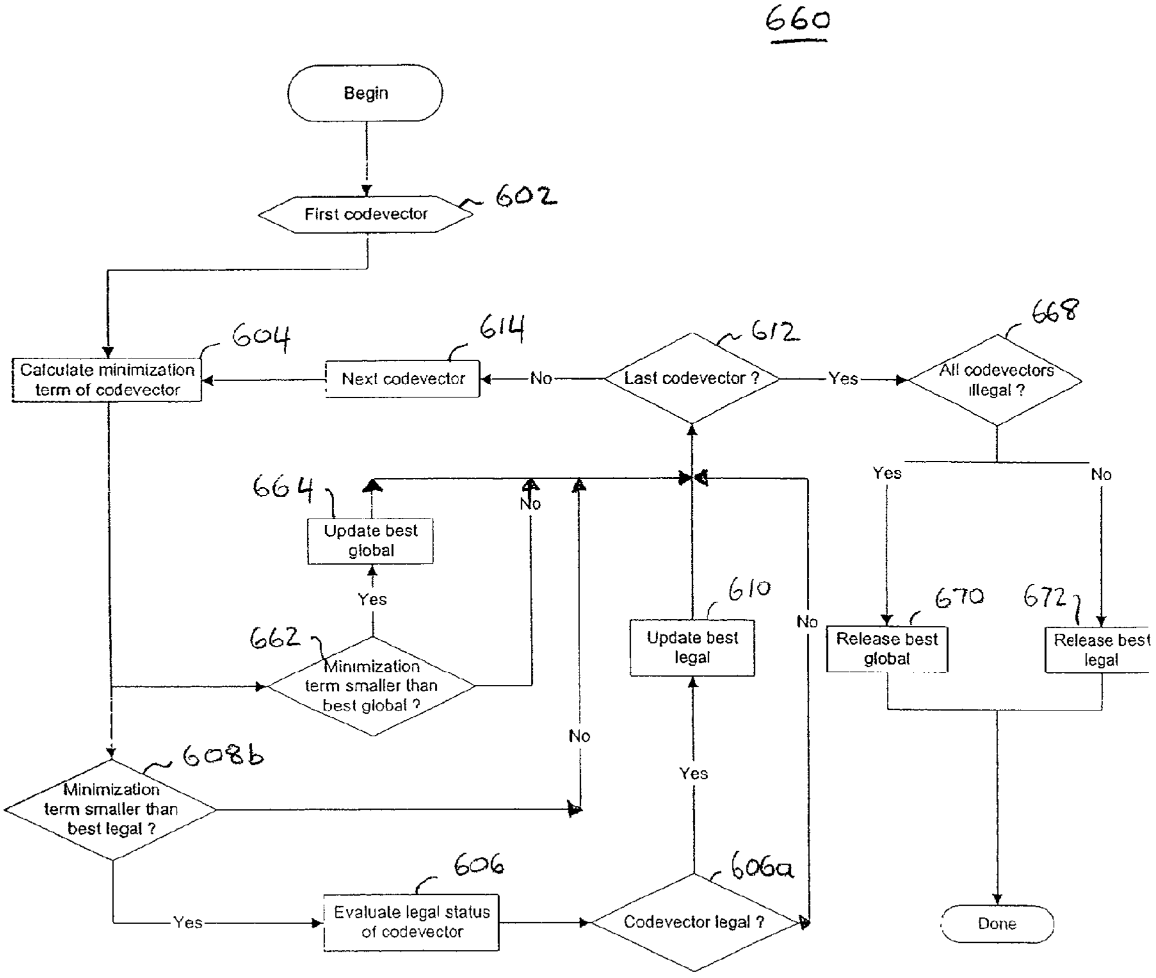

FIG. 6E: Quantizer with Illegal Space with Protection Against Absence of Legal Codevector (encoder).
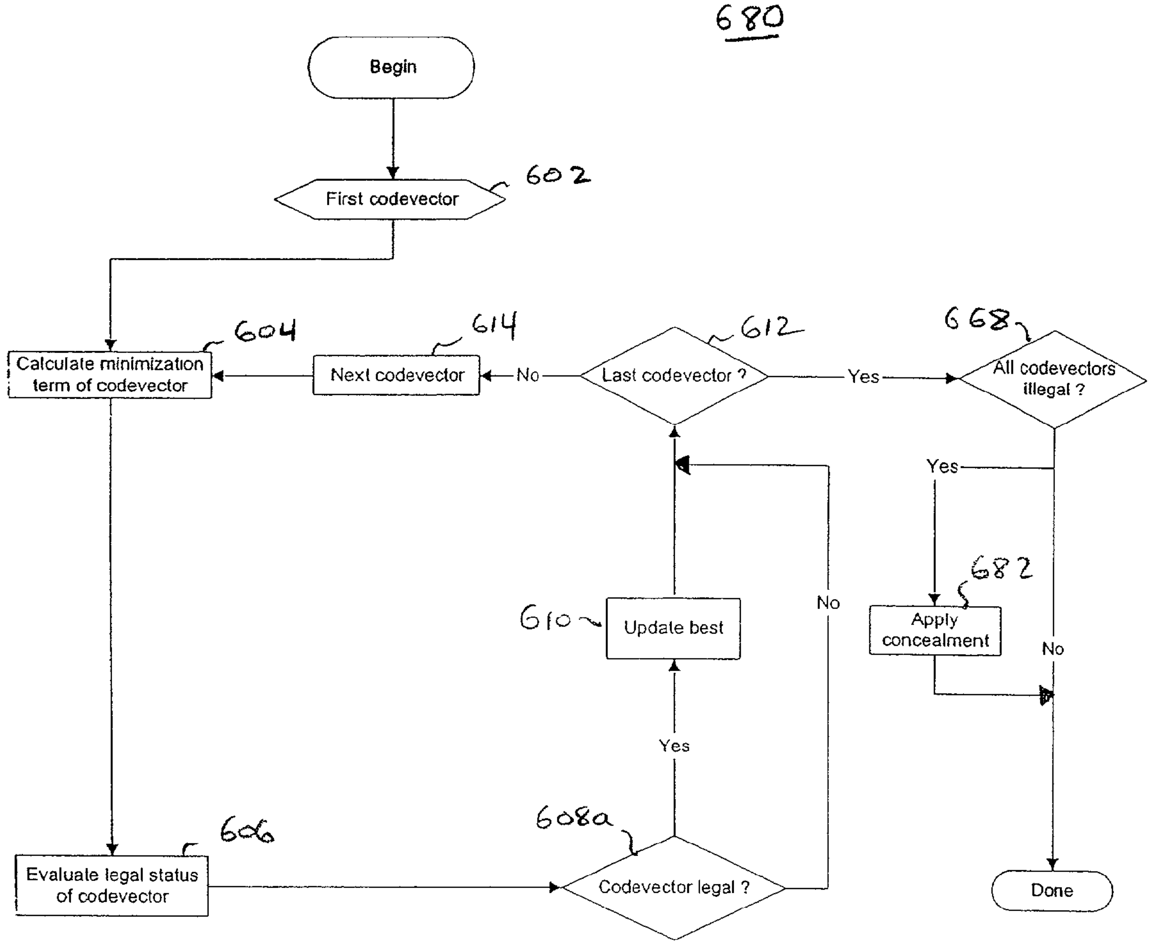

FIG. 7: Detection of Transmission Error From Illegal Space (decoder).
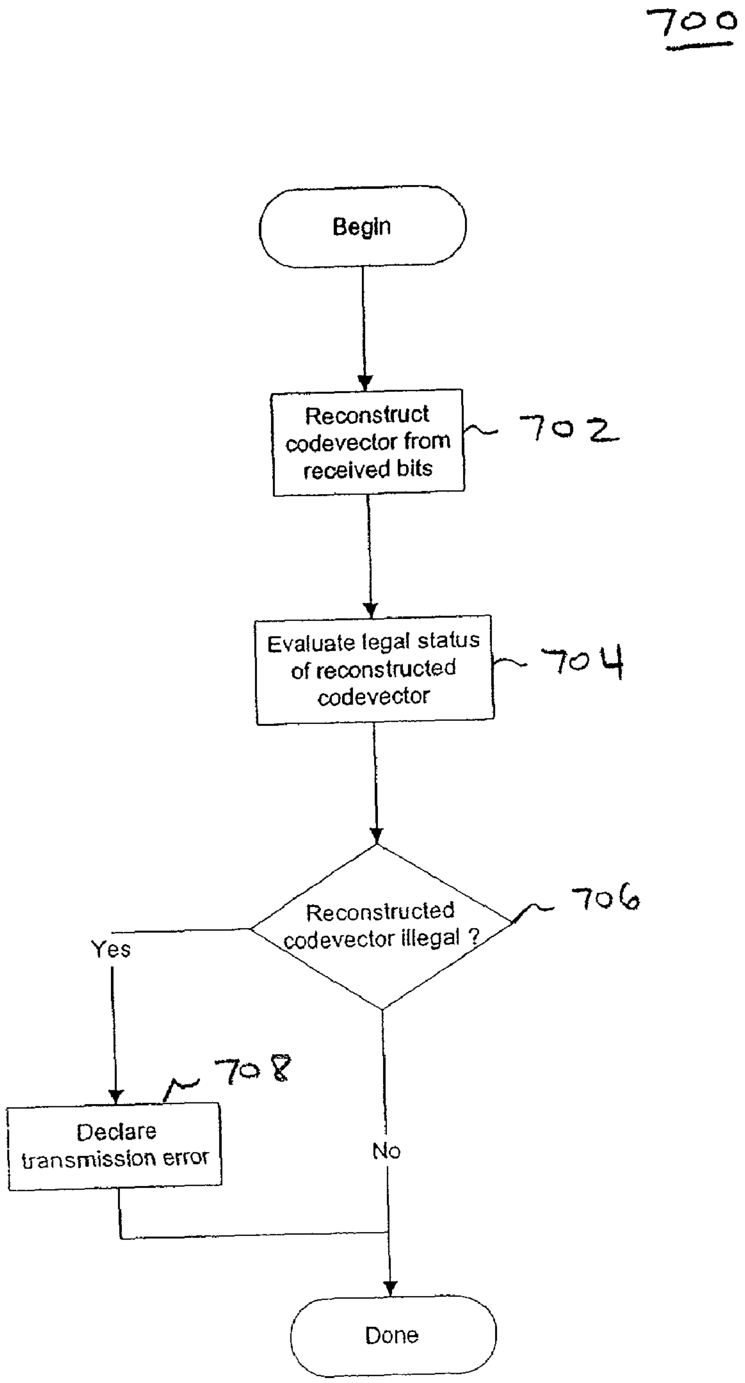

FIG. 8: Inverse Quantizer with Detection of Transmission Error From Illegal Space and Concealment (decoder).
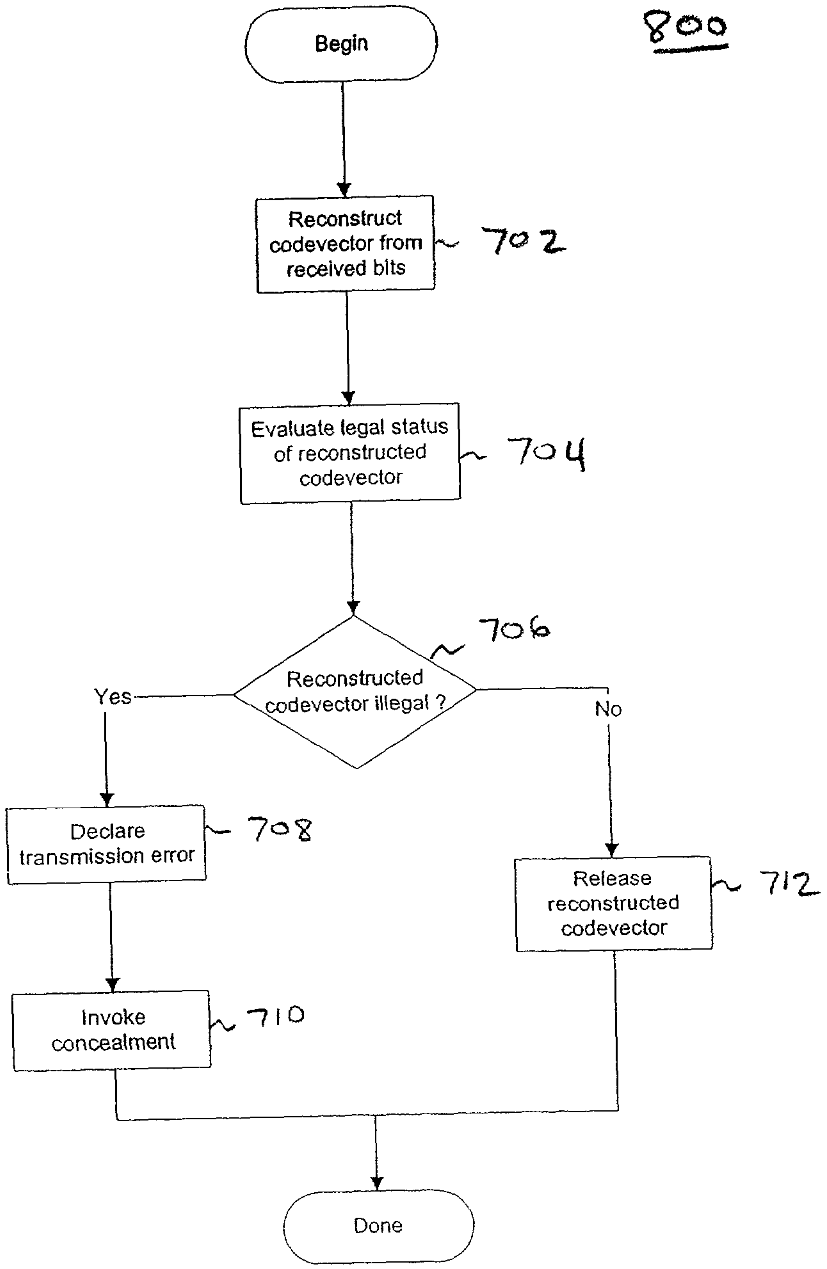

FIG. 9: Composite Quantizer with Application of Illegal Spaces to Selected Sub-Quantizers.
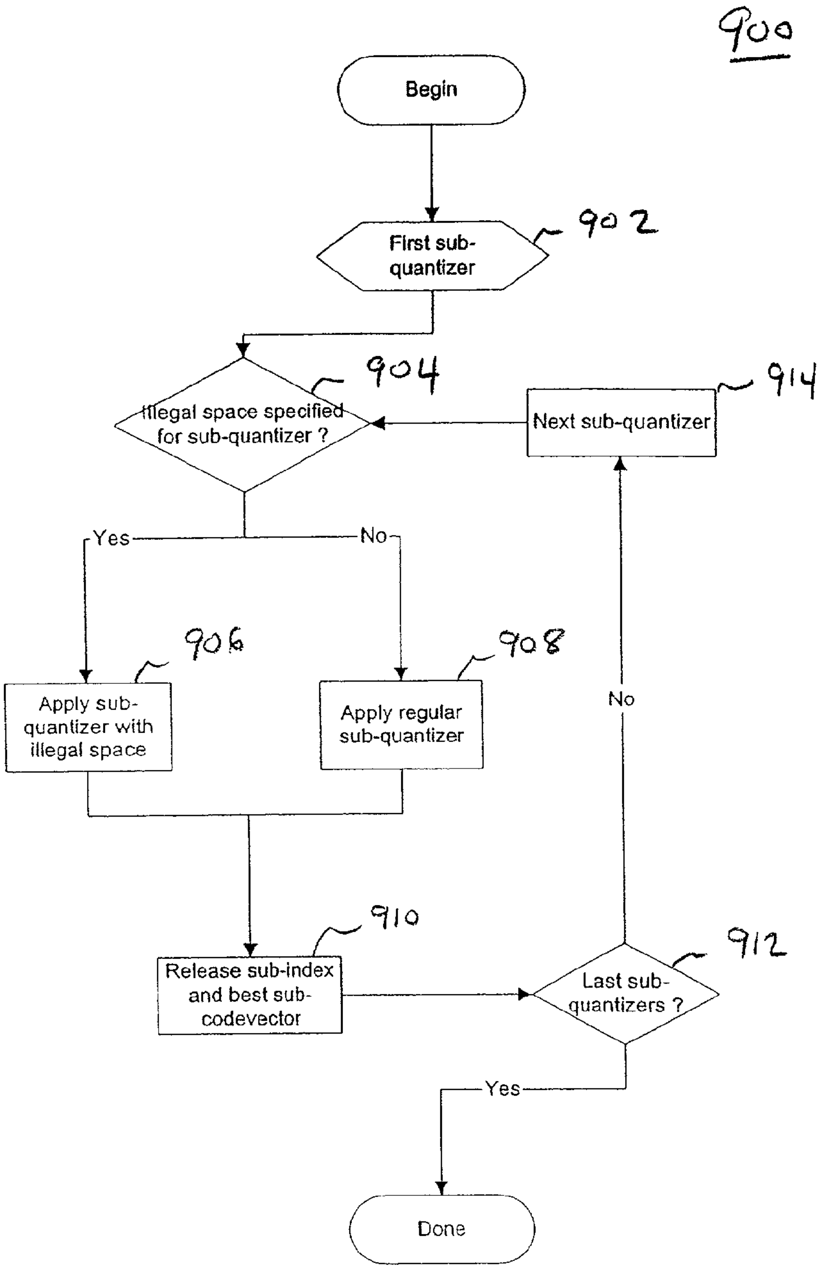

FIG. 10: Sub-Quantizer with Illegal Space.
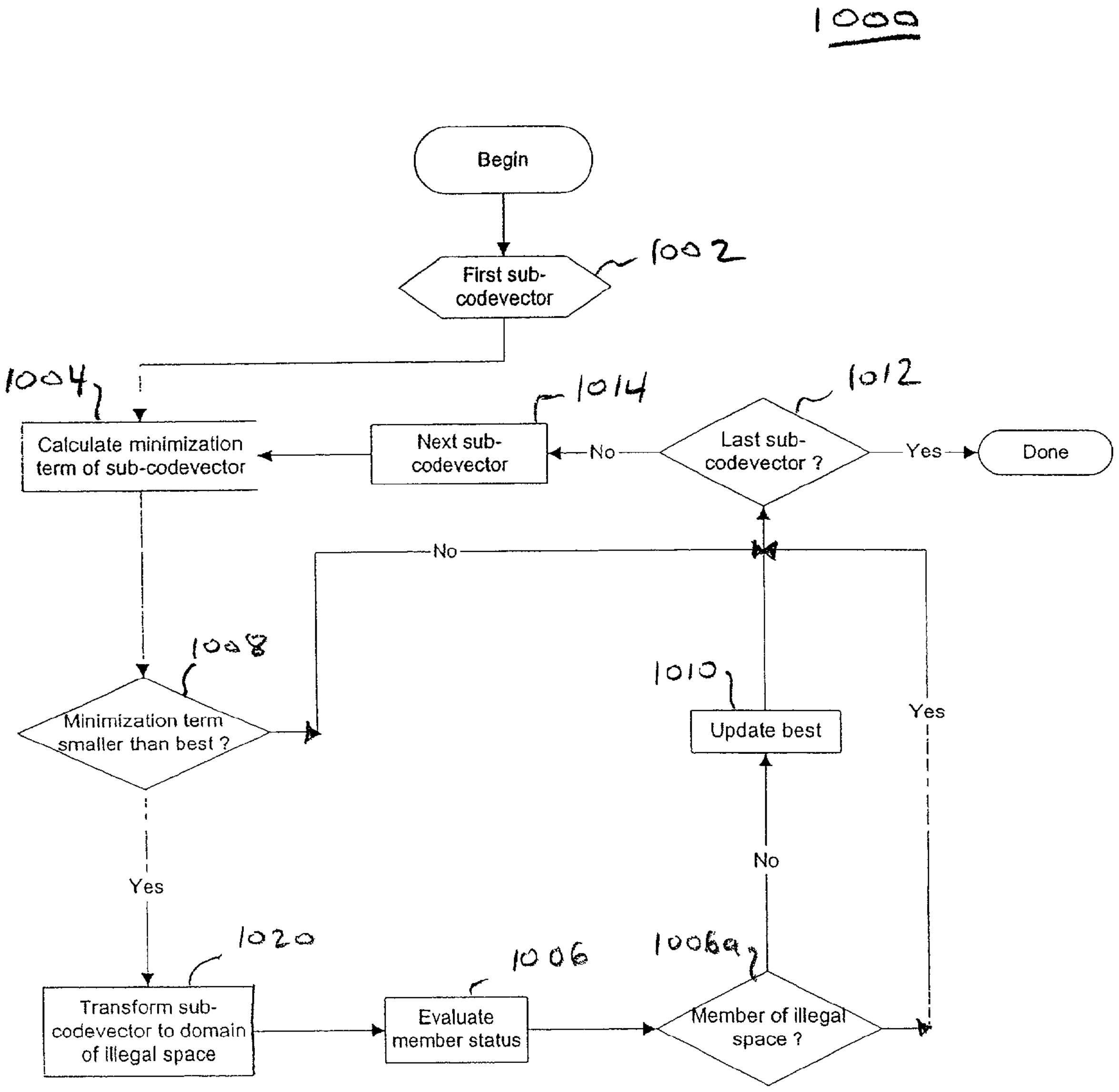

FIG. 11: Inverse Quantizer with Application of Illegal Spaces to Sub-Quantizers.
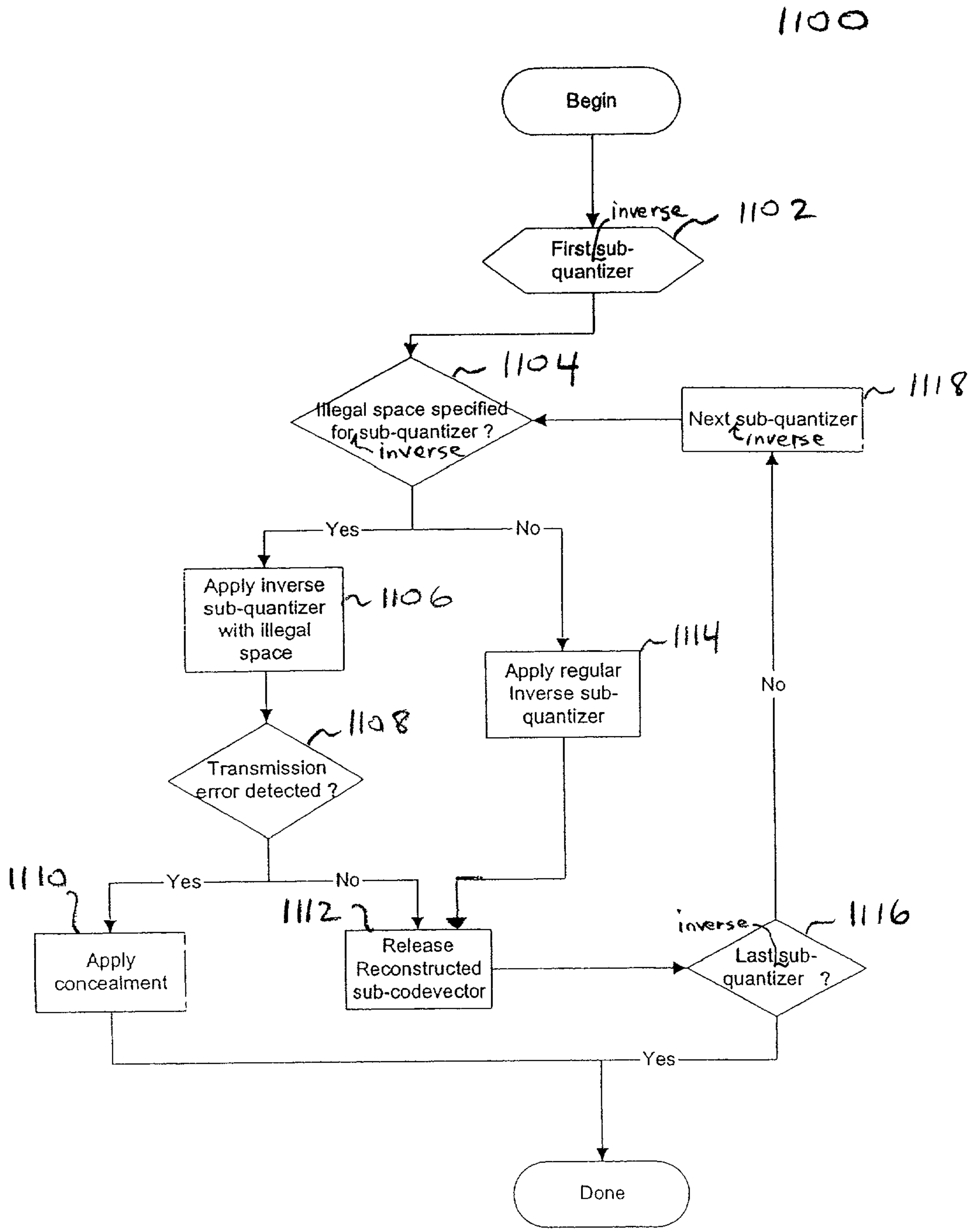

FIG. 12: Inverse Sub-Quantizer with Illegal Space.
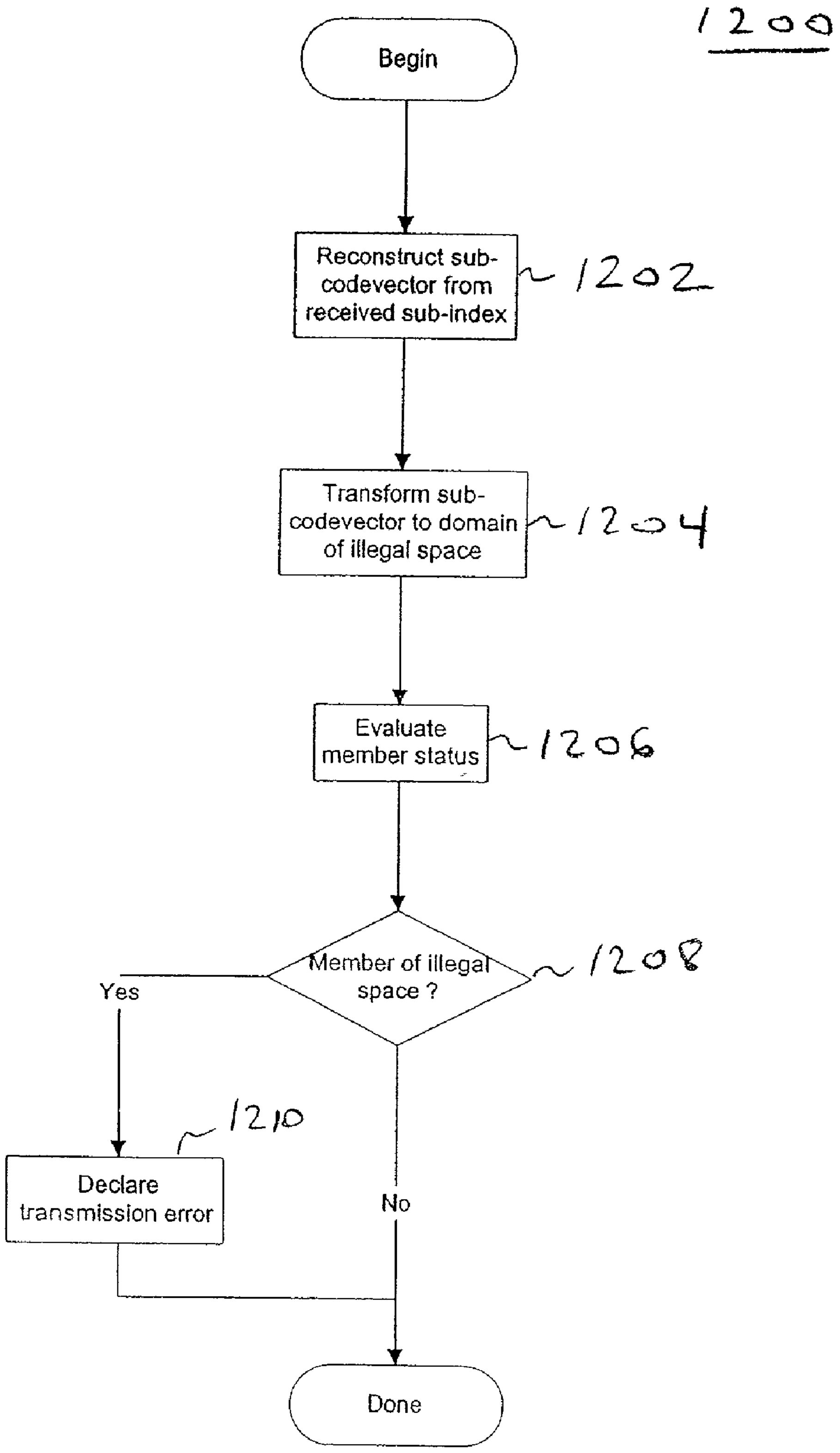

FIG. 13: LSF Sub-Quantizer with Illegal Space.
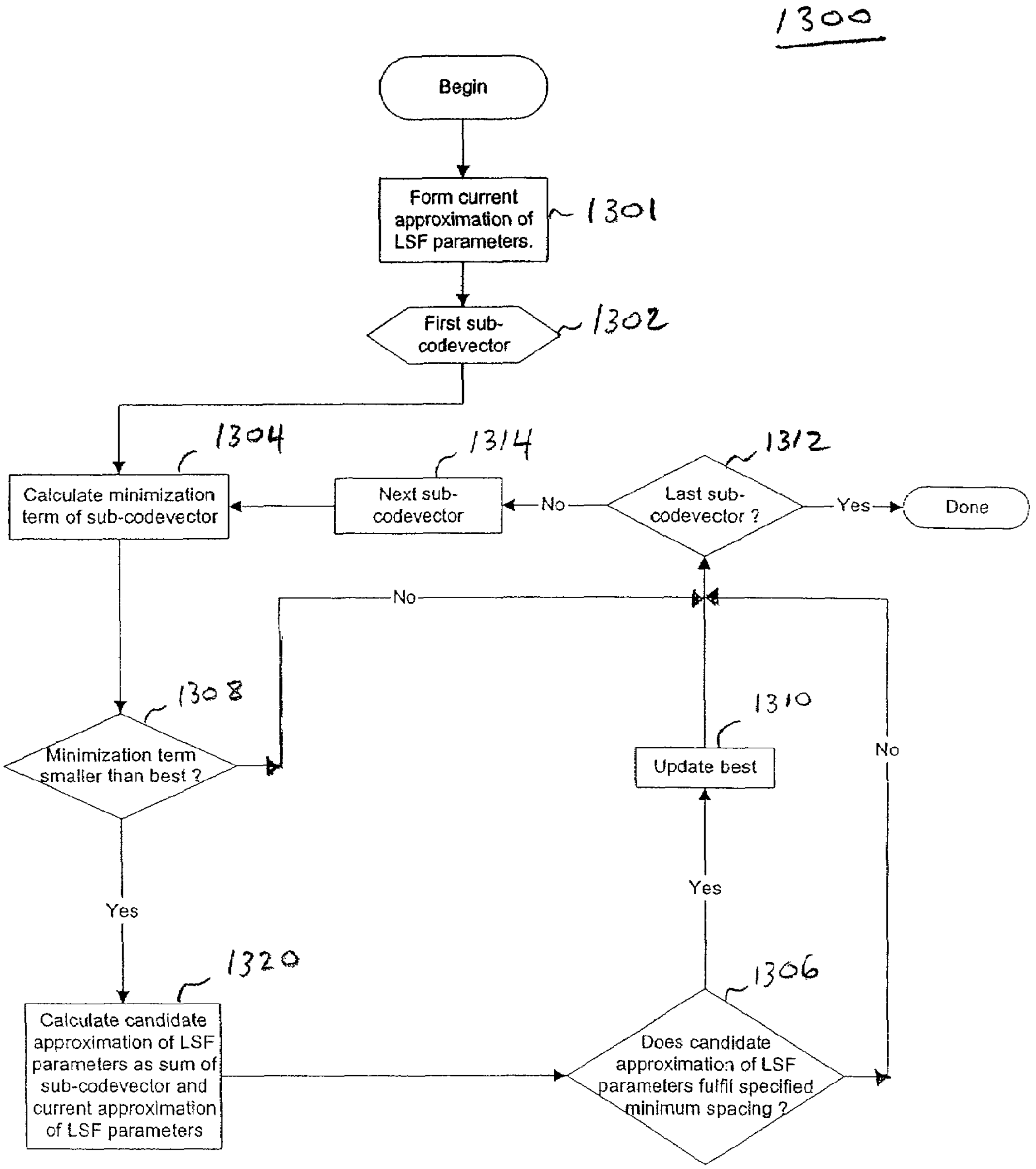

FIG. 14: Inverse LSF Sub-Quantizer with Illegal Space.
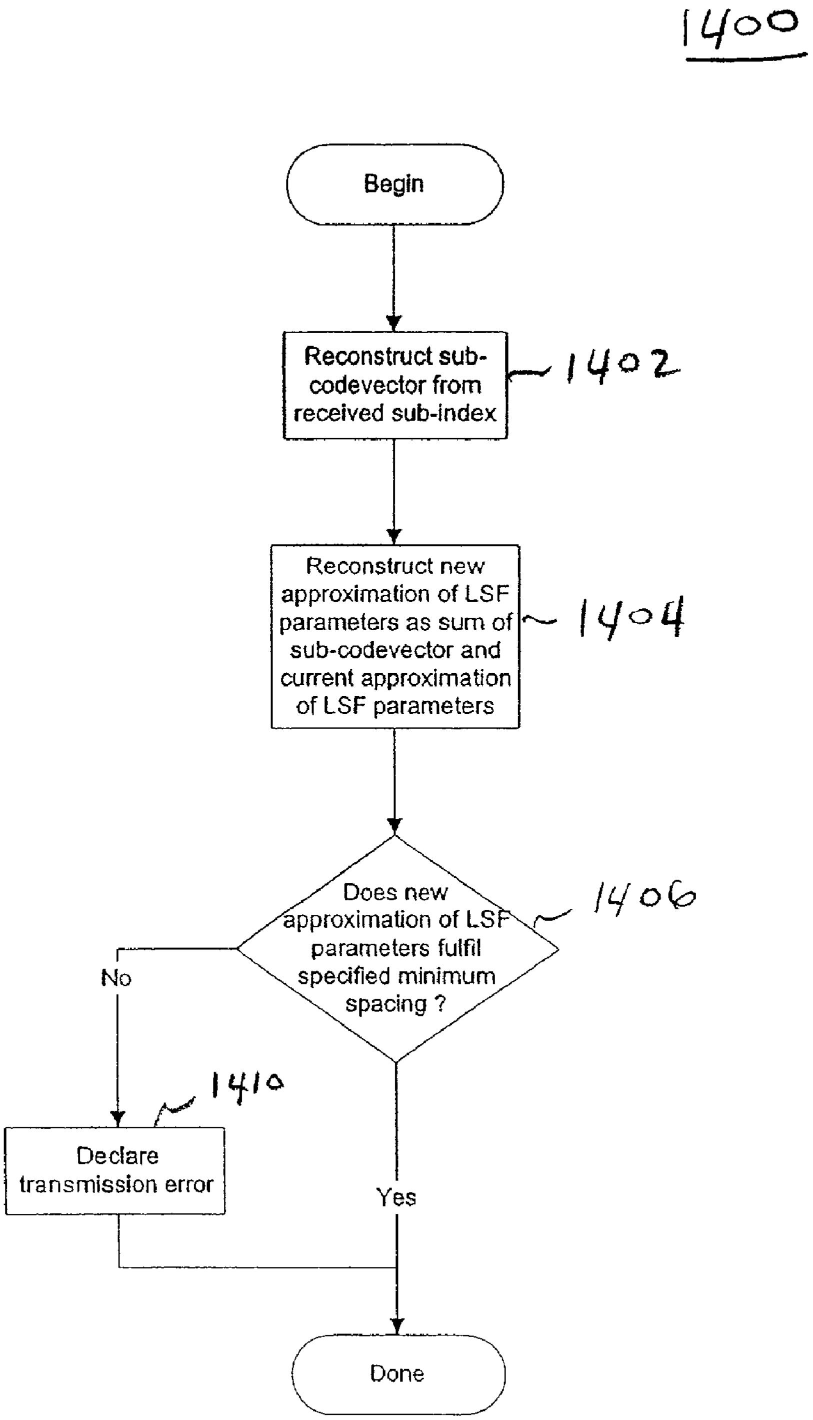

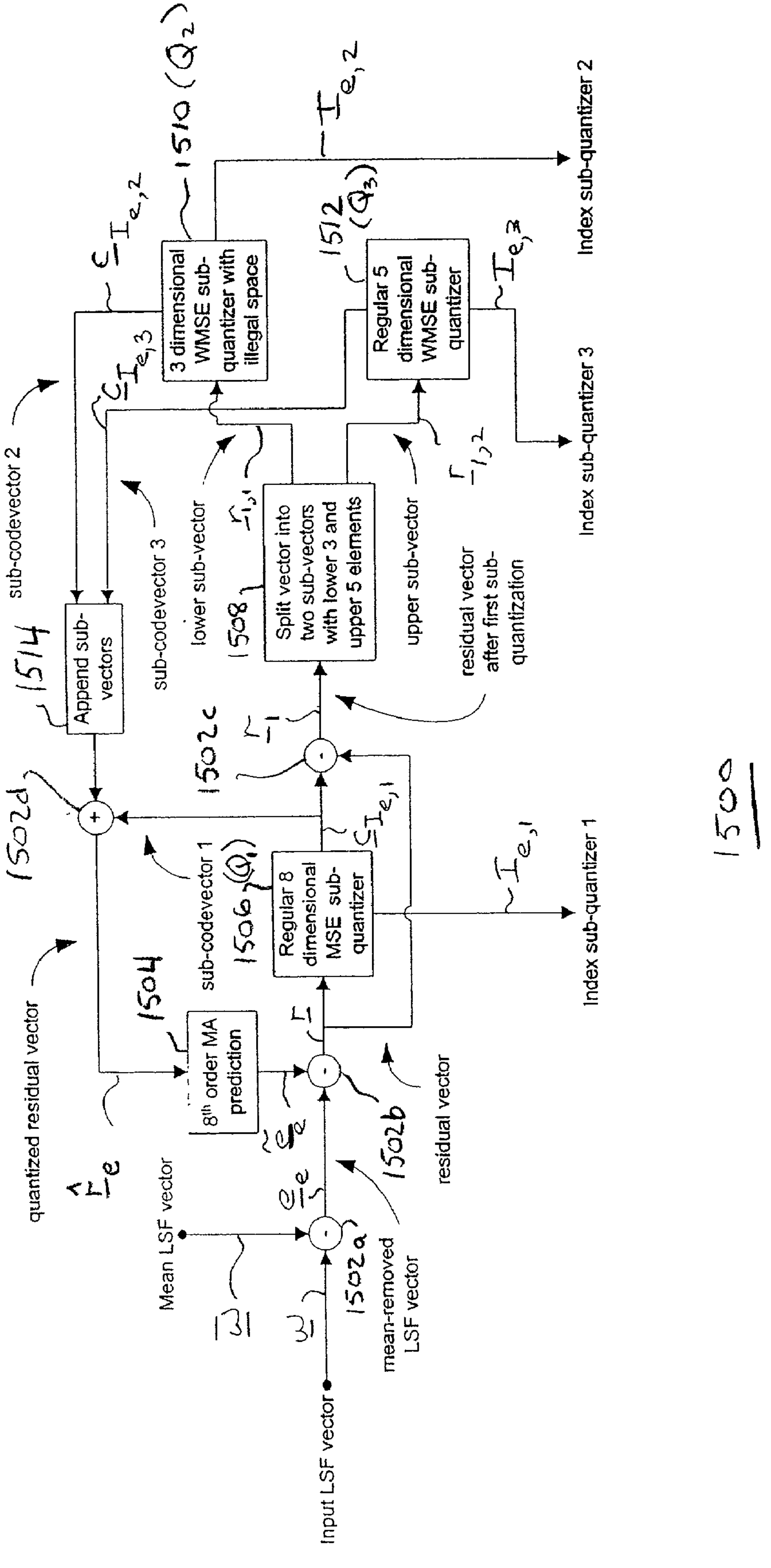
FIG. 15: LSF Quantizer (encoder).

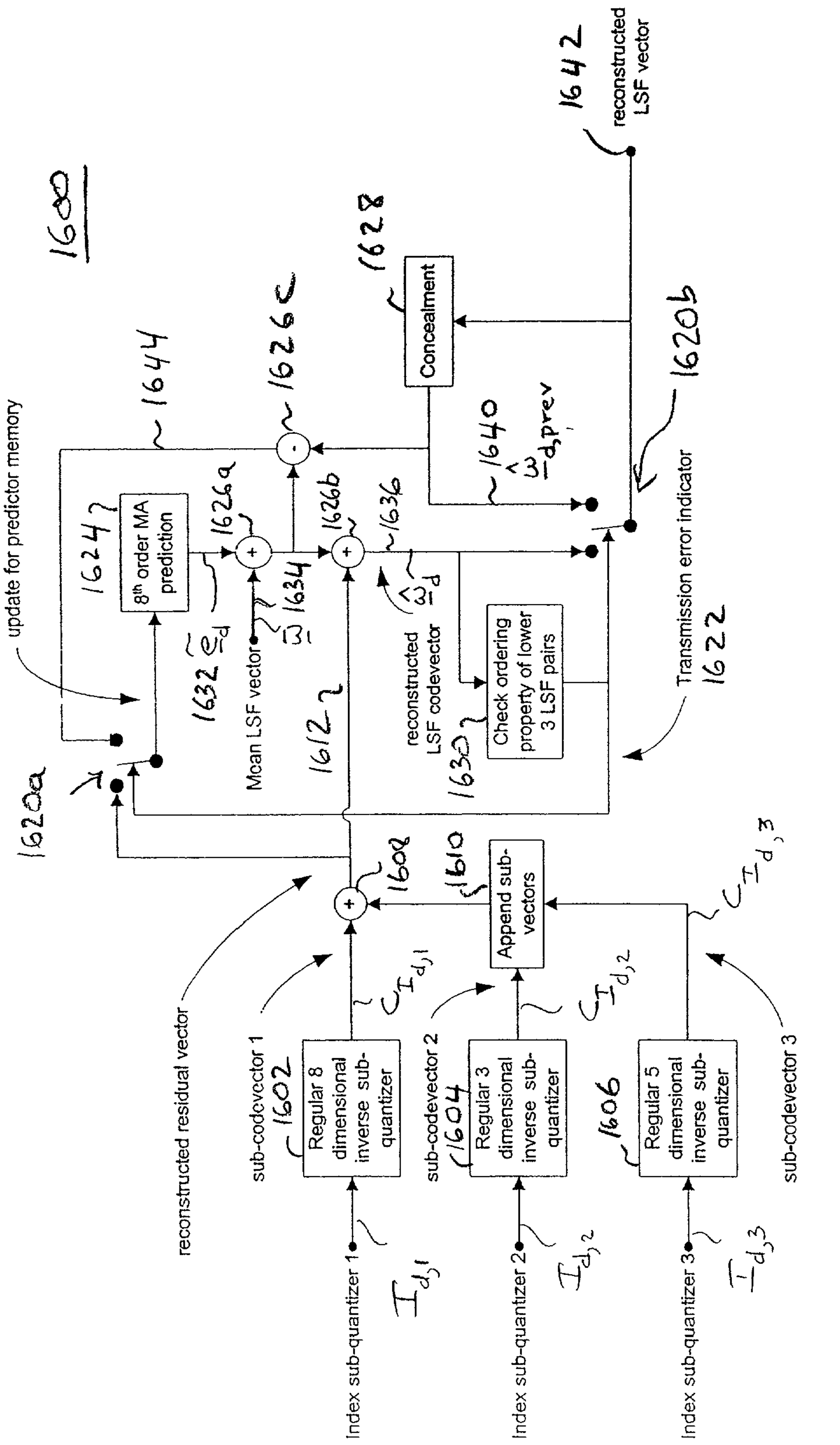
FIG. 16: Inverse LSF Quantizer (decoder).

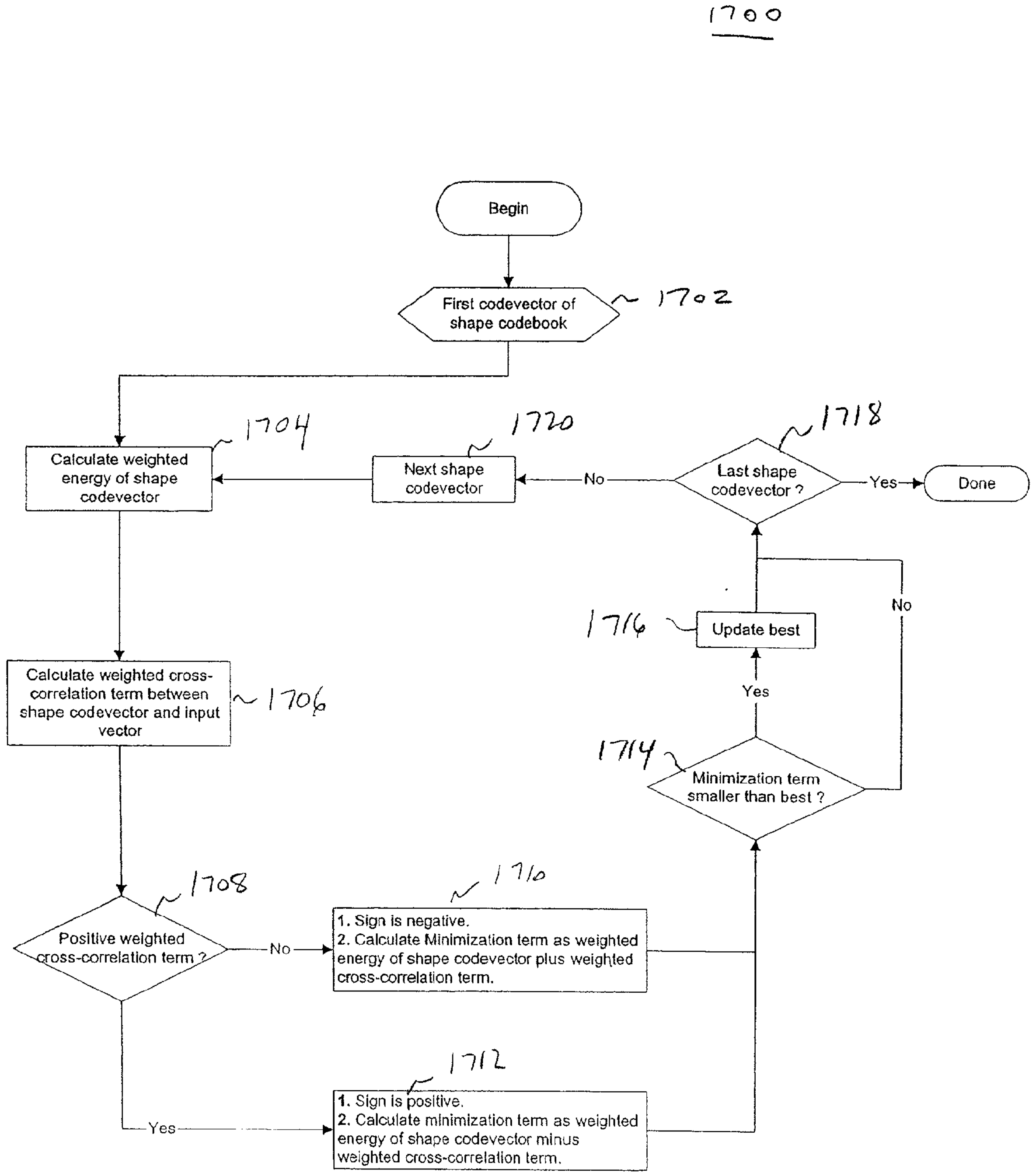
FIG. 17A: WMSE Search of Signed Codebook.

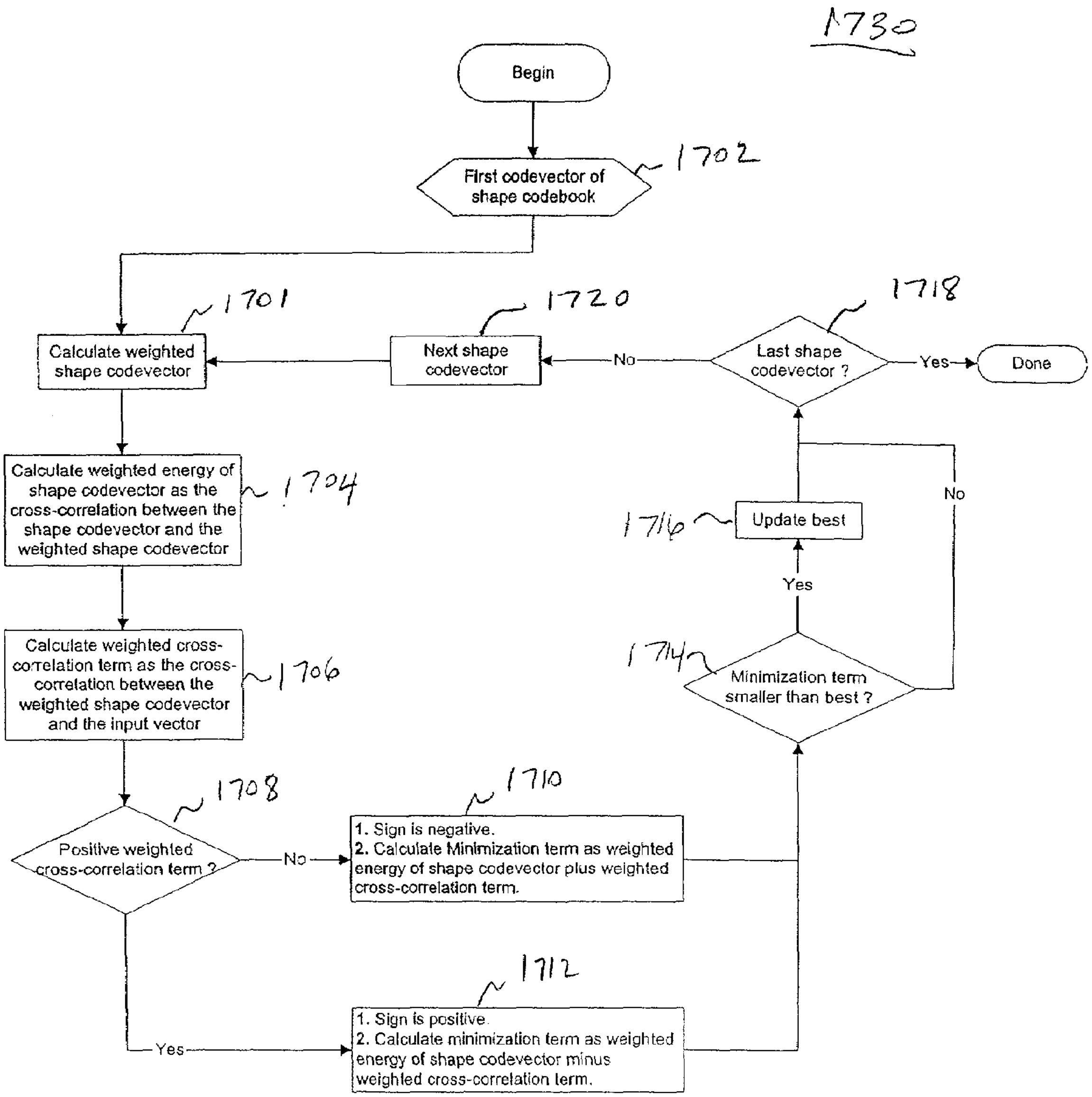
FIG. 17B: WMSE Search of Signed Codebook.

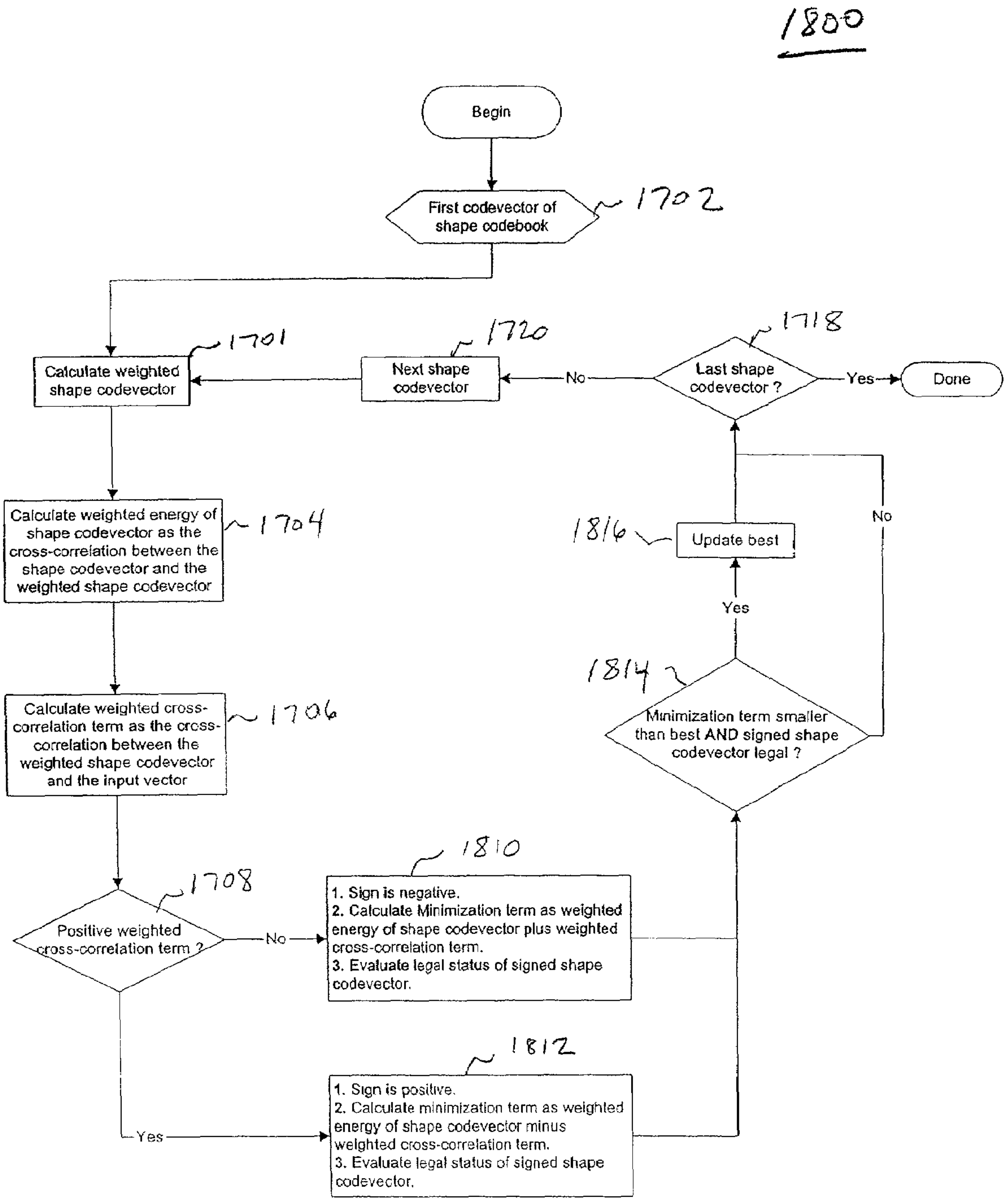
FIG. 18A: WMSE Search of Signed Codebook with Illegal Space.

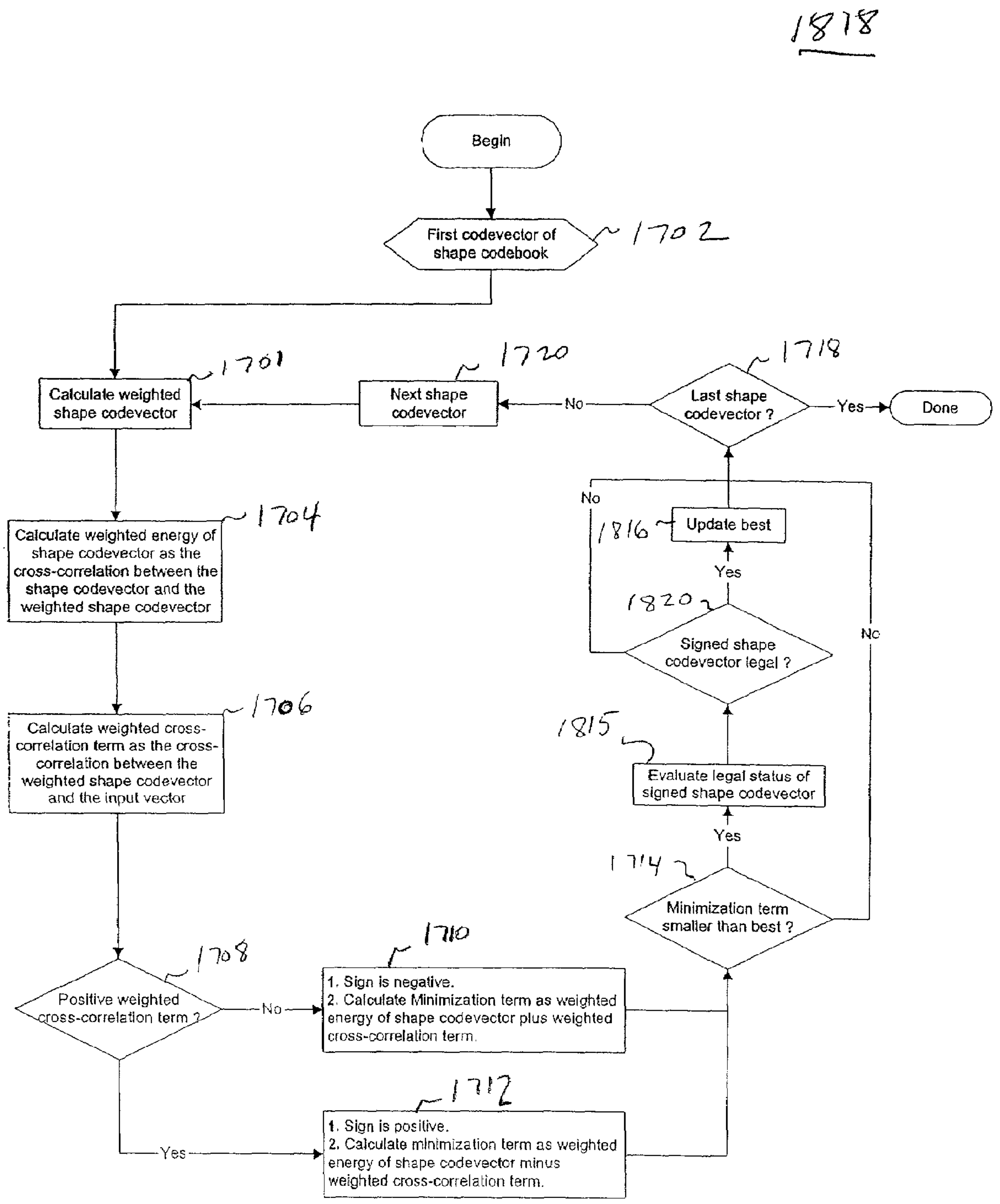
FIG. 18B: WMSE Search of Signed Codebook with Illegal Space.

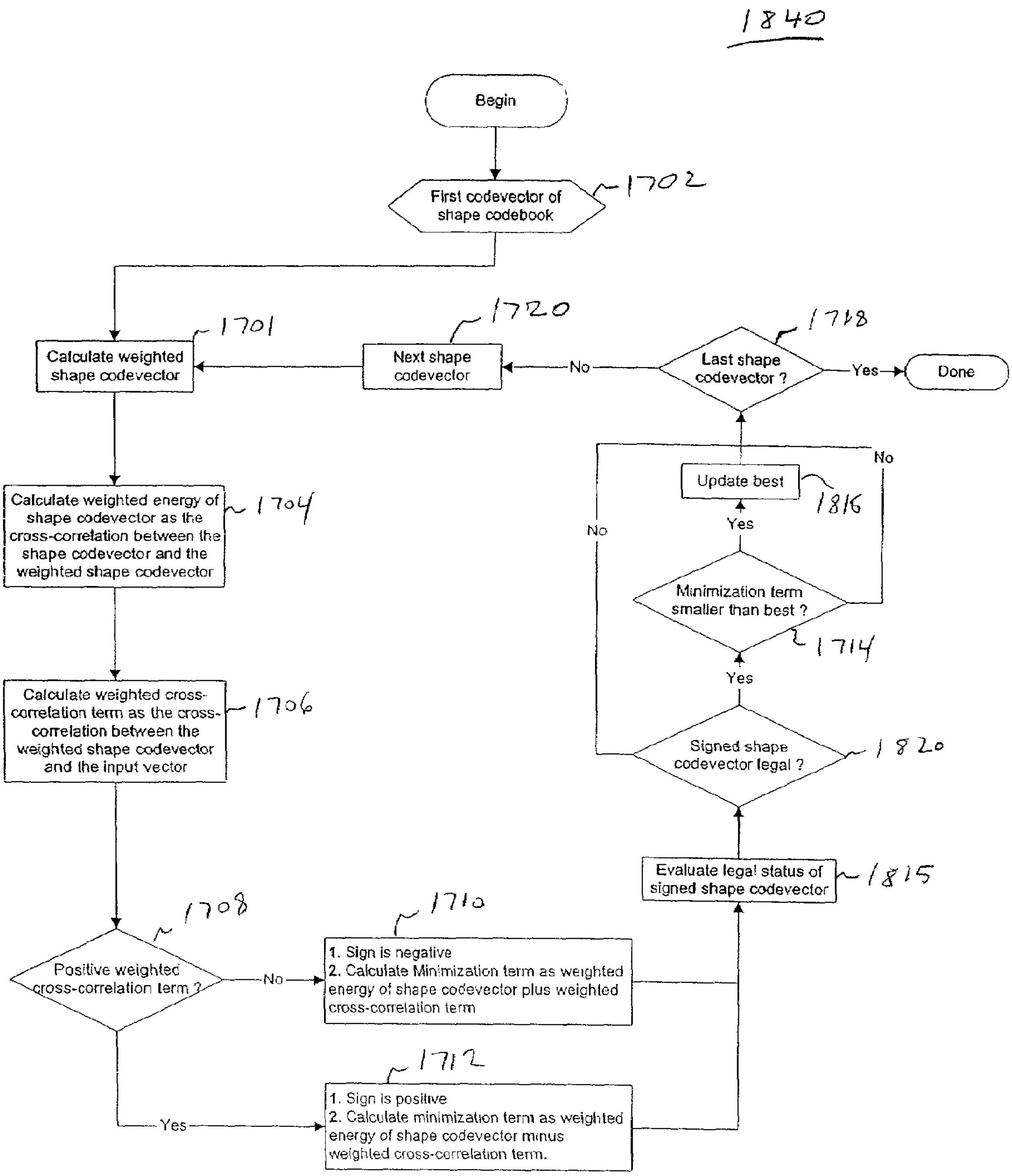
FIG. 18C: WMSE Search of Signed Codebook with Illegal Space.

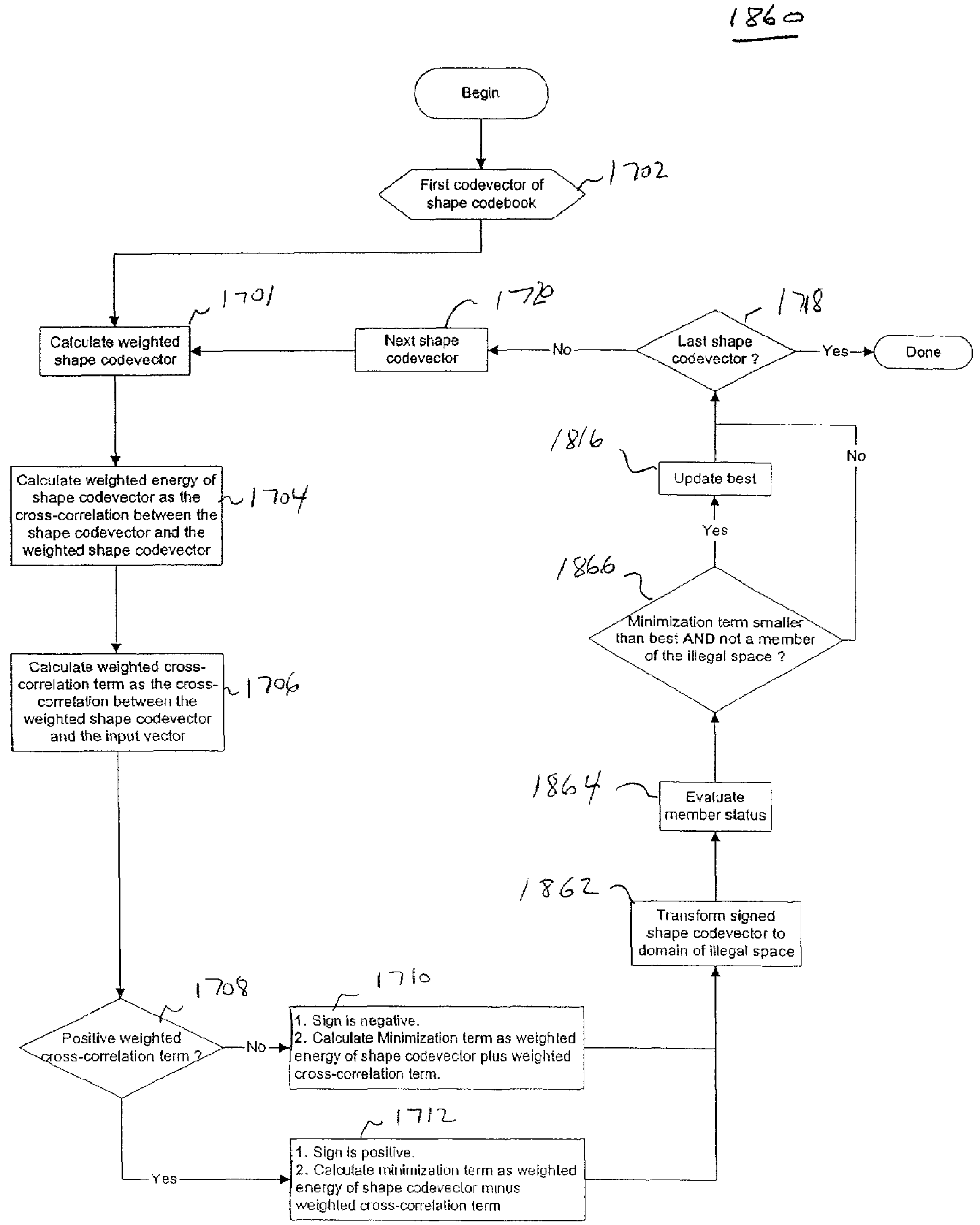
FIG. 18D: WMSE Search of Signed Codebook with Illegal Space.

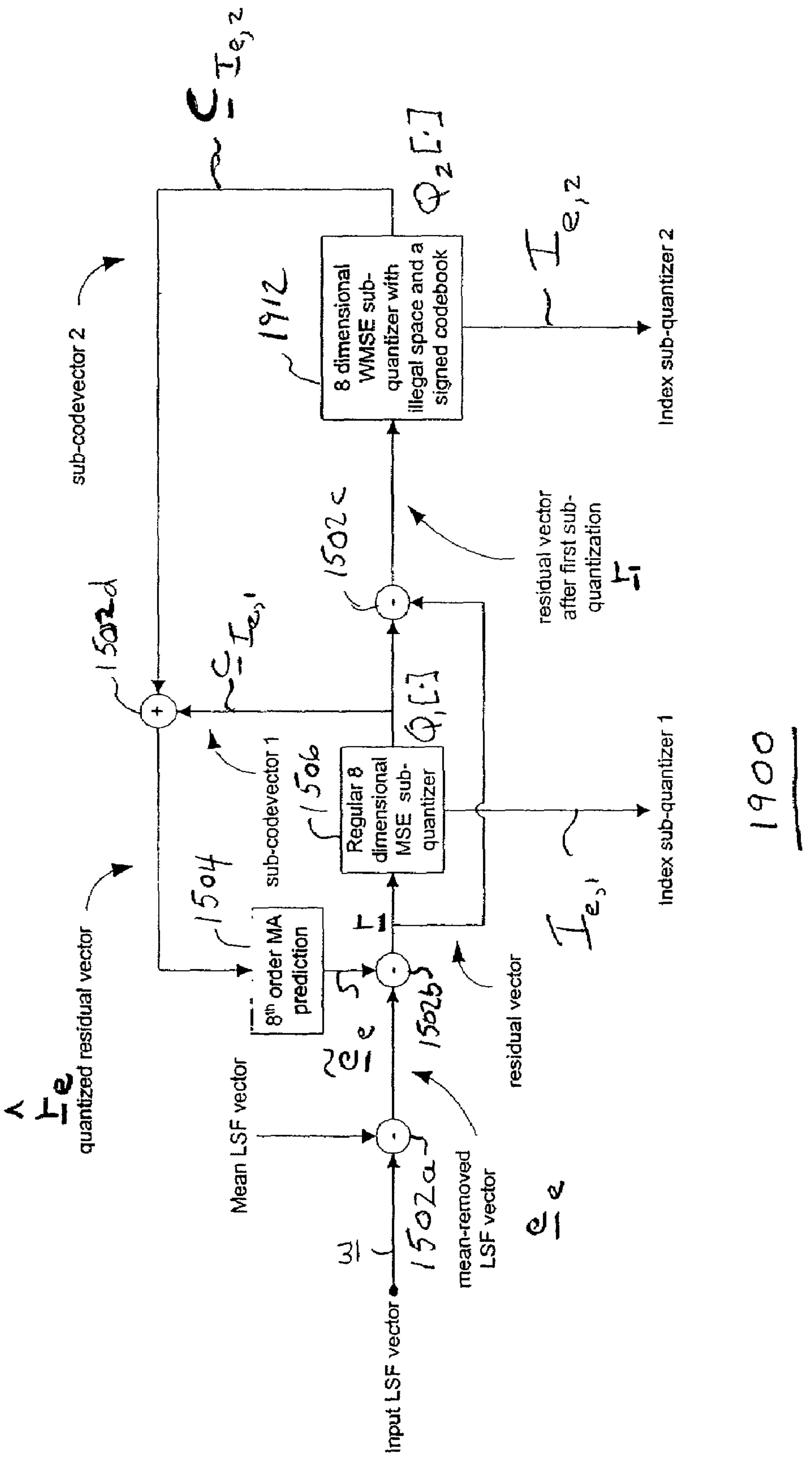
FIG. 19: LSF Quantizer (encoder).

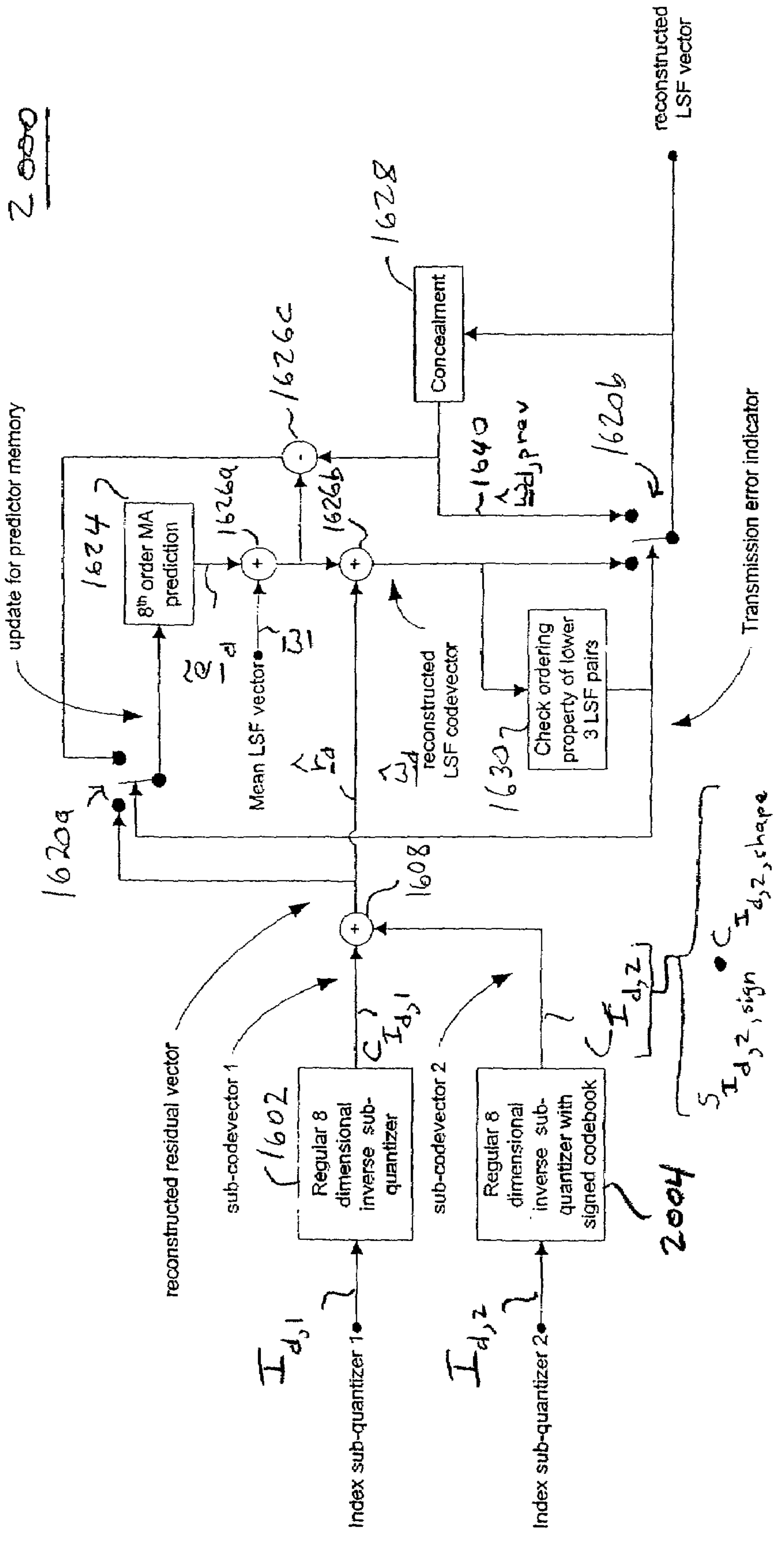
FIG. 20: Inverse LSF Quantizer (decoder).

ROBUST QUANTIZATION AND INVERSE QUANTIZATION USING ILLEGAL SPACE

CROSS-REFERENCE TO RELATED APPLICATIONS

The present application claims priority to the Provisional Application entitled "Efficient and Robust Parameter Quantization and Inverse Quantization in a Coding System," Ser. No. 60/312,543, Jes Thyssen, filed on Aug. 16, 2001, which is incorporated herein in its entirety by reference.

The present application is related to the Non-Provisional Patent Application entitled "Robust Composite Quantization With Sub-Quantizers and Inverse Sub-Quantizers Using Illegal Space," Ser. No. 10,163,995, to Jes Thyssen, filed Jun. 7, 2002, and the Non-Provisional Patent Application entitled "Robust Quantization With Efficient WMSE Search of a Sign-Shape Codebook Using Illegal Space," Ser. No. 10,162, 344, Jes Thyssen, filed Jun. 7, 2002, which are both incorporated herein in their entireties by reference.

BACKGROUND OF THE INVENTION

1. Field of the Invention

The invention relates generally to digital communications, and more particularly, to digital coding and decoding of signals, such as speech and/or audio signals.

2. Related Art

In the field of speech coding, predictive coding is a popular technique. Prediction of the input waveform is used to remove redundancy from the waveform, and instead of quantizing the input waveform directly, the waveform of the residual signal is quantized. The predictor(s) can be either backward adaptive or forward adaptive. Backward adaptive predictors do not require any side information as they are derived from the previously quantized waveform, and therefore can be derived at the decoder. On the other hand, forward adaptive predictor(s) require side information to be transmitted to the decoder as they are derived from the input waveform, which is not available at the decoder. In the field of speech coding two types of predictors are commonly used. The first is called the short-term predictor. It is aimed at removing redundancy between nearby samples in the input waveform. This is equivalent to removing the spectral envelope of the input waveform. The second is often referred as the long-term predictor. It removes redundancy between samples further apart, typically spaced by a time difference that is constant for a suitable duration. For speech this time distance is typically equivalent to the local pitch period of the speech signal, and consequently the long-term predictor is often referred as the pitch predictor. The long-term predictor removes the harmonic structure of the input waveform. The residual signal after the removal of redundancy by the predictor(s) is quantized along with any information needed to reconstruct the predictor(s) at the decoder.

In predictive coding, applying forward adaptive prediction, the necessity to communicate predictor information to the decoder calls for efficient and accurate methods to compress, or quantize, the predictor information. Furthermore, it is advantageous if the methods are robust to communication errors, i.e. minimize the impact to the accuracy of the reconstructed predictor if part of the information is lost or received incorrectly.

The spectral envelope of the speech signal can be efficiently represented with a short-term Auto-Regressive (AR) predictor. Human speech commonly has at most 5 formants in the telephony band (narrowband—100 Hz to 3400 Hz). Typically the order of the predictor is constant, and in popular predictive coding using forward adaptive short-term AR prediction, a model order of approximately 10 for an input signal with a bandwidth of approximately 100 Hz to 3400 Hz is a common value. A $10^{th}$ order AR-predictor provides an all-pole model of the spectral envelope with 10 poles and is capable of representing approximately 5 formants. For wideband signals (50 Hz to 7000 Hz), typically a higher model order is used in order to facilitate an accurate representation of the increased number of formants. The $N^{th}$ order short-term AR predictor is specified by N prediction coefficients, which provides a complete specification of the predictor. Consequently, these N prediction coefficients need to be communicated to the decoder along with other relevant information in order to reconstruct the speech signal. The N prediction coefficients are often referred as the Linear Predictive Coding (LPC) parameters.

The Line Spectral Pair (LSP) parameters were introduced by F. Itakura, "Line Spectrum Representation of Linear Predictor Coefficients for Speech Signals", J. Acoust. Soc. Amer., Vol. 57, S35(A), 1975, and is the subject of U.S. Pat. No. 4,393,272 entitled "Sound Synthesizer". The LSP parameters are derived as the roots of two polynomials, P(z) and Q(z), that are extensions of the z-transform of the AR prediction error filter. The LSP parameters are also referred as the Line Spectral Frequency (LSF) parameters, and have been shown to possess advantageous properties for quantization and interpolation of the spectral envelope in LPC. This has been attributed to their frequency domain interpretation and close relation with the locations of the formants of speech. The LSP, or LSF, parameters provide a unique and equivalent representation of the LPC parameters, and efficient algorithms have been developed to convert between the LPC and LSF parameters, P. Kabal and R. P. Ramachandran, "The Computation of Line Spectral Frequencies Using Chebyshev Polynomials", IEEE Transactions on Acoustics, Speech, and Signal Processing, Vol. 34, No. 6, December 1986.

Popular predictive coding techniques often quantize the LSF representation of the LPC parameters in order to take advantage of the quantization and interpolation properties of the LSF parameters. One additional advantageous property of the LSF parameters is the inherent ordering property. It is known that for a stable LPC filter ($N^{th}$ order all-pole filter) the roots of the two polynomials P(Z) and Q(Z) are interleaved, referred as "in-order", or "ordered". Consequently, stability of the LPC filter can be verified by checking if the ordering property of the LSF parameters is fulfilled, that is, if the LSF parameters are in-order, and representations of unstable filters can be rectified. Commonly, the autocorrelation method, see L. R. Rabiner and R. W. Schafer, "Digital Processing of Speech Signals, Prentice Hall, 1978, Chapter 8, Section 8.1.1 and 8.3.2, is used to estimate the LPC parameters. This method provides a stable LPC filter. However, the quantization of the LSF parameters and transmission of the bits representing the LSF parameters may still result in an unstable quantized LPC filter.

A common method to correct unstable LSF parameters due to both quantization and transmission is to simply reorder LSF pairs that are out of order immediately following quantization at the encoder and reconstruction at the decoder (mapping of the received bits to the LSF parameters). It guarantees that the encoder and decoder will observe the identical quantized LSF parameters if a miss-ordering is due to the quantization, i.e. remain synchronized, and it will prevent the decoder from using an unstable LPC filter if a miss-ordering is due to the transmission, i.e. transmission errors. However, such methods are unable to distinguish, at the decoder, miss-ordering due to quantization and miss-ordering due to transmission errors. Therefore, there is a need for quantization techniques that enable the decoder to identify if miss-ordering is due to transmission errors hereby allowing the decoder to take corrective actions. More generally, there is a need for quantization techniques that facilitate some level of transmission error detection capability while maintaining a high intrinsic quality of the quantization. There is a related need for inverse quantization techniques that exploit the transmission error detection capability to conceal the detected transmission errors. Moreover there is a need to achieve the above with a low computational complexity.

BRIEF SUMMARY OF THE INVENTION

The present invention includes methods and systems that facilitate detection capability and concealment of transmission errors occurring during communication of quantization indices. Furthermore, the present invention addresses the necessity to maintain a manageable complexity and high quality of the quantization.

The present invention includes generalized quantization methods and systems for quantizing (typically at an encoder) a vector including element(s)/parameter(s), such that the bits/indices, or index, representing the quantized version of the vector provides a vector constrained to have given properties. Consequently, if the vector reconstructed during inverse quantization (typically at a decoder) from the received bits/indices, or index, does not possess the given properties, it is given that the bits/indices, or index, have been corrupted while being communicated between the quantizer and inverse quantizer (typically during transmission between an encoder and a decoder). The present invention also applies to composite quantizers including multiple sub-quantizers, and to sub-quantization methods and systems. The present invention also includes specific quantization methods and systems as applied to the quantization of LSF parameters related to an audio or speech signal.

The present invention also includes generalized inverse-quantization methods and systems that reconstruct a vector, including element(s)/parameter(s), from bits/indices, or index, originating from a quantization where the quantized version of the vector is constrained to have desired properties. The present invention also applies to composite inverse quantizers including multiple inverse sub-quantizers, and to inverse sub-quantization methods and systems. The present invention also includes specific inverse quantization methods and systems as applied to LSF parameters related to an audio or speech signal.

An aspect of the present invention includes a quantization method that purposely enforces the ordering property (that is, the desired property) of the quantized LSF during quantization. This requires the quantization scheme of known LSF quantizers to be revised since they may produce quantized parameters representative of out-of-order LSF parameters. The quantization method of the present invention produces bits representing a quantized LSF, where the quantized LSF are ordered. An encoder using the quantization method of the present invention transmits the ordered LSF parameters (represented by bits produced by the quantizer, for example) produced during quantization to a decoder.

Consequently, if, at the decoder, any LSF pair (that is, a pair of LSF parameters), reconstructed from the received bits (corresponding to the bits transmitted by the encoder), is out-of-order, it is given that a transmission error has corrupted one or more of the bits representing the LSF parameters. If such transmission errors are detected, appropriate concealment techniques are applied.

More generally, the method applies to any LSF quantizer structure that contains a set of quantizer output(s), which if selected, would result in a set of LSF parameters that are out-of-order. The method effectively exploits the property of being out-of-order by labeling such possible out-of-order outputs as illegal and preventing the quantizer from selecting them and actually outputting them. In other words, according to an embodiment of the present invention, the quantizer is constrained to produce in-order quantized parameters, that is, bits that represent a set of ordered LSF parameters.

The creation of an illegal or non-valid set of quantizer outputs provides an "illegal space" where if a transmission error transition a legal quantizer output into this illegal space the transmission error is detectable. Obviously, if the illegal space is defined arbitrarily, the performance of the quantizer will degrade in conditions without transmission errors, since effectively, the number of codevectors, and thereby, the resolution of the quantizer is reduced. However, for the LSF parameters a suitable illegal space exists. It is known that, first, the LSF parameters entering the quantizer at the encoder are ordered if the autocorrelation method is used to derive the LPC parameters, and secondly, eventually, the decoder will need a stable LPC filter equivalent to a set of ordered LSF parameters, anyway. Consequently, it appears that defining the illegal space as any quantizer output resulting in a set of quantized LSF parameters with one or more pairs out-of-order, has little, if any, impact on the performance of the quantizer in conditions without transmission errors.

In summary, the invention exploits that a quantizer has a set of outputs that are undesirable, defines an illegal space as this set of outputs, and prevents the quantizer from selecting and then outputting these outputs. The illegal space facilitates transmission error detection capability at the decoder. It may surprise that a quantizer has a set of outputs that are undesirable. However, as will become apparent from the detailed description, this is common and normal.

Above, it is suggested to define the illegal space as the joint set of any quantizer outputs that result in one or more LSF pairs being out-of-order. In certain applications it may be advantageous to define the illegal space as one or more LSF pairs of a subset of the LSF pairs being out-of-order, e.g. only the lower 4 LSF parameters from an $8^{th}$ order LPC are considered. Alternatively, the illegal space can be defined as the joint set of any LSF pair that is closer than a certain minimum distance. The minimum distance can be unique for each pair and related to the minimum distance appearing in the unquantized LSF parameters in a large amount of input data. The definition of the illegal space according to one or more pairs being out-of-order is equivalent to a definition of the illegal space according to any LSF pair being closer than a minimum distance, where the minimum distance is defined as zero. Consequently, if the minimum distance is defined to be greater than zero the illegal space is increased, and the error detection capability is improved. However, as will become apparent from the detailed description, this may increase the complexity.

Furthermore, it should be noted that the invention renders the common LSF parameter ordering procedure at the decoder unnecessary since any disordered LSF pairs flag the occurrence of transmission errors and employ concealment methods to replace the LSF parameters. However, if only a subset of the LSF pairs are considered then the remaining LSF pairs should be subject to an ordering procedure.

The present invention also addresses the need for low complexity solutions to implement the methods and systems mentioned above. For example, the present invention includes quantization techniques that produce a high quality quantization of an input vector while maintaining a low computational complexity. The application of the idea of defining an illegal space is investigated in the context of different Vector Quantization (VQ) structures. Furthermore, an efficient procedure to search a signed codebook with a Weighted Mean Squared Error (WMSE) criterion is derived. This method is based on an expansion of the WMSE term, omission of the invariant term, arranging the computations such that only the vector corresponding to one of the signs needs to be checked. Effectively, only half of the total number of codevectors in the signed codebook needs to be searched. This method can be utilized to further minimize complexity if the idea of creating an illegal space during quantization is adopted in the context of a signed codebook.

An embodiment of the present invention includes a method of quantizing a vector. The vector may form part of a signal, or may include signal parameters relating to the signal. The method comprises: determining legal candidate codevectors among a set of candidate codevectors; deriving a separate error term corresponding to each legal candidate codevector, each error term being a function of the vector and the corresponding legal candidate codevector; and determining a best legal candidate codevector among the legal candidate codevectors based on the error terms. The best legal candidate codevector corresponds to a quantized version of the vector. For example, the method quantizes the vector into the best legal candidate codevector.

The method further comprises outputting at least one of the best legal candidate codevector, and an index identifying the best legal candidate codevector. The step of determining legal candidate codevectors includes: determining whether each candidate codevector among the set of candidate codevectors belongs to an illegal space representing illegal vectors; and declaring as a legal candidate codevector each candidate codevector that does not belong to the illegal space.

Other embodiments of the present invention described below include further methods of quantization, methods of inverse quantization, computer program products for causing a computer to perform quantization and inverse quantization, and apparatuses for performing quantization and inverse quantization.

BRIEF DESCRIPTION OF THE DRAWINGS/FIGURES

The present invention is described with reference to the accompanying drawings. In the drawings, like reference numbers indicate identical or functionally similar elements. Throughout, the processes of "quantization" and "quantizing" are referred to interchangeably.

FIG. 1 is a block diagram of an example coder-decoder (codec) system.

FIG. 2 is a block diagram of an example encoder in the system of FIG. 1.

FIG. 3 is a block diagram of an example decoder in the system of FIG. 1.

FIG. 4A is a block diagram of an example quantizer used in the encoder of FIG. 2.

FIG. 4B is a block diagram of another example quantizer used in the encoder of FIG. 2.

FIG. 5A is a block diagram of an example decoder arrangement expanding on the decoder of FIG. 3.

FIG. 5B is a block diagram of another example decoder arrangement expanding on the decoder of FIG. 3.

FIG. 6A is a flow chart of a method of quantization performed by a quantizer with illegal space, according to an embodiment of the present invention.

FIG. 6B is a flow chart of a method of quantization performed by a quantizer with illegal space, according to another embodiment of the present invention.

FIG. 6C is a flow chart of a method of quantization performed by a quantizer with illegal space, according to yet another embodiment of the present invention.

FIG. 6D is a flow chart of a method of quantization performed by a quantizer with illegal space and with protection against an absence of legal codevectors, according to an embodiment of the present invention.

FIG. 6E is a flow chart of a method performed by a quantizer with illegal space and with protection against an absence of legal codevectors, according to another embodiment of the present invention.

FIG. 7 is a flow chart of a method including detection of transmission error from illegal space performed by a decoder, according to an embodiment of the present invention.

FIG. 8 is a flow chart of a method of inverse quantization performed by an inverse quantizer, including detection of transmission error from illegal space and of error concealment, according to an embodiment of the present invention.

FIG. 9 is a flow chart of a method of quantization performed by a composite quantizer that applies illegal spaces to selected sub-quantizers, according to an embodiment of the present invention.

FIG. 10 is a flow chart of a method of sub-quantization performed by a sub-quantizer with illegal space, according to an embodiment of the present invention.

FIG. 11 is a flow chart of a method of inverse sub-quantization performed by an inverse quantizer that applies illegal spaces to sub-quantizers, according to an embodiment of the present invention.

FIG. 12 is a flow chart of a method of inverse sub-quantization performed by an inverse sub-quantizer with illegal space, according to an embodiment of the present invention.

FIG. 13 is a flow chart of a method of quantization performed by an LSF sub-quantizer with illegal space, according to an embodiment of the present invention.

FIG. 14 is a flow chart of a method of inverse sub-quantization performed by an inverse LSF sub-quantizer with illegal space, according to an embodiment of the present invention.

FIG. 15 is a block diagram of an LSF quantizer at an encoder, according to an embodiment of the present invention.

FIG. 16 is a block diagram of an inverse LSF quantizer at a decoder, according to an embodiment of the present invention.

FIG. 17A is a flow chart of a method of performing a WMSE search of a signed codebook, according to an embodiment of the present invention.

FIG. 17B is a flow chart of a method of performing a WMSE search of a signed codebook, according to another embodiment of the present invention.

FIG. 18A is a flow chart of a method of performing a WMSE search of a signed codebook with illegal space, according to an embodiment of the present invention.

FIG. 18B is a flow chart of a method of performing a WMSE search of a signed codebook with illegal space, according to another embodiment of the present invention.

FIG. 18C is a flow chart of a method of performing a WMSE search of a signed codebook with illegal space, according to yet another embodiment of the present invention.

FIG. 18D is a flow chart of a method of performing a WMSE search of a signed codebook with illegal space, according to an even further embodiment of the present invention.

FIG. 19 is a block diagram of an LSF quantizer at an encoder, according to an embodiment of the present invention.

FIG. 20 is a block diagram of an inverse LSF quantizer at a decoder, according to an embodiment of the present invention.

Figure 4C:
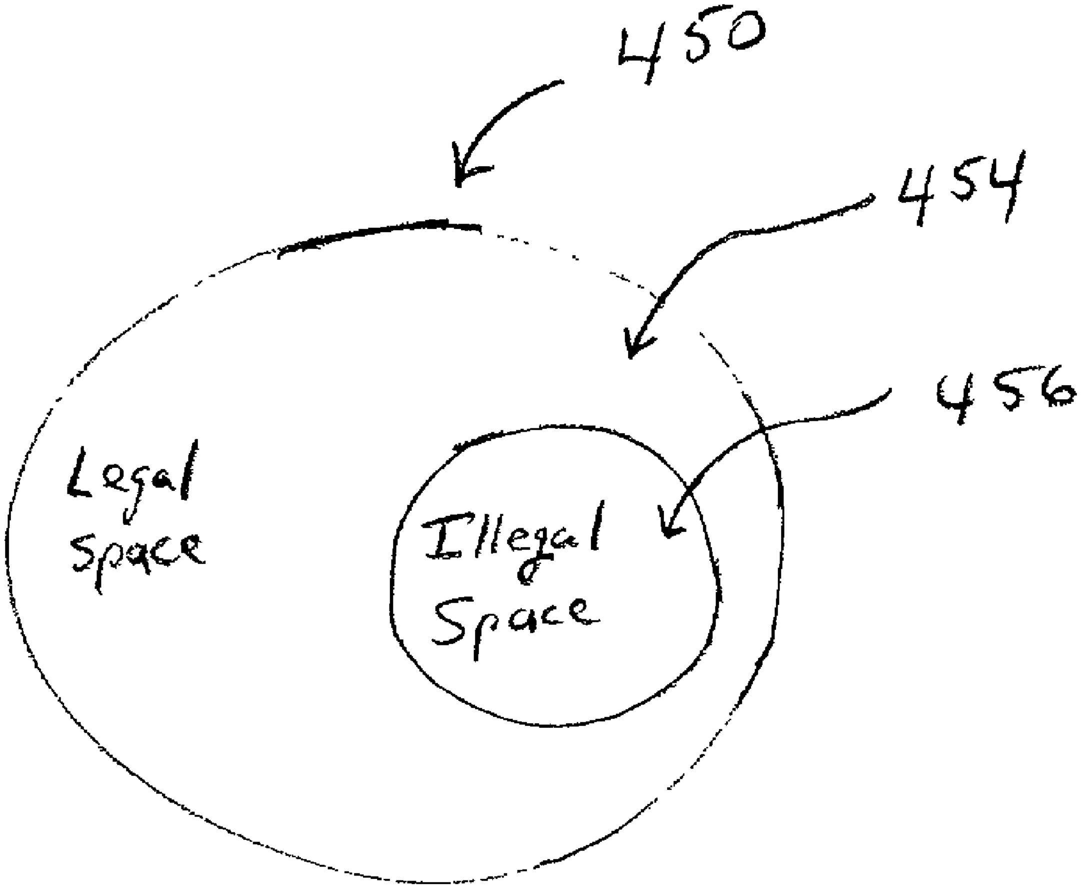
FIG. 4C is a pictorial representation of a codevector "space" encompassing both a legal space and an illegal space.

Each of the encoder and/or quantizer systems of FIGS. 2, 4A, 4B, 15 and 19 perform one or more of the encoder and/or quantizer and/or sub-quantizer methods of FIGS. 6A-6F, 9, 10, 10A, 13 and 17A-18D. Each of these encoder and/or quantizer systems and associated methods may be implemented in the computer system/environment of FIG. 21.

Each of the decoder and/or inverse quantizer systems of FIGS. 3, 5A, 5B, 16 and 20 perform one or more of the decoder and/or inverse quantizer and/or inverse sub-quantizer methods of FIGS. 7, 8, 11, 12, 14 and 17A-18D. Each of these decoder and/or inverse quantizer systems and associated methods may be implemented in the computer system/environment of FIG. 21.

DETAILED DESCRIPTION OF THE INVENTION

Table of Contents

Mathematical Symbol Definitions
1. Definition and Properties of LSF Parameters
2. Detection of Transmission Errors
   a. Generalized Quantizer and Transmission of Codevector Indices
   b. Generalized Treatment of Illegal Space
   c. Illegal Space for LSF Parameters, and Quantizer Complexity
3. Example Wideband LSF System
   a. Encoder LSF Quantizer
   b. Decoder Inverse LSF Quantizer
4. WMSE Search of a Signed VQ
   a. General Efficient WMSE Search of a Signed VQ
   b. Efficient WMSE Search of a Signed VQ with Illegal Space
   c. Index Mapping of Signed VQ
5. Example Narrowband LSF System
   a. Encoder LSF Quantizer
   b. Decoder Inverse LSF Quantizer
6. Hardware and Software Implementations
7. Conclusion The invention of creating an illegal space during quantization and exploiting it for bit-error detection during decoding is applied to the quantization of the spectral envelope in form of the LSF parameters. However, it is anticipated that the idea can be applied to other parameters within speech and audio coding. The main task is to define a suitable sub-space as illegal. Ideally, this is achieved by exploiting a sub-space that the parameter(s) do not occupy. Such a space can be identified either through mathematical analysis, as it is the case for the ordering property of the LSF parameters, or through statistical analysis of the parameter(s), as it is the case for a minimum distance property between adjacent LSF parameters. Furthermore, there may be situations where a compromise between enabling bit-error detection and degrading error-free transmission performance justifies a larger illegal space in order to improve performance under transmission errors.

Mathematical Symbol Definitions

The following is a key defining some of the mathematical symbols used in the Sections below:

$\in$—belonging to the set of; $\notin$—not belonging to the set of; $|$—fulfilling the following conditions; $\Pi$—logical AND between elements; $\emptyset$—null set; $\cup$—union of sets; $\cap$—intersection of sets; X—product; $\vee$—logical OR; $\wedge$—logical AND; $\bar{\ }$—complement set.

1. Definition and Properties of LSF Parameters

In Linear Predictive Coding the spectral envelope is modeled with an all-pole filter. The filter coefficients of the all-pole model are estimated using linear prediction analysis, and the predictor is referred as the short-term predictor. The prediction of the signal sample, s(n), is given by $$\hat{s}(n) = \sum_{k=1}^{K} \alpha_k \cdot s(n-k), \tag{1}$$

where K is the prediction order and $$\underline{\alpha} = (\alpha_1, \alpha_2, \ldots \alpha_K) \tag{2}$$

contains the prediction coefficients. The prediction error is given by $$\begin{aligned} e(n) &= s(n) - \hat{s}(n) \\ &= s(n) - \sum_{k=1}^{K} \alpha_k \cdot s(n-k). \end{aligned} \tag{3}$$

In classical linear prediction analysis the energy of the prediction error, $$E = \sum_n e(n)^2, \tag{4}$$

is minimized. This minimization results in a linear system that can be solved for the optimal prediction coefficients.

The z-transform of Eq. 3 results in $$E(z) = S(z) - \sum_{k=1}^{K} \alpha_k \cdot S(z) \cdot z^{-k} = \left(1 - \sum_{k=1}^{K} \alpha_k \cdot z^{-k}\right) \cdot S(z) = A(z) \cdot S(z), \tag{5}$$

where $$A(z) = 1 - \sum_{k=1}^{K} \alpha_k \cdot z^{-k} \tag{6}$$

is referred as the prediction error filter. The roots of the two polynomials $$P(z) = A(z) - z^{-(K+1)} \cdot A(z^{-1}), \quad Q(z) = A(z) + z^{-(K+1)} \cdot A(z^{-1}) \tag{7}$$

determine the LSF parameters. The roots of P(z) and Q(z) are on the unit circle and occur in complex conjugate pairs for each of the two polynomials. For K even, P(z) has a root in z=1, and Q(z) has a root in z=−1. For K odd, P(z) has a root in z=±1. Furthermore, if A(z) is minimum phase, the roots of P(z) and Q(z) are interleaved, and if the roots of P(z) and Q(z) are interleaved, $$A(z) = \frac{1}{2}(P(z) + Q(z)) \tag{8}$$

is minimum phase and represents a stable synthesis filter $$H(z) = \frac{1}{A(z)}. \tag{9}$$

The roots of P(z) and Q(z) on the upper half of the unity circle are given by $$z_P(k) = e^{j\omega_P(k)}\, z_Q(k) = e^{j\omega_Q(k)}, \tag{10}$$

and

2. Detection of Transmission Errors

The invention in general applies to any quantizer structure, predictive, multi-stage, composite, split, signed, etc., or any combination thereof. However, inherently, certain structures are more suitable for the definition of an illegal space. If a simple quantizer (with codevectors being fixed vectors from a codebook) is applied directly to the parameter(s), then any well designed codebook will be a sampling of the probability density function of the parameter(s), and therefore, no codevectors should populate a sub-space that can be regarded as negligible to the performance. However, for quantizers where the final codevector is a composite of multiple contributions, such as predictive, multi-stage, composite and split quantizers, there is no guarantee that even the best quantizers do not have composite codevectors in a sub-space that can be regarded as negligible. In some sense, the present invention makes use of such a sub-space, which is essentially a waste of bits, to enable some transmission error detection capability at the decoder. The term transmission is used as a generic term for common applications of speech and audio coding where information is communicated between an encoder and a decoder. This includes wire-line and wire-less communication as well as storage applications.

a. Generalized Quantizer and Transmission of Codevector Indices

The process of quantizing a set of K parameters in a vector $$\underline{x} = [x(1), x(2), \ldots, x(K)] \tag{14}$$

into a codevector $$\underline{c}_{I_e} = [c_{I_e}(1), c_{I_e}(2), \ldots, c_{I_e}(K)], \tag{15}$$

which is represented by an index, $I_e$, or equivalently, a series of sub-indices (for composite quantizers) or bits for transmission, is given by $$\underline{c}_{I_e} = Q[\underline{x}] = \arg\min_{\underline{c}_n \in C} \{d(\underline{x}, \underline{c}_n)\}, \tag{16}$$

where the operator, Q[•], denotes the quantization process, and the function $d(\underline{x},\underline{c}_n)$ denotes a suitable error criterion. The codevector, $\underline{c}_{I_e}$, is also referred as the quantized set of parameters, $\hat{\underline{x}}_e$. The process of quantization takes place at the encoder and produces an index, or a series of indices or bits, for transmission to the decoder. As used herein, a vector forms $$\underline{\omega} = \begin{cases} [\omega_Q(1), \omega_P(1), \omega_Q(2), \omega_P(2), \ldots, \omega_Q(K/2), \omega_P(K/2)] & \text{for } K \text{ even} \\ [\omega_Q(1), \omega_P(1), \omega_Q(2), \omega_P(2), \ldots, \omega_Q((K-1)/2), \omega_P((K-1)/2), \omega_Q((K+1)/2)] & \text{for } K \text{ odd} \end{cases} \tag{11}$$

are the LSF parameters. The stability of the synthesis filter results in, and is guaranteed by the ordering of the LSF parameters $$\underline{\omega} = [\omega(1), \omega(2), \ldots, \omega(K)], \tag{12}$$

with a lower constraint of ω(1)>0 due to the root at z=1, and an upper constraint of ω(K)<π due to the root at z=−1, i.e. a stable set of LSF parameters is given by $$\underline{\omega} = [\omega(1), \omega(2), \ldots, \omega(K)], \text{ where } \omega(1)>0,\ \omega(2)>\omega(1), \ldots, \omega(K-1)>\omega(K-2),\ \pi>\omega(K). \tag{13}$$

a part, or portion, of a signal. The signal may be an input signal applied to a quantization system. Alternatively, the signal may be an intermediate signal derived from such an input signal. In embodiments described herein, the signal, and thus vector, relates to a speech and/or audio signal. For example, the signal may be in input speech and/or audio signal. Alternatively, the signal may be a signal derived from the input speech and/or audio signal, such as a residual signal, LSF parameters, and so on. Thus, the vector may form part of a speech and/or audio signal or a residual signal (for example, include samples of the input or residual signal), or may include parameters derived from the speech and/or audio signal, such as LSF parameters.

It should be noted that the set of codevectors, the codebook of size N, $$C=\{\underline{c}_1, \underline{c}_2, \ldots, \underline{c}_N\}, \tag{17}$$

in Eq. 16 is denoted the code of the quantizer. This may be a composite code, i.e. a product code of other codes. In that case the codevectors, $\underline{c}_n$, are a composite of multiple contributions, and the index, $I_e$, is a combination or set of multiple sub-indices, i.e.

$$I_e=\{I_{e,1}, I_{e,2}, \ldots I_{e,M}\} \text{ and} \tag{18}$$

$$\underline{c}_{I_e}=F(\underline{c}_{I_{e,1}}, \underline{c}_{I_{e2}}, \ldots \underline{c}_{I_{eM}}), \tag{19}$$

where M is the number of sub-codes, and $$\underline{c}_{I_e} \in C_1 \times C_2 \times \ldots \times C_M. \tag{20}$$

The M sub-quantizers of the composite quantizer, Q[•] are denoted $Q_m$[•]=$Q_1$[•], $Q_2$[•], . . . $Q_M$[•] and are of size $N_m=N_1, N_2, \ldots, N_M$, respectively.

An example of a composite quantizer is a mean-removed, predictive, two-stage, split VQ of the LSF parameters, where the composite codevectors, $\underline{c}_n$, are given by $$\begin{aligned}\underline{c}_n &= \underline{c}_{\{n_1,n_2,n_3\}} \\ &= \underline{\overline{\omega}} + \underline{\tilde{e}} + \underline{c}_{n_1} + [\underline{c}_{n_2}, \underline{c}_{n_3}],\end{aligned} \tag{21}$$

where $\underline{\overline{\omega}}$ denotes the mean of the LSF parameters, $\underline{\tilde{e}}$ denotes the predicted error, and the three codebook contributions of the first stage, second stage first split, and second stage second split are $$\underline{c}_{n_1} \in C_1, \tag{22}$$

$$\underline{c}_{n_2} \in C_2, \tag{23}$$

$$\underline{c}_{n_3} \in C_3, \tag{24}$$

respectively. The three sub-quantizers, denoted $Q_1$[•], $Q_2$[•], and $Q_3$[•], can be searched jointly or independently. Typically, the two stages are searched sequentially with the possibility of a joint search of a limited number of combined candidates. Furthermore, for many error criteria, the split into sub-vectors in the second stage provides for a joint optimal search, by searching the sub-vectors independently.

The transmission of the set of indices, $I_e$, to the decoder is given by $$I_d=T[I_e] \tag{25}$$

where $I_d$ denotes the set of indices received by the decoder, and the operator, T[•], denotes the transmission. From the received set of indices, $I_d$, the decoder generates the quantized parameters, $\hat{\underline{x}}_d$, according to $$\begin{aligned}\hat{\underline{x}}_d &= Q^{-1}[I_d] \\ &= \underline{c}_{I_d}.\end{aligned} \tag{26}$$

For error-free transmission, $$\underset{error\text{-}free}{T}[\cdot],$$

the received set of indices is identical to the transmitted set of indices:

$$\begin{aligned}I_d &= \underset{error\text{-}free}{T}[I_e] \\ &= I_e \\ &\Downarrow \\ \hat{\underline{x}}_d &= Q^{-1}\left[\underset{error\text{-}free}{T}[I_e]\right] \\ &= Q^{-1}[I_e] \\ &\quad \text{if the quantizer is memoryless, or the memory of the quantizer at the encoder and decoder is synchronized} \\ &= \underline{c}_{I_e} \\ &= \hat{\underline{x}}_e\end{aligned} \tag{27}$$

and the quantized parameters at the decoder is identical to the quantized parameters at the encoder, given that the quantizer is memoryless, or the memory of the quantizer at the encoder and decoder is synchronized. For quantizers with memory, the memory at the encoder and decoder is typically synchronized except immediately following transmission errors.

If an error occurs in the process of transmission, the received set of indices is no longer identical to the transmitted set of indices:

$$\begin{aligned}I_d &= \underset{error}{T}[I_e] \\ &\neq I_e \\ &\Downarrow \\ \hat{\underline{x}}_d &\neq \hat{\underline{x}}_e\end{aligned} \tag{28}$$

Consequently, unwanted distortion or an error is introduced to the parameters. The objective is to minimize this distortion by facilitating detection of transmission errors causing objectionable errors, and subsequently conceal the error. Techniques known from the field of frame erasure concealment or packet loss concealment can be applied to conceal errors in parameters. This typically consists of maintaining the features of the signal from previous error-free segments. For speech, parameters such as spectral envelope, pitch period, periodicity, energy, etc. typically evolve fairly slowly in time, justifying some form of repetition in case a frame or packet of information is lost.

b. Generalized Treatment of Illegal Space

The detection of transmission errors is facilitated by the definition of an illegal space of the quantizer. The illegal space can be defined either as a set of illegal sets of indices, $$I_{Ill}=\{I_{Ill,1}, I_{Ill,2}, \ldots I_{Ill,J}\}, \tag{29}$$

where J is the number of illegal sets of indices, or as a sub-space of the input parameter space, where vectors, $\underline{x}$, within the illegal sub-space, $X_{1ll}$, are defined as illegal, i.e.

$$\underline{x} \in X_{1ll} \Rightarrow \underline{x} \text{ is illegal.} \tag{30}$$

The definition given by Eq. 29 is a special case of the more general definition of the illegal space given by Eq. 30. The illegal space of Eq. 29 is a discrete finite size set while the illegal space of Eq. 30 can be both discrete and continuous, and therefore be of both finite and infinite size, and consequently provide greater flexibility. Furthermore, for certain composite quantizers, such as predictive quantizers, the space of the composite codevectors is dynamic due to a varying term. This complicates the definition of the illegal space according to Eq. 29 since the illegal space in the composite domain would also be dynamic, hereby excluding exploiting that the illegal space is often advantageously defined as a sub-space where the probability density function of the input vector has low probability. On the other hand, a definition according to Eq. 30 facilitates the definition of the illegal space in the same domain as the input vector, and the illegal space can easily be defined as a sub-space where the probability density function of the input vector has low probability. Consequently, the illegal space is advantageously defined by studying the probability density function of the parameters to which the quantizer is applied. This can be done mathematically as well as empirically.

During quantization the selected composite codevector, $\underline{c}_{1_e}$, is restricted to reside in the legal space, $$X_{leg} = \{\underline{x} \mid \underline{x} \notin X_{1ll}\} = \overline{X}_{ill}, \tag{31}$$

and the process of quantization, Eq. 16, is revised and given by $$\begin{aligned} \underline{c}_{l_e} &= Q[\underline{x}] \\ &= \underset{\underline{c}_n \in \{C \cap \overline{X}_{ill}\}}{\arg\min} \{d(\underline{x}, \underline{c}_n)\}. \end{aligned} \tag{32}$$

Hence, if the decoder receives a set of indices that represents a composite codevector that resides in the illegal space a transmission error has occurred, $$\underline{\hat{x}}_d \in X_{ill} \Rightarrow \underset{error}{T}[\cdot], \tag{33}$$

and error concealment is invoked.

In practice, some quantizers may result in an empty set of legal codevectors under certain circumstances, i.e.

$$C_{leg} = \{C \cap \overline{X}_{1ll}\} = \emptyset. \tag{34}$$

In this particular case the quantizer at the encoder is unable to select a codevector that resides in the legal space, and consequently, the decoder will declare a transmission error and invoke error concealment regardless of the transmitted set of indices. The encoder will have to adopt a suitable strategy that to some extent depends on the parameters being quantized. One solution is to take advantage of the knowledge that the decoder will perform error concealment, and repeat the error concealment procedure at the encoder. It may seem odd to perform error concealment the encoder. However, it will ensure that the quantizers at the encoder and decoder will remain synchronized during error-free transmission. Alternatively, the quantizer at the encoder can be allowed to select and proceed with an illegal codevector accepting that synchronization with the quantizer at the decoder will be lost briefly when the error concealment is invoked at the decoder. Yet another solution is to reserve a specific code to communicate this condition to the decoder hereby enabling the encoder and decoder to take a pre-agreed action in synchrony. The most suitable approach to handle an empty set of legal codevectors during quantization will generally depend on the quantizer and the parameters being quantized. For some quantizers and parameters it may not be an issue. Alternatively, it may be possible to take the problem into account when the quantizer is designed.

The definition of a suitable illegal space will depend on the parameters being quantized, and to some extent the quantizer. For a composite quantizer an illegal space can be defined for, any sub-quantizer, a combination of sub-quantizers, or for the composite quantizer. This is illustrated by the example from above. According to Eq. 21 the final codevectors are given by $$\underline{c}_n = \underline{\overline{\omega}} + \underline{\tilde{e}} + \underline{c}_{n_1} + [\underline{c}_{n_2}, \underline{c}_{n_3}] \tag{35}$$

providing an approximation to the input vector, $\underline{x}$. Based on the properties of the input parameters, $\underline{x}$, a suitable illegal space can be defined for the composite quantizer, and the illegal space would be in the domain of $$\underline{\hat{x}}_e = \underline{\overline{\omega}} + \underline{\tilde{e}} + \underline{c}_{n_1} + [\underline{c}_{n_2}, \underline{c}_{n_3}]. \tag{36}$$

However, an illegal space can also be defined for the sub-quantizer $Q_1$ in the domain of $$\underline{\hat{x}}_{e,C_1} = \underline{\overline{\omega}} + \underline{\tilde{e}} + \underline{c}_{n_1}, \tag{37}$$

where $\underline{\hat{x}}_{e,C_1}$ can be considered a first approximation to the input parameter, $\underline{x}$. Similarly, an illegal sub-space can be defined for the sub-quantizers $Q_2$ and $Q_3$ either independently or jointly with the sub-quantizer $Q_1$. An illegal sub-space for the sub-vector equivalent to the first split of the second stage can be defined for the joint sub-quantizers $Q_1$ and $Q_2$ in the domain of $$\begin{aligned} \underline{\hat{x}}_{e,C_1 \cup C_2}(1, 2, \ldots K_1) = {} & \underline{\overline{\omega}}(1, 2, \ldots K_1) + \underline{\tilde{e}}(1, 2, \ldots K_1) + \\ & \underline{c}_{n_1}(1, 2, \ldots K_1) + \underline{c}_{n_2}, \end{aligned} \tag{38}$$

where $K_1$ is the dimension of the first split of the second stage, and $\underline{\hat{x}}_{e,C_1 \cup C_2}$ can be considered a final approximation of the lower sub-vector of the input parameter, $\underline{x}$. Furthermore, the illegal space can be defined in any sub-dimensional space independently of the dimension of the sub-quantizers, a combination of sub-quantizers, or the composite quantizer. Accordingly, an illegal space of the composite quantizer is defined in the domain of $$\begin{aligned} \underline{\hat{x}}_e(k_1, k_2, \ldots, k_L) = {} & \underline{\overline{\omega}}(k_1, k_2, \ldots k_L) + \underline{\tilde{e}}(k_1, k_2, \ldots, k_L) + \\ & \underline{c}_{n_1}(k_1, k_2, \ldots, k_L) + [\underline{c}_{n_2}, \underline{c}_{n_1}](k_1, k_2, \ldots, k_L), \end{aligned} \tag{39}$$

where $1 \leqq k_1 \neq k_2 \approx \ldots k_L \leqq K$, and consequently $L \leqq K$. The indices, $k_1, k_2, \ldots . k_L$, specify the dimensions of the input space that constitute the illegal space, and L is the dimension of the illegal space. The definition of the illegal space can be further generalized to be in the domain of a function of any sub-dimensional space. It is advantageous to have a simple definition of the illegal space from a viewpoint of computational complexity since it is necessary to verify if a candidate codevector belongs to the illegal space during quantization.

FIG. 1 is a block diagram of an example coder-decoder (codec) system. An external source (not shown) applies an input signal 102 to-be-encoded to an encoder 104. Input signal 102 may include a speech and/or audio signal, for example. More generally, input signal 102 may also be any signal, such as an electrical signal, representative of one or more physical parameters. Encoder 104 encodes input signal 102 into a bit-stream 106, including a stream of digital bits, for example. Encoder 104 transmits bit-stream 106 through a communication medium 108. Communication medium 108 may include wireline and wireless transmission media, and may include communication networks such as the Public Switched Telephone Network (PSTN) and Packet Switched Data Networks (PSDNs) including the internet. Communication medium 108 delivers a bit-stream 110, corresponding to transmitted signal 106, to decoder 112. Decoder 112 decodes the bit-stream 110 to provide a decoded output signal 114.

FIG. 2 is a block diagram of an example arrangement of encoder 104. Encoder 104 includes a quantizer portion 202 followed by a multiplexer 204. From input signal 102 different types of parameters $P_1 \ldots P_J$ may be derived, such as to represent the input signal, or at least a portion of the input signal, for quantization. For example, parameter $P_1$ may represent a speech pitch period, parameter $P_2$ may represent the spectral envelope, samples of the input signal, and so on. Parameter Pi may be in the form of an input vector with multiple elements, the vector having a dimension of N, e.g. the parameter $P_2$ above represents the spectral envelope which may be specified by a vector including the LSF parameters. Thus, the vector represents a portion of the input signal, and thus is a signal vector.

In a simplest arrangement, quantizer portion 202 includes a single quantizer. More generally, quantizer portion 202 includes multiple quantizers $Q_1 \ldots Q_J$ (also referred to as quantizers 203$_1$ . . . . . 203$_J$) for quantizing respective parameters $P_1 \ldots P_J$. Each quantizer $Q_i$ may operate independent of the other quantizers. Alternatively, quantizers $Q_1 \ldots Q_J$ may interact with each other, for example, by exchanging quantization signals with each other. Each quantizer 203$_1$ . . . 203$_J$ may be considered a composite quantizer including multiple sub-quantizers that together quantize a single input parameter. Also, each sub-quantizer may itself be a composite quantizer including multiple sub-quantizers.

Each quantizer $Q_i$ quantizes a respective input parameter $P_i$ derived from the input signal possibly in combination with quantization signals from other quantizers. This includes searching for and selecting a best or preferred candidate codevector to represent the respective input parameter $P_i$, or a portion of the input parameter $P_i$. In other words, each quantizer $Q_i$ quantizes the respective input parameter $P_i$ into a preferred codevector. Various quantization techniques are described in detail below. Typically, quantizer $Q_i$ outputs the selected codevector, which corresponds to (for example, represents) a quantized version (or quantization) of the respective input parameter $P_i$, along with an index $I_1$ identifying the selected codevector. For a composite quantizer $Q_i$, the index $I_i$ would be a set of indices, also referred as sub-indices. Thus, quantizer portion 202 provides indices, or sets of sub-indices, $I_1 \ldots I_J$ to multiplexer 204. Multiplexer 204 converts indices $I_1 \ldots I_J$ into a bit-stream 106, representing the indices, or sets of sub-indices.

FIG. 3 is a block diagram of an example arrangement of decoder 112. Decoder 112 includes a demultiplexer 302 followed by an inverse quantizer portion 304. Decoder 112 receives bit-stream 110. Bit-stream 110 represents the indices, or sets of sub-indices, $I_1 \ldots I_J$ transmitted by encoder 104. The indices may or may not have been corrupted during transmission through communication medium 108. Demultiplexer 302 converts the received bits (corresponding to indices $I_1 \ldots I_J$) into indices, or sets of sub-indices. Demultiplexer 302 provides indices to inverse quantizer portion 304.

In a simplest arrangement, inverse quantizer portion 304 includes a single inverse quantizer. More generally, inverse quantizer portion 304 includes multiple inverse quantizers 306$_1$ . . . 306$_J$. Each inverse quantizer 306$_i$, $Q_i^{-1}$, may operate independent of the other inverse quantizers. Alternatively, inverse quantizers 306$_1$ . . . 306$_J$ may interact with each other, for example, by exchanging inverse quantization signals with each other. Each inverse quantizer 306$_1$ . . . 306$_J$ may be considered an inverse composite quantizer including multiple inverse sub-quantizers that together inverse quantize a single quantized input parameter. Also, each sub-quantizer may itself be a composite inverse quantizer including multiple inverse sub-quantizers.

Each inverse quantizer 306$_i$ performs an inverse quantization based on the respective index $I_i$ from demultiplexer 302. For a inverse composite quantizer 306$_i$ the respective index $I_i$ is a set of sub-indices, for the sub-quantizers. Each inverse quantizer reconstructs respective parameter $P_i$ from index $I_i$ and outputs the reconstructed parameter. Generally, a parameter $P_i$ may be a vector with multiple elements as in the example of the spectral envelope mentioned above. Output signal 114 is reconstructed from the parameters representative of parameters Pi that were encoded at encoder 104.

FIG. 4A is a block diagram of an example arrangement 400 of a quantizer $Q_i$ of FIG. 2. Quantizer 400 may also represent a sub-quantizer of a composite quantizer $Q_i$. Quantizer 400 quantizes an input vector 401 representing one or more parameters $P_i$. For example, quantizer 400 quantizes and input vector $\underline{x}$, see Eq. 14, in accordance with Eq. 32. Note that the parameter $P_i$ may have multiple elements. For example, the spectral envelope is typically specified by N prediction coefficients, and the parameter $P_i$ could then contain these N prediction coefficients arranged in the input vector $\underline{x}$. Furthermore, multiple parameters could be grouped together in a vector for joint quantization.

Quantizer 400 includes a codebook 402 for storing codebook vectors. Codebook 402 provides codebook vector(s) 404 to a codevector generator 406. Codevector generator 406 generates candidate codevector(s) 408 ($\underline{c}_n$: see Eqs. 17 and 55, for example) based on, for example, as a function of, one or more of codebook vectors 404, a predicted vector, and a mean vector, for example see Eq. 21. An error calculator 409 generates error terms 411 according to the error criterion ($d(\underline{x},\underline{c}_n)$: see Eqs 74 and 86 for example) based on input parameter ($P_i$) in the input vector 401, $\underline{x}$, and candidate codevectors 408, $\underline{c}_n$. Quantizer 400 includes a legal status tester 412 associated with one or more illegal space definitions or criteria 420 ($X_{ill}$: see Eqs. 30, 46, 48, and 52, for example). Legal status tester 412 determines whether candidate codevectors 408 are legal, or alternatively, illegal, using the one or more illegal space definitions 420. For example, legal status tester 412 compares each of the candidate codevectors 408 to an illegal space criterion 420 representing, for example, illegal vectors. Legal status tester 412 generates an indicator or signal 422 indicating whether each of the candidate codevectors 408 is legal, or alternatively, illegal. For example, if legal status tester 412 determines that a candidate codevector (408) belongs to the illegal space defined in illegal space definitions 420, then legal status tester 412 generates an illegal indicator. Conversely, if legal status tester 412 determines that the candidate codevector 408 does not belong to the illegal space defined in illegal spaces 420, then legal status tester generates a legal indicator corresponding to the candidate codevector.

Quantizer 400 includes a codevector selector 424 for selecting a best or preferred one ($\underline{c}_{1_e}$: see Eq. 32, or $\underline{c}_{1_{em}}$: see Eq. 56, for example) of the candidate codevectors 408 based on error terms 411 corresponding to the candidate codevectors and the legal/illegal indicator 422 also corresponding to the candidate codevectors, see Eqs. 32 and 56. Codevector selector 424 outputs at least one of the best codevector 426 and an index 428 representative of the best codevector.

Instead of outputting the best codevector, the codebook vector corresponding to the best codevector may be outputted.

In quantizer 400, legal status tester 412 determines the legality of candidate codevectors 408 based on illegal space definitions 420. Therefore, candidate codevectors 408 and illegal vectors defined by illegal space definitions 420 are said to be in the same "domain". For example, when candidate codevectors 408 include LSF vectors, for example LSF parameters, illegal space definitions 420 represent illegal LSF vectors. For example, illegal space definitions 420 may define invalid ordering and/or spacing characteristics of LSF parameters, and so on. The illegal space is said to be in the domain of LSF parameters.

FIG. 4B is a block diagram of another example quantizer 430 corresponding to quantizer $Q_i$ of FIG. 2. Quantizer 430 may also represent a sub-quantizer. For example, quantizer 400 may quantize an input vector $\underline{x}$, see Eq. 14, in accordance with Eq. 56 or an input vector $\underline{r}_{1,1}$, see Eq. 76, in accordance with Eq. 85.

Quantizer 430 is similar to quantizer 400, except quantizer 430 includes a composite codevector generator 406*a* for generating candidate composite codevector(s) 408*a*, see Eqs. 19, 21, 55, and 57 for example. In quantizer 430, legal status tester 412 determines whether candidate composite codevectors 408*a* are legal or illegal based on illegal space definitions 420, see Eqs. 36-39, 60, 63, and 82, for example. In this case, illegal space definitions 420 are in the same domain as candidate composite codevectors 408*a*.

FIG. 4C is a pictorial representation of a codevector "space" 450 encompassing both a legal space 454 and an illegal space 456. Codevectors within legal space 454 are legal codevectors, whereas codevectors within illegal space 456 are illegal codevectors. Generally, illegal space definitions, for example, definitions 420 (and definitions 514, discussed below), define the extent, or size, and boundary(s) of illegal space 460.

FIG. 5A is a block diagram of an example arrangement 500 of an inverse quantizer 306$_i$ of FIG. 3, or an inverse sub-quantizer of an inverse composite quantizer 306$_i$. Inverse quantizer 500 receives an index 502 (also referred to as a received index 502) generated from received bit-stream 110. For example, index 502 corresponds to one of indices $I_i$. If 306$_i$ is an inverse composite quantizer and 500 is an inverse sub-quantizer this would be a sub-index of the set of sub-indices. A codebook 504 for storing a set of codebook vectors generates a codebook vector 506 in response to index 502, or one of the indices in the set of indices, the sub-index, corresponding to the inverse sub-quantizer in an inverse composite quantizer. A codevector generator 508 generates a "reconstructed" codevector 510 as a function of the codebook vector 506 in parallel to the quantizer, see Eqs. 21 and 55. Codevector generator 508 may be eliminated, whereby codevector 510 may be the codebook vector 506 itself.

Inverse quantizer 500 also includes a legal status tester 512 associated with one or more illegal space definitions 514. Typically, but not always, illegal space definitions 514 match illegal space definitions 420 in quantizers 400 and 430. Legal status tester 512 determines whether codevector 510 is legal, or alternatively illegal, based on illegal space definitions 514. Legal status tester generates a legal/illegal indicator or signal 516 to indicate whether codevector 510 is legal/illegal.

Inverse quantizer 500 also includes a decisional logic module 520 responsive to codevector 510 and legal/illegal indicator 516. If codevector 510 is declared legal, that is, indicator 516 indicates that codevector 510 is legal, then module 520 releases (that is, outputs) legal codevector 510. It may also output the codebook vector. Alternatively, if legal status tester 512 declares codevector 510 illegal, that is, indicator 516 indicates that codevector 510 is illegal, then module 520 declares a transmission error. Module 520 may perform an error concealment technique responsive to the transmission error.

FIG. 5B is a block diagram of another example arrangement 530 of inverse quantizer 306$_i$ of FIG. 3. Inverse quantizer 530 is similar to inverse quantizer 500, except inverse quantizer 530 includes a composite codevector generator 508*a* for generating a composite codevector 510*a*. Legal status tester 512 determines whether composite codevector 510*a* is legal/illegal based on illegal space definitions 514.

The codevector generators 406, 406*a*, 508 and 508*a* mentioned above derive candidate codevectors as a function of at least their corresponding codebook vectors 404 and 506. More generally, each codevector generator is a complex structure, including one or more signal feedback arrangements and memory to "remember" signals that are fed-back, that derives a respective codevector as a function of numerous inputs, including the fed-back signals. For example, each codevector generator can derive each codevector, that is a current codevector, as a function of (1) a current and one or more past codebook vectors, and/or (2) one or more past best codevectors (in the case of generators 406 and 406*a*) or one or more past reconstructed codevectors (in the case of generators 508 and 508*a*). Examples of such codevector generators in a quantizer and an inverse quantizer are provided in FIGS. 15/19 and 16/20, respectively, described below. Due to the complexity of the codevector generators, determining apriori whether each codevector generator will generate a legal codevector can be a non-trivial matter. Thus, comparing the codevectors to an illegal space after they are generated is a convenient way to eliminate illegal, and thus, undesired, codevectors.

FIG. 6A is a flowchart of an example method 600 of quantizing a parameter using a quantizer associated with an illegal space (that is, with one or more illegal space definitions or criteria). For example, method 600 quantizes the input vector 401 representative of input parameter $P_i$. An initial step 602 includes establishing a first candidate codevector that is to be processed among a set of candidate codevectors to be processed. The first candidate codevector may already exist, that is, has already been generated, or may need to be generated. For example, codevector generator 406 (or 406*a*) may generate a candidate codevector from one or more codebook vectors 404.

A next step 604 includes determining a minimization term (also referred to equivalently as either a minimization value or an error term) corresponding to the codevector. Step 604 includes determining the error term as a function of the codevector and another vector, such as an input vector. The input vector may represent the input parameter(s) that is to be quantized by method 600, or a derivative thereof. For example, error calculator 409 generates error term 411 as a function of codevector 408 and an input vector 401 representative of the input parameter $P_i$ or a derivative thereof.

A next step 606 includes evaluating a legal status of the codevector. Step 606 includes determining whether the candidate codevector corresponds to an illegal space representing illegal vectors. For example, in quantizer 400, legal status tester 412 determines the legal status of candidate codevector 408 (or 408*a*) based on one or more illegal space definitions 420, and generates indicator 422 to indicate the legal/illegal status of the codevector.

Step 606 may include determining whether the candidate codevector belongs to the illegal space. This includes comparing the candidate codevector to the illegal space. Step 606 also includes declaring the candidate codevector legal when the candidate codevector does not correspond to the illegal space (for example, when the candidate codevector does not belong to the illegal space). Step 606 may also include declaring the candidate codevector illegal when it does correspond to the illegal space (for example, when it belongs to the illegal space). Step 606 may include outputting a legal/illegal indicator indicative of the legal status of the candidate codevector. In quantizer 400, legal status tester 412 determines the legal status of candidate codevector 408 (or 408*a*) based on one or more illegal space definitions 420, and generates indicator 422 to indicate the legal/illegal status of the codevector.

The illegal space definition is represented by one or more criteria. For example, in the case where the candidate codevector is in a vector form, the illegal space is represented by an illegal vector criterion. In this case, step 606 includes determining whether the candidate codevector satisfies the illegal vector criterion. Also, in an arrangement of method 600, the illegal space may represent an illegal vector criterion corresponding to only a portion of a candidate codevector. In this case, step 606 includes determining whether only the portion of the candidate codevector, corresponding to the illegal vector criterion, satisfies the illegal vector criterion.

A next step 608 includes determining whether (1) the error term (calculated in step 604) corresponding to the candidate codevector is better than a current best error term, and (2) the candidate codevector is legal (as indicated by step 606). For example, codevector selector 424 determines whether error term 411 corresponding to codevector 408 is better than the current best error term.

If both of these conditions are satisfied, that is, the error term is better than the current best error term and the candidate codevector corresponding to the error term is legal, then flow proceeds to a next step 610. Step 610 includes updating the current best error term with the error term calculated in step 604, and declaring the candidate codevector a current best candidate codevector. Flow proceeds from step 610 to a next step 612. Codevector selector 424 performs these steps.

If at step 608, either of conditions (1) or (2) is not true, then flow bypasses step 610 and proceeds directly to step 612.

Step 612 includes determining whether a last one of the set of candidate codevectors has been processed. If the last candidate codevector has been processed, then the method is done. On the other hand, if more candidate codevectors need to be processed, then flow proceeds to a next step 614. At step 614, a next one of the candidate codevectors in the set of candidate codevectors is chosen, and steps 604-612 are repeated for the next candidate codevector.

Processing the set of candidate codevectors according to method 600 results in selecting a legal candidate codevector corresponding to a best error term from among the set of legal candidate codevectors. For example, codevector selector 424 selects the best candidate codevector. This is considered to be the best legal candidate codevector among the set of candidate codevectors. The best legal candidate codevector corresponds to a quantized version of the parameter (or vector). In an embodiment, the best legal candidate codevector represents a quantized version of the parameter (or vector). In other words, method 600 quantizes the parameter (or vector) into the best legal candidate codevector. In another embodiment, the best legal candidate codevector may be transformed into a quantized version of the parameter (or vector), for example, by combining the best legal candidate codevector with another parameter (or vector). Thus, in either embodiment, the best legal candidate codevector "corresponds to" a quantization or quantized version of the parameter.

The method also includes outputting at least one of the best legal candidate codevector, and an index identifying the best legal candidate codevector. For example, codevector selector 424 outputs index 428 and best codevector 426.

FIG. 6B is a flowchart of another method 620 of quantizing a parameter using a quantizer associated with an illegal space. Methods 620 and 600 include many of the same steps. For convenience, such steps are not re-described in the context of method 620. Method 620 is similar to method 600, except method 620 reverses the order of steps 604 and 606.

Method 620 includes evaluating the legal status (step 606) of the candidate codevector before calculating the error term (step 604) corresponding to the candidate codevector. Method 620 also adds a step 606*a* between legality-checking step 606 and error term calculating step 604. Together, steps 606 and 606*a* include determining whether the candidate codevector is legal.

If the candidate codevector is legal, then flow proceeds to step 604, where the corresponding error term is calculated. Otherwise, flow proceeds directly from step 606*a* to step 612, thereby bypassing steps 604, 608*a* and 610.

Thus, method 620 determines error terms only for legal candidate codevectors, thereby minimizing computational complexity in the case where some of the candidate codevectors may be illegal. Step 608*a* in method 620 need not determine the legality of a candidate codevector (as is done in step 608 of method 600) because prior steps 606 and 606*a* make this determination before flow proceeds to step 608*a*.

A summary method corresponding to methods 600 and 620 includes:

(a) determining legal candidate codevectors among a set of candidate codevectors;

(b) determining a best legal candidate codevector among the legal candidate codevectors; and (c) outputting at least one of
 the best legal candidate codevector, and
 an index identifying the best legal candidate codevector.

FIG. 6C is a flowchart of another example method 650 of quantizing a parameter using a quantizer associated with an illegal space. Method 650 is similar to method 620, except that method 620 reverses the order in which steps 604 and 606 are executed. Method 620 includes:

at step 604, determining an error term corresponding to a candidate codevector of a set of candidate codevectors, the error term being a function of another vector, such as the input vector, and the corresponding candidate codevector;

at steps 608*a*, 606 and 606*a*, taken together, determining whether the candidate codevector is legal when the error term is better than a current best error term;

at step 610, updating the current best error term with the error term corresponding to the candidate codevector, when the error term is better than the current best error term and the codevector is legal;

repeating steps 604, 608*a*, 606, 606*a* and 610 for all of the candidate codevectors in the set of candidate codevectors; and thereafter outputting at least one of
 a best legal candidate codevector corresponding to the best current error term, and
 an index identifying the best legal candidate codevector.

FIG. 6D is a flowchart of an example method 660 of quantizing a parameter using a quantizer having an illegal space, and having protection against an absence of a legal candidate codevector. The codevector loop of method 660 includes a first branch to identify a best legal candidate codevector among a set of candidate codevectors based on their corresponding error terms, if it exists. This branch includes steps 608*b*, 606 and 606*a*, and 610,.

Method 660 includes a second branch, depicted in parallel with the first branch, to identify a candidate codevector among the set of candidate codevectors corresponding to a best error term, independent of whether the codevector is legal. This branch includes steps 662 and 664. The second branch updates a current best global candidate codevector and a corresponding current best global error term (see step 664). Step 662 determines whether the error term calculated in step 604 is better than a current best error term for the current best global codevector, independent of whether the corresponding candidate codevector is legal.

When the first and second branches have processed, in parallel, all of the candidate codevectors in the set of candidate codevectors, flow proceeds to a step 668. Step 668 includes determining whether all of the candidate codevectors are illegal. If all of the candidate codevectors are illegal, then a next step 670 includes releasing/outputting the best global (illegal) candidate codevector (as determined by the second branch) and/or an index identifying the best global candidate codevector.

On the other hand, if all of the candidate codevectors are not illegal (that is, one or more of the candidate codevectors are legal), then flow proceeds from step 668 to a next step 672. Step 672 includes releasing the best legal candidate codevector among the set of candidate codevectors (as determined by the first branch) and/or an index identifying the best legal candidate codevector.

The loop including the first branch of method 660 in FIG. 6D and step 604, 610, and 612 is similar to the loop depicted in method 650, discussed above in connection with FIG. 6C. However, the first branch in method 660 may be rearranged to be more similar to the loops of methods 600 and 620 discussed above in connection with FIGS. 6A and 6B, as would be apparent to one of ordinary skill in the relevant art(s) after having read the description herein.

FIG. 6E is a flowchart of another example method 680 of quantizing a parameter using a quantizer associated with an illegal space, and having protection against an absence of legal codevectors. Method 680 is similar to method 600 discussed above in connection with FIG. 6A. However, method 680 adds step 668 to determine whether all of the candidate codevectors are illegal. If all of the candidate codevectors are illegal, then flow proceeds to a next step 682. Step 682 includes applying a concealment technique. Otherwise, the method terminates without the need for concealment.

Each method described above, and further methods described below, includes a processing loop, including multiple steps, for processing one candidate codevector or sub-codevector at a time. The loop is repeated for each codevector or sub-codevector in a set of codevectors. An alternative arrangement for these methods includes processing a plurality of codevectors or sub-codevectors while eliminating such processing loops.

Figure 6F:
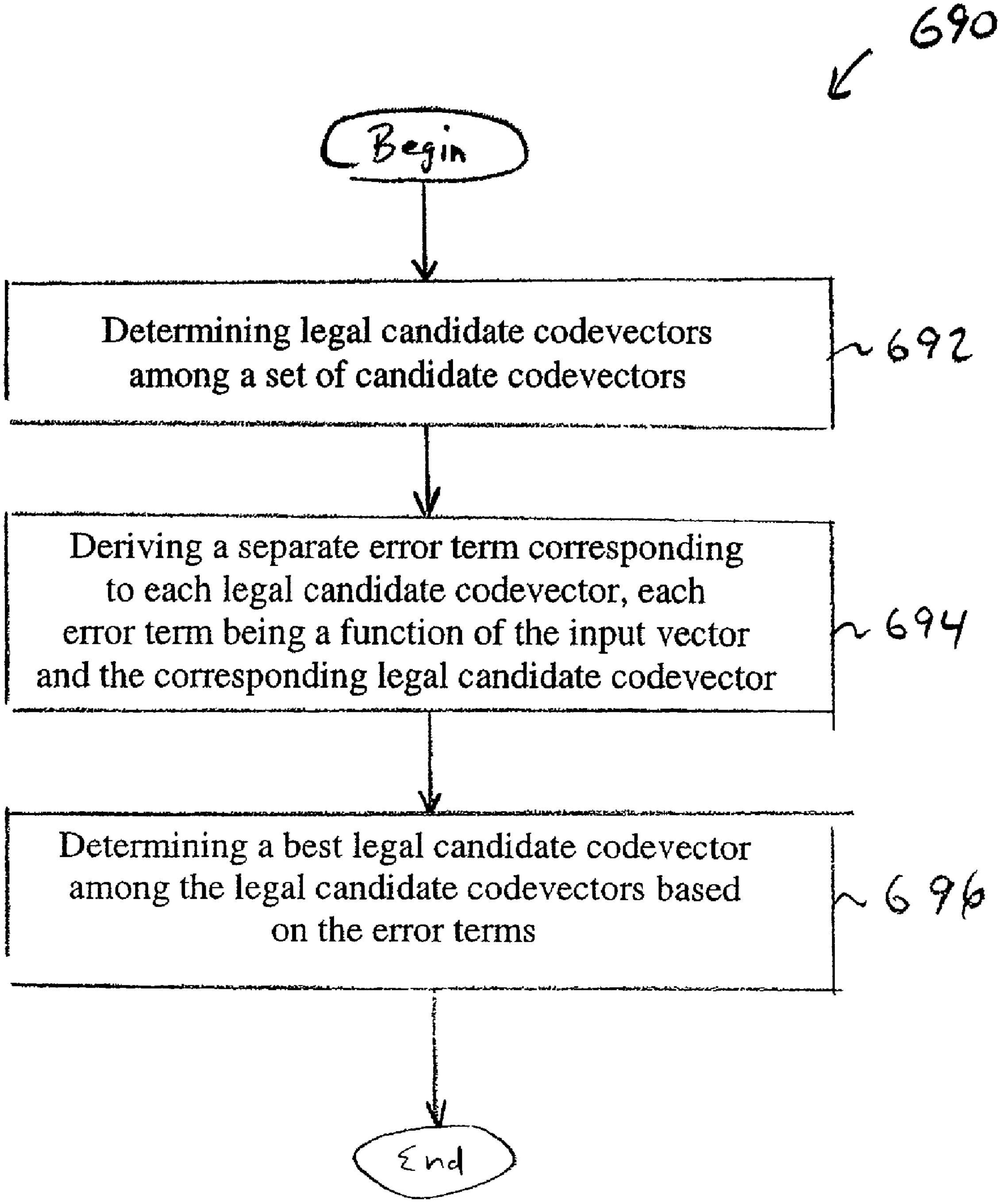
FIG. 6F is a flow chart of an example summary method, corresponding to the methods of FIGS. 6A and 6B, that uses block-processing instead of a looped arrangement of method steps.

For example, FIG. 6F is a block diagram of an example summary method 690, corresponding to methods 600 and 630, that eliminates such processing loops. In method 690, a first step 692 includes determining legal candidate codevectors among a set of candidate codevectors. This is equivalent to performing steps 606 and 606*a* repeatedly. This is a form of block-processing the set of codevectors to determine their legal statuses.

A next step 694 includes deriving a separate error term corresponding to each legal candidate codevector, each error term being a function of the input vector and the corresponding legal candidate codevector. This is equivalent to performing step 604 repeatedly. A next step 696 includes determining a best legal candidate codevector among the legal candidate codevectors based on the error terms. A next step includes outputting at least one of the best legal candidate codevector and an index identifying the best legal candidate codevector. Other alternative method arrangements include combining loops with block-processing steps.

FIG. 7 is a flowchart of an example method 700, performed by a decoder using an illegal space. Method 700 may be performed by an inverse quantizer residing in the decoder. Method 700 begins when an index is received at the decoder. A first step 702 includes reconstructing a codevector from the received index. For example, codevector generator 508 (or 508*a*) generates reconstructed codevector 510 (or 510*a*) from received index 502.

Next steps 704 and 706 include evaluating a legal status of the reconstructed codevector. For example, steps 704 and 706 include determining whether the reconstructed codevector is legal or illegal, using the illegal space. These steps are similar to steps 606 and 608*a* in method 680, for example. For example, legal status tester 512 determines whether reconstructed codevector 510 (or 510*a*) is legal using one or more illegal space definitions 514.

If the reconstructed codevector is illegal, then a next step 708 declares a transmission error. For example, decisional logic block 520 performs this step. Otherwise, the method is done.

FIG. 8 is a flowchart of an example method 800 of inverse quantization performed by an inverse quantizer. Method 800 includes steps 702-706 similar to method 700. At step 706, if the reconstructed codevector is illegal, that is, the reconstructed codevector corresponds to the illegal space, then flow proceeds to step 708. Step 708 includes declaring a transmission error. A next step 710 includes invoking an error concealment technique in response to the transmission error.

Returning to step 706, if the reconstructed codevector is not illegal (that is, it is legal), then flow proceeds to a next step 712. Step 712 includes releasing/outputting the legal reconstructed codevector.

FIG. 9 is a flowchart of an example method 900 of quantization performed by a composite quantizer including a plurality of sub-quantizers. Method 900 applies illegal spaces to selected ones of the sub-quantizers of the composite quantizer. Initially, a step 902 selects a first one of the plurality of sub-quantizers. A next step 904 includes determining whether an illegal space is associated with the selected sub-quantizer. If an illegal space is associated with the selected sub-quantizer, then a next step 906 includes sub-quantization with the illegal space, using the selected sub-quantizer.

On the other hand, if an illegal space is not associated with the selected sub-quantizer, then a next step 908 includes sub-quantization without an illegal space, using the selected sub-quantizer.

Both steps 906 and 908 lead to a next step 910. Step 910 includes releasing/outputting at least one of (1) a best sub-codevector, and (2) a sub-index identifying the best sub-codevector as established at either of steps 906 and 908.

A next step 912 includes determining whether a last one of the plurality of sub-quantizers has been selected (and subsequently processed). If the last sub-quantizer has been selected, the method is done. Otherwise, a next step 914 includes selecting the next sub-quantizer of the plurality of sub-quantizers.

FIG. 10 is a flowchart of an example method 1000 of sub-quantization using an illegal space, as performed by a sub-quantizer. Method 1000 quantizes an input vector. For example, quantizer 1000 may quantize an input vector $\underline{x}$, see Eq. 14, in accordance with Eq. 56 or an input vector $\underline{r}_{1,1}$, see Eq. 76, in accordance with Eq. 85. Method 1000 expands on step 906 of method 900. The general form of method 1000 is similar to that of method 650, discussed above in connection with FIG. 6C. Method steps in method 1000 are identified by reference numerals increased by 400 over the reference numerals identifying corresponding method steps in FIG. 6C. For example, step 604 in FIG. 6C corresponds to step 1004 in FIG. 10.

An initial step 1002 includes establishing a first one of a plurality or set of sub-codevectors that needs to be processed.

A next step 1004 includes determining an error term corresponding to the sub-codevector. For example, when sub-quantization is being performed in accordance with Eq. 85, step 1004 determines the error term in accordance with Eq. 86.

A next step 1008 includes determining whether the error term is better than a current best error term. If the error term is better than the current best error term, then a next step 1020 includes transforming the sub-codevector into a corresponding candidate codevector residing in the same domain as the illegal space associated with the sub-quantizer. Step 1020 may include combining the sub-codevector with a transformation vector to produce the candidate codevector. For example, when sub-quantization is being performed in accordance with Eq. 85, step 1004 includes transforming sub-codevector $\underline{c}_{n_2}$ into candidate codevector $\underline{c}_{n,2}$ in accordance with Eq. 83, or more generally, when sub-quantization is being performed according to Eq. 56, step 1004 includes transforming sub-codevector $\underline{c}_{n_m}$ into candidate codevector $\underline{c}_{n,m}$ in accordance with Eq. 55.

Next steps 1006 and 1006*a* together include determining whether the candidate codevector is legal. For example, when sub-quantization is being performed in accordance with Eq. 85, step 1006 includes determining whether codevector $\underline{c}_{n,2}$ is legal using the illegal space defined by Eq. 87.

If the candidate codevector is legal, then next step 1010 includes updating the current best error term with the error term calculated in step 1004. Flow proceeds to step 1012.

Returning again to step 1008, if the error term is not better than the current best error term, then flow proceeds directly to step 1012.

Steps 1004, 1008, 1020, 1006, 1006*a*, and 1010 are repeated for all of the candidate sub-codevectors. Method 1000 identifies a best one of the sub-codevectors corresponding to a legal candidate codevector, based on the error terms. Method 1000 includes outputting at least one of the best sub-codevector and an index identifying the best sub-codevector. The best sub-codevector is a quantized version (or more specifically, a sub-quantized version) of the input vector.

It is to be understood that the form of method 1000 may be rearranged to be more similar to the forms of methods 600 and 620 discussed above in connection with FIGS. 6A and 6B, respectively.

Figure 10A:
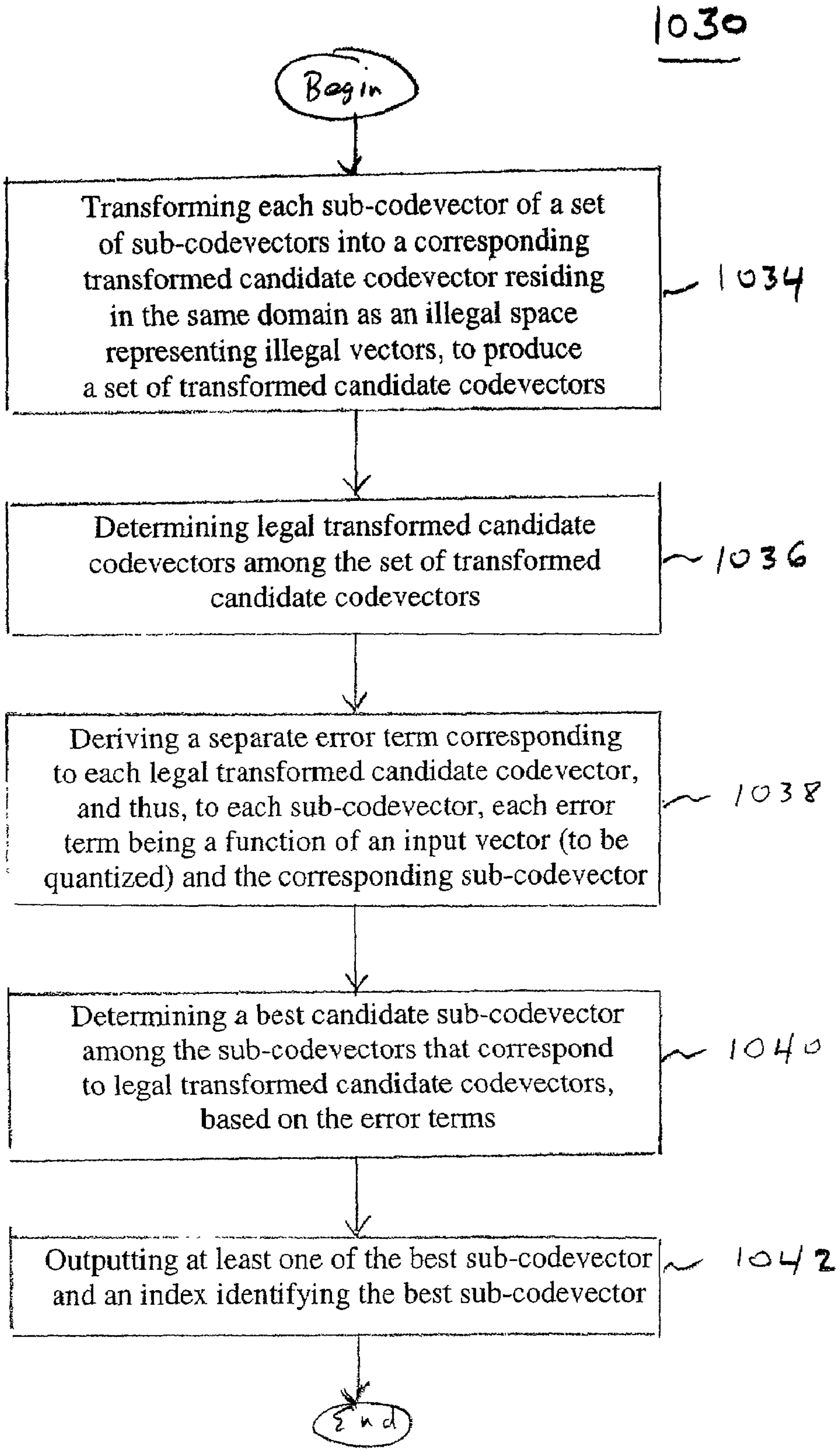
FIG. 10A is a flowchart of another example method of sub-quantization with an illegal space.

FIG. 10A is a flowchart of another example method 1030 of sub-quantizing an input vector with an illegal space performed by a sub-quantizer. A first step 1034 includes transforming each sub-codevector of a set of sub-codevectors into a corresponding transformed candidate codevector residing in the same domain as the illegal space associated with the sub-quantizer. Step 1034 may include combining each sub-codevector with a transformation vector. Step 1034 produces a set of transformed candidate codevectors.

A next step 1036 includes determining legal transformed candidate codevectors among the set of transformed candidate codevectors.

A next step 1038 includes deriving a separate error term corresponding to each legal transformed candidate codevector, and thus, to each sub-codevector. Each error term is a function of the input vector and the corresponding sub-codevector.

A next step 1040 includes determining a best candidate sub-codevector among the sub-codevectors that correspond to legal transformed codevectors, based on the error terms. For example, step 1040 includes determining the best candidate sub-codevector corresponding to a legal transformed codevector and a best error term among the error-terms corresponding to legal transformed codevectors. For example, assume there are a total of N candidate sub-codevectors, but only M of the sub-codevectors correspond to legal transformed candidate codevectors after step 1036, where $M \leqq N$. Step 1040 may include determining the best sub-codevector among the M sub-codevectors as that sub-codevector corresponding to the best (for example, lowest) error term among the M sub-codevectors. Other variations of this step are envisioned in the present invention.

A next step 1042 includes outputting at least one of the best sub-codevector and an index identifying the best sub-codevector.

FIG. 11 is a flowchart of an example method 1100 of inverse composite quantization including multiple inverse sub-quantizers. At least one of the inverse sub-quantizers is associated with an illegal space, and thus performs inverse sub-quantization with an illegal space. Method 1100 is similar to method 900, except method 1100 applies to inverse composite quantization instead of composite quantization.

An initial step 1102 includes selecting a first inverse sub-quantizer from the multiple inverse sub-quantizers of the composite inverse quantizer.

A next step 1104 includes determining whether an illegal space is specified for the selected inverse sub-quantizer. If an illegal space is specified for, and thus, associated with, the selected inverse sub-quantizer, then a next step 1106 includes inverse sub-quantization with the illegal space, using the selected inverse sub-quantizer.

A next step 1108 includes determining whether a transmission error was detected in step 1106. If a transmission error was detected, then a next step 1110 includes applying an error concealment technique.

If step 1108 determines that a transmission error was not detected, then a next step 1112 includes outputting/releasing a reconstructed sub-codevector produced by the inverse sub-quantization in step 1106.

Returning again to step 1104, if an illegal space is not associated with the selected inverse sub-quantizer, then flow proceeds from step 1104 to a step 1114. Step 1114 includes sub-quantization without an illegal space. Flow proceeds from step 1114 to step 1112.

Flow proceeds from step 1112 to a step 1116. Step 1116 includes determining whether any of the inverse sub-quantizers in the composite inverse quantizer have not yet been selected. If all of the inverse sub-quantizers have been selected (and subsequently processed), then method 1100 ends. Otherwise, flow proceeds to a step 1118. Step 1118 includes selecting a next one of the inverse sub-quantizers.

FIG. 12 is a flowchart of an example method 1200 of inverse sub-quantization with an illegal space, performed by an inverse sub-quantizer. Method 1200 expands on step 1106 of method 1100.

A first step 1202 includes reconstructing a sub-codevector from a received sub-index.

A next step 1204 includes transforming the reconstructed sub-codevector into a transformed codevector. This step may include combining the reconstructed sub-codevector with one or more other vectors (for example, adding/subtracting other vectors to the reconstructed sub-codevector).

Next steps 1206 and 1208 together include determining whether the transformed codevector is illegal, or alternatively, legal, based on an illegal space that is defined in the domain of the transformed codevector. If the transformed codevector is illegal, then a next step 1210 includes declaring a transmission error.

c. Illegal Space for LSF Parameters, and Quantizer Complexity

For the LSF parameters a natural illegal space exists. It is a common requirement that the synthesis filter given by Eq. 9 represents a stable filter. Accordingly, it is a requirement that the LSF parameters are ordered, and thus, fulfil Eq. 13. In popular quantization of the input set of LSF parameters, $$\underline{\omega}=[\omega(1), \omega(2), \ldots, \omega(K)], \tag{40}$$

it is common to simply re-order the LSF parameters if a decoded set of LSF parameters, $$\begin{aligned}\underline{\hat{\omega}}_d &= [\hat{\omega}_d(1), \hat{\omega}_d(2), \ldots, \hat{\omega}_d(K)] \\ &= Q^{-1}[I_d] \\ &= Q^{-1}[T[I_e]],\end{aligned} \tag{41}$$

is disordered. Furthermore, often a minimum spacing is imposed on the LSF parameters and reflects the typical minimum spacing in the unquantized LSF parameters, $\underline{\omega}$. The re-ordering and/or spacing results in the final decoded set of LSF parameters denoted $$\underline{\hat{\omega}}_{df}=[\hat{\omega}_{df}(1), \hat{\omega}_{df}(2), \ldots, \hat{\omega}_{df}(K)] \tag{42}$$

In order to maintain the encoder and decoder synchronous such an ordering and/or spacing is also performed at the encoder, i.e. after quantization at the encoder. The LSF parameters at the encoder after quantization are denoted $$\underline{\hat{\omega}}_e=[\hat{\omega}_e(1),\hat{\omega}_e(2), \ldots, \hat{\omega}_e(K)] \tag{43}$$

and are given by $$\underline{\hat{\omega}}_e=Q^{-1}[I_e=Q[\omega]]. \tag{44}$$

The LSF parameters at the encoder after re-ordering and/or spacing are denoted $$\underline{\hat{\omega}}_{ef}=[\hat{\omega}_{ef}(1), \hat{\omega}_{ef}(2), \ldots, \hat{\omega}_{ef}(K)]. \tag{45}$$

The encoder-decoder synchronized operation of re-ordering and/or spacing is required since a complex quantizer structure does not necessarily result in an ordered set of LSF parameters even if the unquantized set of LSF parameters are ordered and properly spaced.

Due to the natural ordering and spacing of the LSF parameters a suitable illegal space, $Q_{1ll}$, can be defined as $$\Omega_{1ll}=\{\underline{\omega}|\omega(1)<\Delta(1) \vee \omega(2)-\omega(1)<\Delta(2) \vee \ldots \vee \omega(K)-\omega(K-1)<\Delta(k) \vee \pi-\omega(K)<\Delta(K+1)\}, \tag{46}$$

where $$\underline{\Delta}=(\Delta(1), \Delta(2), \ldots, \Delta(K+1)) \tag{47}$$

specifies the minimum spacing. In some cases it is advantageous to define the illegal space of the LSF parameters according to the ordering and spacing property of only a subset of the pairs, i.e.

$$\Omega_{ill}=\{\underline{\omega}|\omega(k_1)-\omega(k_1-1)<\Delta(k_1) \vee \omega(k_2)-\omega(k_2-1)<\Delta(k_2) \vee \ldots \vee \omega(k_L)-\omega(k_L-1)<\Delta(k_L)\}. \tag{48}$$

where $$1\leqq k_1\neq k_2\neq \ldots \neq k_L\leqq K+1, \tag{49}$$

$$\omega(0)=0, \tag{50}$$

and $$\omega(K+1)=\pi. \tag{51}$$

The number of pairs that are subject to the minimum spacing property in the definition of the illegal space in Eq. 48 is given by L. Evidently, the probability of detecting transmission errors will decrease when fewer pairs are subject to the minimum spacing property. However, there may be quantizers for which the resolution is insufficient to provide a non-empty set of legal codevectors with sufficiently high probability due to the inclusion of certain pairs. In such cases it may be advantageous to include only a subset of the pairs in the definition of the illegal space. Furthermore, the computational complexity is proportional with the number of pairs in the definition of the illegal space, see Eq. 61, Eq. 62, and Eq. 64. Consequently, it is also a tradeoff between increasing the error-detection capability and limiting the computational complexity. Furthermore, it is worth noting that in some cases certain pairs are more prone to violate the minimum spacing property due to transmission errors than other pairs.

Mathematical considerations suggest a minimum spacing of zero simplifying the definition of the illegal space of Eq. 48 to $$\Omega_{ill}=\{\underline{\omega}|\omega(k_1)-\omega(k_1-1)<0 \vee \omega(k_2)-\omega(k_2-1)<0 \vee \ldots \vee \omega(k_L)-\omega(k_L-1)<0\}. \tag{52}$$

However, in practice the minimum spacing of the input LSF parameters is typically greater than zero, and the expansion of the illegal space given by Eq. 48 may prove advantageous, increasing the probability of detecting transmission errors. The proper minimum spacing, A, defining the illegal space, can be determined based on an empirical analysis of the minimum spacing of the input LSF parameters in conjunction with a compromise between increasing the probability of detecting transmission errors and degrading the performance for error-free transmission. Generally, a minimum spacing of zero should have little, if any, impact to the performance of the quantizer under error-free conditions. As the minimum spacing is increased towards the empirical minimum spacing and beyond, some degradation to the performance under error-free conditions should be expected. This will, to some extent, depend on the quantizer.

An LSF quantizer according to Eq. 32 with an illegal space defined according to Eq. 48 will enable the detection of transmission errors that map codevectors into the illegal space. In practice the search of the quantizer in Eq. 32 will typically be conducted according to $$\begin{aligned}\underline{c}_{I_e} &= Q[\underline{x}] \\ &= \underset{\underline{c}_n\in\{C\cap \overline{X}_{ill}\}}{\arg\min}\{d(\underline{x}, \underline{c}_n)\}.\end{aligned} \tag{53}$$

Consequently, for a candidate codevector it is necessary to verify if it belongs to the illegal space in addition to evaluating the error criterion. This process will increase the computational complexity of the quantization. In order to develop low complexity methods the quantization process of Eq. 53 is analyzed in detail. The quantizer of Eq. 53, Q[•], represents any composite quantizer, and according to Eq. 19, the composite codevectors, $\underline{c}_n$, are of the form $$\underline{c}_n = F(\underline{c}_{n_1}, \underline{c}_{n_2}, \ldots \underline{c}_{n_M}). \tag{54}$$

At any given sub-quantization, $Q_m[\bullet]=Q_1[\bullet], Q_2[\bullet], \ldots Q_M[\bullet]$, of the composite quantizer, Q[•], the composite codevector as a function of the sub-quantization, $Q_m[\bullet]$, can be expressed as $$\underline{c}_{n,m} = \underline{z} + \underline{c}_{n_m}, \tag{55}$$

where $\underline{c}_{n_m} \in C_m$ and $\underline{z}$ accounts for other components of the composite codevector. This could include components such as a mean component, and/or a predicted component, and/or component(s) of sub-quantizer(s) of previous stage(s). Utilizing the expressions of Eq. 55 and Eq. 53, the process of performing the sub-quantization, $Q_m[\bullet]$, while applying the illegal space to the composite codevector, $\underline{c}_{n,m}$, i.e. in the domain of the LSF parameters, can be expressed as $$\begin{aligned}\underline{c}_{l_{e,m}} &= Q_m[\underline{x}] \\ &= \underset{\underline{c}_{n_m} \in \{\underline{c} \mid \underline{c} \in C_m, (\underline{z}+\underline{c}) \notin \Omega_{ill}\}}{\arg\min} \{d(\underline{x}, (\underline{z}+\underline{c}_{n_m}))\},\end{aligned} \tag{56}$$

and the intermediate composite codevector after the sub-quantization, $Q_m[\bullet]$, is given by $$\underline{c}_{l_e,m} = \underline{z} + \underline{c}_{l_{e,m}}. \tag{57}$$

Eq. 56 demonstrates how the illegal space in the domain of the composite codevector can be applied to any sub-quantization, $Q_m[\bullet]$ in the quantization. The decoder can then detect transmission errors based on the inverse sub-quantization, $Q_m^{-1}[\bullet]$, according to $$(\underline{z} + \underline{c}_{l_{dm}}) \in \Omega_{ill} \Rightarrow \underset{error}{T}[\cdot]. \tag{58}$$

In principle, an illegal space can be applied to an arbitrary number of sub-quantizations enabling detection of transmission errors at the decoder based on verification of the intermediate composite codevector after multiple inverse sub-quantizations.

It should be noted that $$\begin{aligned}\underline{c}_{l_e} &= \underline{c}_{l_e,M} \\ &= \underline{z} + \underline{c}_{l_{e,M}},\end{aligned} \tag{59}$$

i.e. the final composite codevector is equivalent to the intermediate composite codevector after the $M^{th}$ sub-quantization, $Q_M[\bullet]$.

According to Eq. 56 the process of verifying if a candidate sub-codevector, $\underline{c}_{n_m}$, of sub-quantization, $Q_m[\bullet]$ results in an intermediate composite codevector, $\underline{c}_{n,m}$, that does not belong to the illegal space, $\Omega_{ill}$, of Eq. 48, involves evaluating the following logical expression:

$$b = \underline{c}_{n,m} \notin \Omega_{ill} \tag{60}$$

-continued $$\begin{aligned}&= c_{n,m}(k_1) - c_{n,m}(k_1 - 1) \geq \Delta(k_1) \wedge c_{n,m}(k_2) - c_{n,m}(k_2 - 1) \geq \\ &\quad \Delta(k_2) \wedge \ldots \wedge c_{n,m}(k_L) - c_{n,m}(k_L - 1) \geq \Delta(k_L) \\ &= \prod_{l=1}^{L} (c_{n,m}(k_l) - c_{n,m}(k_l - 1) \geq \Delta(k_l))\end{aligned}$$

where Π denotes logical "and" between the elements. Including the calculation of the necessary values of $\underline{c}_{n,m}$, it requires $$\begin{aligned}F_{\Delta\neq 0,m} &= N_m((L+1) + L\cdot 2) \\ &= N_m(3\cdot L + 1)\end{aligned} \tag{61}$$

floating point operations to evaluate the verification for all sub-codevectors of a sub-quantizer, $Q_m[\bullet]$, of size $N_m$. However, if the illegal space is defined according to Eq. 52, minimum spacing of zero, the verification of the candidate sub-codevectors requires $$\begin{aligned}F_{\Delta=0,m} &= N_m((L+1) + L) \\ &= N_m(2\cdot L + 1) \\ &\approx \frac{2}{3}\cdot F_{\Delta\neq 0,m}\end{aligned} \tag{62}$$

floating point operations for a sub-quantizer, $Q_m[\bullet]$. Consequently, using the minimum spacing of zero will require less complexity. With the use of Eq. 55, the verification process of Eq. 60 can be expanded as follows $$\begin{aligned}b &= \prod_{l=1}^{L} (c_{n,m}(k_l) - c_{n,m}(k_{l-1}) \geq \Delta(k_l)) \\ &= \prod_{l=1}^{L} ((z(k_l) + c_{n_m}(k_l)) - (z(k_l - 1) + c_{n_m}(k_l - 1)) \geq \Delta(k_l)) \\ &= \prod_{l=1}^{L} ((z(k_l) - z(k_l - 1)) + (c_{n_m}(k_l) - c_{n_m}(k_l - 1) - \\ &\quad \Delta(k_l)) \geq 0)\end{aligned} \tag{63}$$

In Eq. 63 the L terms of $(z(k_1)-z(k_1-1))$ can be pre-calculated outside the search loop, and the L terms of $(c_{n_m}(k_1)-c_{n_m}(k_1-1)-\Delta(k_1))$ for each sub-codevector, $\underline{c}_{n_m}$ $n_m=1, 2, \ldots N_m$, are constant and can be pre-stored. This approach requires $$\begin{aligned}F_{ps,m} &= L + N_m\cdot L \\ &= L\cdot(N_m + 1) \\ &\approx \frac{1}{3}\cdot F_{\Delta\neq 0,m} \\ &\approx \frac{1}{2}\cdot F_{\Delta\neq 0,m}\end{aligned} \tag{64}$$

floating point operations regardless of a zero or non-zero minimum spacing. In summary, the latter approach requires the least computational complexity. However, it requires an additional memory space for storage of $$M_{ps,m}=N_m \cdot L \quad (65)$$

constant numbers, typically in Read Only Memory (ROM).

For simplicity, the complexity estimates of Eq. 61, Eq. 62, and Eq. 64 assume thatL adjacent pairs are checked. If non-neighboring pairs are checked the expressions will change but the relations between the methods in terms of complexity will remain unchanged.

The optimal compromise between computational complexity and memory usage typically depends on the device on which the invention is implemented.

FIG. 13 is a flowchart of an example method 1300 of quantization with an illegal space, performed by a sub-quantizer for sub-quantizing LSF parameters (that is, performed by an LSF sub-quantizer). For example, method 1300 quantizes an input vector $\underline{r}_{1,1}$, Eq. 76, in accordance with Eq. 85. Method 1300 is similar in form to method 1000.

An initial step 1301 includes forming a current approximation of LSF parameters, for example in accordance with Eq. 84 or Eq. 134. The remaining steps of method 1300 are identified by reference numbers increased by 300 over the reference numbers that identify corresponding method steps in method 1000. Step 1306 of method 1300 corresponds to both steps 1006 and 1006*a* in method 1000.

Step 1320 of method 1300 includes transforming the sub-codevector chosen for processing at step 1302 (or step 1314) to a domain of LSF parameters. As an example, step 1320 includes calculating a candidate approximation of LSF parameters as a sum of the sub-codevector and the current approximation of LSF parameters (from step 1301). For example, in accordance with Eq. 83, Eq. 133, or in general Eq. 55.

Next step 1306 includes determining whether the candidate approximation of LSF parameters is legal, for example, using the illegal space defined by Eq. 87, or Eq. 140. This includes determining whether the LSF parameters in the candidate approximation correspond to (for example, belong to) the illegal space that is in the domain of the LSF parameters.

FIG. 14 is a flowchart of an example method 1400 of inverse sub-quantization with an illegal space, performed by an inverse LSF sub-quantizer. Method 1400 is similar to method 1200. The steps of method 1400 are identified by reference numerals increased by 200 over the reference numerals identifying corresponding steps of method 1200.

A first step 1402 includes reconstructing a sub-codevector from a received sub-index. A next step 1404 includes reconstructing a new approximation of LSF parameters as a sum of the reconstructed sub-codevector and a current approximation of LSF parameters.

A next step 1406 (corresponding to steps 1206 and 1208 together, in method 1200) includes determining whether the reconstructed new approximation of LSF parameters is illegal based on the illegal space that is in the domain of LSF parameters.

If the new approximation of LSF parameters is illegal, then a next step 1410 includes declaring a transmission error.

3. Example Wideband LSF System

A specific application of the invention to the LSF VQ in a wideband LPC system is described in detail.

a. Encoder LSF Quantizer

FIG. 15 is a block diagram of an example LSF quantizer 1500 at an encoder. Quantizer 1500 includes the following functional blocks: a plurality of signal combiners 1502*a*-1502*d*, which may be adders or subtractors; an 8th order MA predictor 1504 coupled between combiners 1502*b* and 1502*d*; a regular 8-dimentional MSE sub-quantizer 1506 coupled between combiners 1502*b* and 1502*c*; a vector splitter 1508 following combiner 1502*c*; a 3-dimensional WMSE sub-quantizer with illegal space 1510; and a regular 5-dimensional WMSE sub-quantizer 1512 both following vector splitter 1508; a sub-vector appender 1514 coupled to outputs of both sub-quantizers 1510 and 1512, and having an output coupled to combiner 1502*d*.

Quantizer 1500 (also referred to as LSF VQ 1500) is a mean-removed, predictive VQ with a two-stage quantization with a split in the second stage. Hence, it has three sub-quantizers (1506, 1510 and 1512). The LSF VQ 1500 receives an $8^{th}$ dimensional input LSF vector, $$\underline{\omega}=[\omega(1), \omega(2), \ldots, \omega(8)], \quad (66)$$

and produces as output the quantized LSF vector $$\underline{\hat{\omega}}_e=[\hat{\omega}_e(1),\hat{\omega}_e(2), \ldots ,\hat{\omega}_e(8)], \quad (67)$$

and the three indices, $I_{e,1}$, $I_{e,2}$, and $I_{e,3}$, of the three sub-quantizers $Q_1[\bullet]$, $Q_2[\bullet]$, and $Q_3[\bullet]$, respectively (that is, sub-quantizers 1506, 1510 and 1512, respectively). The sizes of the three sub-quantizers 1506, 1510 and 1512 are $N_1=128$, $N_2=32$, and $N_3=32$, and require a total of 17 bits. The respective codebooks associated with sub-quantizers 1506, 1510 and 1512, are denoted $C_1$, $C_2$, and $C_3$.

The mean LSF vector is constant and is denoted $$\underline{\overline{\omega}}=[\overline{\omega}(1), \overline{\omega}(2), \ldots, \overline{\omega}(8)]. \quad (68)$$

It is subtracted from the input LSF vector using subtractor 1502*a* to form the mean-removed LSF vector $$\underline{e}_e=\underline{\omega}-\underline{\overline{\omega}}. \quad (69)$$

An $8^{th}$ order MA prediction, produced by predictor 1504, given by $$\tilde{e}_e(k) = \sum_{i=1}^{8} a_{k,i} \cdot \hat{r}_{e,i}(k), \quad (70)$$

is subtracted from the mean-removed LSF vector, by subtractor 1502*b*, to form the residual vector $$\begin{aligned} \underline{r} &= \underline{e}_e - \underline{\tilde{e}}_e \\ &= \underline{\omega} - \underline{\overline{\omega}} - \underline{\tilde{e}}_e. \end{aligned} \quad (71)$$

The residual vector, $\underline{r}$, is subject to quantization according to $$\underline{\hat{r}}_e=Q[\underline{r}]. \quad (72)$$

In Eq. 70 the MA prediction coefficients are denoted $a_{k,i}$, and the index i indicates the previous $i^{th}$ quantization. Consequently, $\hat{r}_{e,i}(k)$ is the $k^{th}$ element of the quantized residual vector at the previous $i^{th}$ quantization. The quantization of the residual vector is performed in two stages with a split in the second stage.

The first stage sub-quantization, performed by sub-quantizer 1506, is performed according to $$\underline{c}_{l_{e,1}} = Q_1[\underline{r}] = \arg\min_{\underline{c}_{n_1}\in C_1}\{d_{MSE}(\underline{r}, \underline{c}_{n_1})\}, \quad (73)$$

where $$d_{MSE}(\underline{x}, \underline{y}) = \sum_k (x(k) - y(k))^2 \quad (74)$$

is the Mean Squared Error (MSE) criterion. The residual (output by subtractor 1502*c*) after the first stage quantization is given by $$\underline{r}_1 = \underline{r} - \underline{c}_{l_{e,1}} = \underline{\omega} - \underline{\overline{\omega}} - \underline{\tilde{e}}_e - \underline{c}_{l_{e,1}}. \quad (75)$$

This residual vector is split, by splitter 1508, into two sub-vectors $$\underline{r}_{1,1} = [r_1(1), r_1(2), r_1(3)] \quad (76)$$

and $$\underline{r}_{1,2} = [r_1(4), r_1(5), r_1(6), r_1(7), r_1(8)]. \quad (77)$$

The two sub-vectors are quantized separately, by respective sub-quantizers 1510 and 1512, according to $$\underline{c}_{l_{e,2}} = Q_2[\underline{r}_{1,1}] \quad (78)$$

and $$\underline{c}_{l_{e,3}} = Q_3[\underline{r}_{1,2}] \quad (79)$$

The final composite codevector (not shown in FIG. 15) is given by $$\underline{\hat{\omega}}_e = \underline{c}_{\{l_{e,1}, l_{e,2}, l_{e,3}\}} = \underline{\overline{\omega}} + \underline{\tilde{e}}_e + \underline{c}_{l_{e,1}} + [\underline{c}_{l_{e,2}}, \underline{c}_{l_{e,3}}]. \quad (80)$$

The elements of the final composite codevector are $$\hat{\omega}_e(k) = \begin{cases} \hat{\omega}_{L,e}(k) = \overline{\omega}(k) + \tilde{e}_e(k) + c_{l_{e,1}}(k) + c_{l_{e,2}}(k) & k = 1, 2, 3 \quad \text{Lower part} \\ \hat{\omega}_{U,e}(k) = \overline{\omega}(k) + \tilde{e}_e(k) + c_{l_{e,1}}(k) + c_{l_{e,3}}(k) & k = 4, 5, 6, 7, 8 \quad \text{Upper part} \end{cases}. \quad (81)$$

The sub-quantization, $Q_2[\bullet]$, of the lower split sub-vector $\underline{r}_{1,1}$ (that is, the sub-quantization performed by sub-quantizer 1510) is subject to an illegal space in order to enable detection of transmission errors at the decoder. The illegal space is defined in the domain of the LSF parameters as $$\Omega_{1ll} = \{\underline{\omega} \mid \omega(1) < 0 \vee \omega(2) - \omega(1) < 0 \vee \omega(3) - \omega(2) < 0\} \quad (82)$$

affecting only the lower part of the final composite candidate codevectors, $$c_{n,2}(k) = \overline{\omega}(k) + \tilde{e}_e(k) + c_{l_{e,1}}(k) + c_{n_2}(k) \quad (83)$$

-continued $$= z(k) + c_{n_2}(k),$$

where $$z(k) = \overline{\omega}(k) + \tilde{e}_e(k) + c_{l_{e,1}}(k). \quad (84)$$

The illegal space defined by Eq. 82 comprises all LSF vectors for which any of the three lower pairs are out order. According to Eq. 56 the quantization, $Q_2[\bullet]$, is expressed as $$\underline{c}_{l_{e,2}} = Q_2[\underline{r}_{1,1}] = \arg\min_{\underline{c}_{n_2}\in\{\underline{c} \mid \underline{c}\in C_2, (\underline{z}+\underline{c})\notin\Omega_{ill}\}} \{d_{WMSE}(\underline{r}_{1,1}, \underline{c}_{n_2})\}, \quad (85)$$

where $$d_{WMSE}(\underline{x}, \underline{y}) = \sum_k w(k)\cdot(x(k) - y(k))^2 \quad (86)$$

is the Weighted Mean Squared Error (WMSE) criterion. The weighting function $\underline{w}$ is typically introduced to obtain an error criterion that correlates better with the perception of the human auditory system than the MSE criterion. For the quantization of the spectral envelope, such as represented by the LSFs, this typically involves weighting errors in high-energy areas of the spectral envelope stronger than areas of low energy. Such a weighting function can advantageously be derived from the input LSF vector, or corresponding prediction coefficient vector, and thus changes from one input vector to the next. In Eq. 85 it should be noted that the error criterion is in the domain of the sub-codevector, and not in the domain of the composite codevector as in Eq. 56. Combination of Eq. 60 and Eq. 82 leads to the following expression for verification that a given sub-codevector, $\underline{c}_{n_2}$, does not result in a final composite candidate codevector, $\underline{c}_{n,2}$, that belongs to the illegal space, $\Omega_{1ll}$:

$$b = \underline{c}_{n,2} \notin \Omega_{ill} = c_{n,2}(1) \geq 0 \wedge c_{n,2}(2) - c_{n,2}(1) \geq 0 \wedge c_{n,2}(3) - c_{n,2}(2) \geq 0 \quad (87)$$

-continued $$= (z(1) + c_{n_2}(1)) \geq 0 \wedge (z(2) + c_{n_2}(2)) - (z(1) + c_{n_2}(1)) \geq 0 \wedge (z(3) + c_{n_2}(3)) - (z(2) + c_{n_2}(2)) \geq 0.$$

This expression is evaluated along with the WMSE in order to select the sub-codevector, $\underline{c}_{l_{e2}}$, that minimizes the WMSE and provides a final composite codevector that does not belong to the illegal space. If no candidate sub-codevector can provide a final composite candidate vector that does not belong to the illegal space, then, in an arrangement of quantizer 1500, the optimal sub-codevector is selected disregarding (that is, independent of) the illegal space.

The sub-quantization, $Q_3[\bullet]$, of the upper split sub-vector, $\underline{r}_{1,2}$ (that is, the sub-quantization performed by sub-quantizer 1512), is given by $$\underline{c}_{I_{e,3}} = Q_3[\underline{r}] = \arg\min_{\underline{c}_{n_3} \in C_3} \{ d_{WMSE}(\underline{r}_{1,2}, \underline{c}_{n_3}) \}. \quad (88)$$

The memory of the MA predictor 1504 is updated with $$\hat{\underline{r}}_e = \underline{c}_{I_{e,1}} + [\underline{c}_{I_{e,2}}, \underline{c}_{I_{e,3}}], \quad (89)$$

and a regular ordering and spacing procedure is applied to the final composite codevector, $\hat{\underline{\omega}}_e$, given by Eq. 80 in order to properly order, in particular the upper part, and space the LSF parameters.

The three indices $I_{e,1}$, $I_{e,2}$, and $I_{e,3}$, of the three sub-quantizers, $Q_1[\bullet]$ (1506), $Q_2[\bullet]$ (1510), and $Q_3[\bullet]$ (1512), are transmitted to the decoder providing the three indices $I_{d,1}$, $I_{d,2}$, and, $I_{d,3}$, at the decoder:

$$\{I_{d,1}, I_{d,2}, I_{d,3}\} = T\{\{I_{e,1}, I_{e,3}, I_{e,3}\}\} \quad (90)$$

Figure 15A:
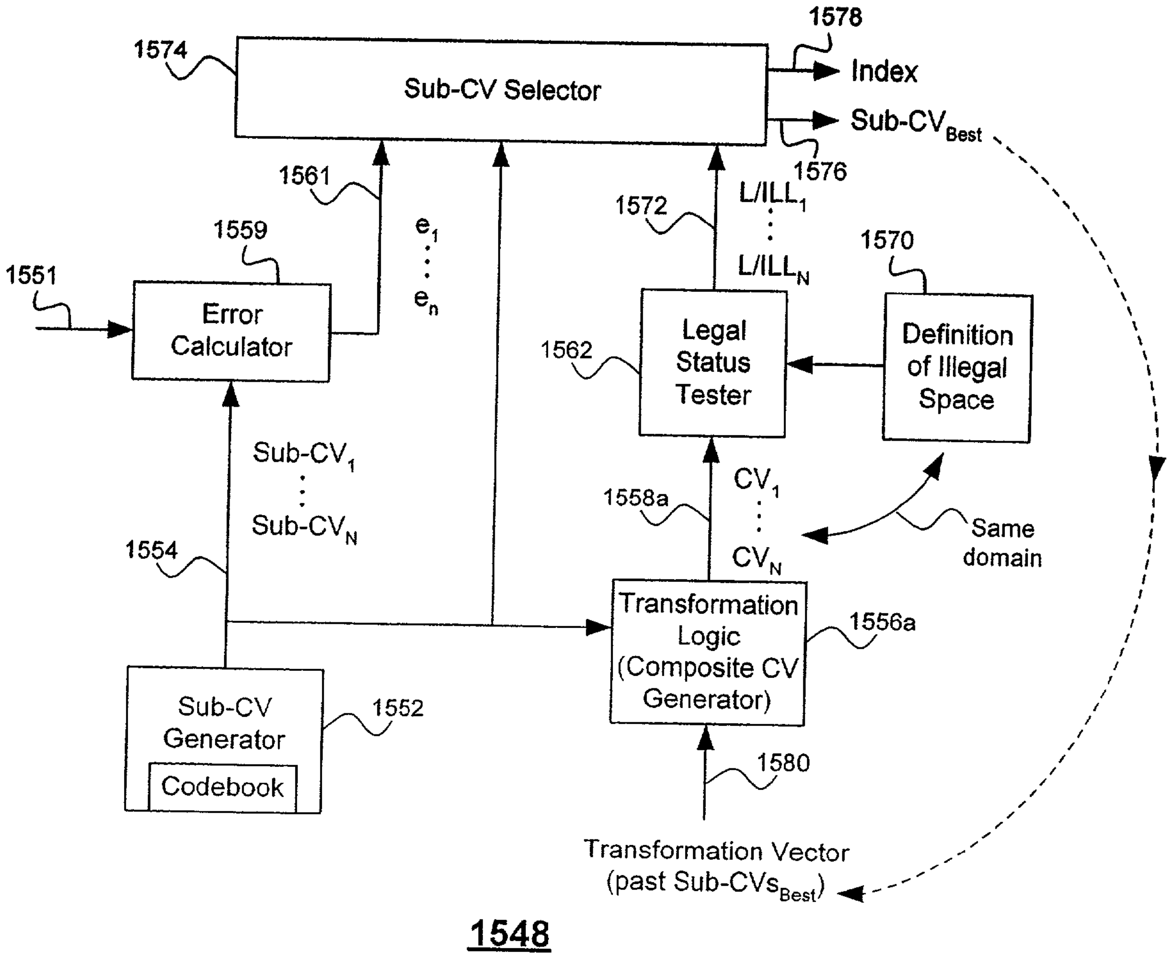
FIG. 15A is a block diagram of an example generalized sub-quantizer.

The LSF sub-quantization techniques discussed above in connection with FIG. 15 can be presented in the context of a generalized sub-quantizer for sub-quantizing an input vector, for example. FIG. 15A is a block diagram of an example generalized sub-quantizer 1548. Sub-quantizer 1548 has a general form similar to that of quantizer 430 discussed in connection with FIG. 4A, except a sub-codevector generator 1552 and a transformation logic module 1556*a* in sub-quantizer 1548 replace codebook 402 and composite codevector generator 406*a* of quantizer 430, respectively.

Sub-codevector generator 1552 generates a candidate sub-codevector sub-$CV_1$. Generator 1552 may generate the candidate sub-codevector based on one or more codebook vectors stored in a codebook. Alternatively, the sub-codevector may be a codebook vector, similar to the arrangement of FIG. 4B.

Transformation logic module 1556*a* transforms candidate sub-codevector sub-$CV_1$ into a corresponding candidate codevector $CV_1$. In an arrangement of sub-quantizer 1548, the transforming step includes separately combining a transformation vector 1580 with the candidate sub-codevector sub-$CV_1$, thereby generating candidate codevector $CV_1$. Transformation logic module 1556*a* may be part of a composite codevector generator, as in the arrangement depicted in FIG. 4B.

Legal status tester 1562 determines the legal status of candidate codevector $CV_1$ using illegal space definition(s) 1570, to generate a legal/illegal indicator $L/Ill_1$.

Error Calculator 1559 generates an error term $e_1$ corresponding to candidate sub-codevectors sub-$CV_1$. Error term $e_1$ is a function of candidate sub-codevector sub-$CV_1$ and input vector 1551. From the above, it can be appreciated that candidate sub-$CV_1$ corresponds to each of (1) error term $e_1$, (2) candidate $CV_1$, and (3) indicator $L/Ill_1$.

Sub-codevector generator 1552 generates further candidate sub-codevectors sub-$CV_{2 \ldots N}$, and in turn, transformation logic 1556*a*, legal status tester 1562, and error calculator 1559 repeat their respective functions in correspondence with each of candidate sub-codevectors sub-$CV_{2 \ldots N}$. Thus, sub-quantizer 1548 generates a set of candidate sub-codevectors sub-$CV_{1 \ldots N}$ (singly and collectively referred to as sub-codevector(s) 1554). In correspondence with candidate sub-codevectors sub-$CV_{1\ N}$, sub-quantizer 1548 generates: a set of candidate codevectors $CV_{1 \ldots N}$ (singly and collectively referred to as candidate codevector(s) 1558*a*); a set of legal/illegal indicators $I/Ill_{1 \ldots N}$ (singly and collectively referred to as indicators 1572); a set of error terms $e_{1 \ldots N}$ (singly and collectively referred to as error term(s) 1561).

Sub-quantizer 1548 determines legality in the domain of the candidate codevectors 1558*a*, and determines error terms in the domain of the candidate sub-codevectors 1554. More generally, a sub-quantizer may determine legality in a first domain (for example, the domain of the candidate codevectors 1558*a*), and determine error terms in a second domain different from the first domain (for example, in the domain of the candidate sub-codevectors 1554).

Sub-codevector selector 1574 receives error terms 1561, candidate sub-codevectors 1554, and legal/illegal indicators 1572. Based on all of these inputs, selector 1524 determines a best sub-codevector 1576 (indicated as Sub-$CV_{Best}$) (and its index 1578) among the candidate sub-codevectors 1554 corresponding to a legal one of codevectors 1558*a* and a best one of error terms 1561. In an arrangement, only error terms corresponding to sub-codevectors corresponding to legal codevectors are considered. For example, sub-$CV_1$ may be selected as the best sub-codevector, if $CV_1$ is legal and error term $e_1$ is better than any other error terms corresponding to sub-codevectors corresponding to legal codevectors.

In an arrangement, transformation vector 1580 may be derived from one or more past, best sub-codevectors Sub-$CV_{Best}$.

Determining legality and error terms in different domains leads to an "indirection" between sub-codevectors and legality determinations. This is because a best sub-codevector is chosen based on error terms corresponding directly to the candidate sub-codevectors, and based on legality determinations that correspond indirectly to the sub-codevectors. That is, the legality determinations do not correspond directly to the sub-codevectors. Instead, the legality determinations correspond directly to the candidate codevectors (which are determined to be legal or illegal), and the candidate codevectors correspond directly to the sub-codevectors, through the transformation process performed at 1556*a*.

b. Decoder Inverse LSF Quantizer

FIG. 16 is a block diagram of an example inverse LSF quantizer 1600 at a decoder.

Inverse quantizer 1600 includes a regular 8-dimensional inverse sub-quantizer 1602, 3-dimensional inverse sub-quantizer 1604 with illegal space in the domain of the final reconstructed LSF vector (also referred to as "inverse sub-quantizer 1604 with illegal space"), and a regular 5-dimensional inverse sub-quantizer 1606. Quantizers 1602, 1604, and 1606 receive respective indices $I_{d,1}$, $I_{d,2}$, and $I_{d,3}$. In response to these received indices, quantizers 1602-1606 produce respective sub-codevectors. Quantizer 1600 also includes a combiner 1608 coupled to a sub-vector appender 1610. Combiner 1608 and appender 1610 combine and append sub-codevectors in the manner depicted in FIG. 16 to produce a reconstructed residual vector 1612.

Quantizer 1600 further includes first and second switches or selectors 1620*a* and 1620*b* controlled in response to a transmission error indicator signal 1622. Quantizer 1600 further includes an 8th order MA predictor 1624, a plurality of combiners 1626*a*-1626*c*, which may be adders or subtractors, an error concealment module 1628, and an illegal status tester 1630.

In FIG. 16, MA predictor 1624 generates a predicted vector 1632 based on past reconstructed residual vectors. Combiners 1626*a* and 1626*b* together combine predicted vector 1632, a mean LSF vector 1634, and reconstructed residual vector 1612, to produce a reconstructed LSF codevector 1636, which is a composite codevector. Legal status tester 1630 determines whether reconstructed LSF codevector 1636 is legal using an illegal space. The illegal space includes an illegal codevector criterion defining an illegal ordering property of the lower three LSF pairs in a codevector.

Inverse sub-quantizer 1604 with illegal space includes inverse sub-quantizer 1604 in combination with illegal status tester 1630, and in further combination with the illegal space definition(s) associated with tester 1630. Inverse sub-quantizer 1604 with illegal space corresponds to sub-quantizer 1510 with illegal space, discussed above in connection with FIG. 15.

If reconstructed codevector 1636 is legal, then illegal status tester 1630 generates a negative transmission error indicator (indicating no transmission error has been identified) and switches 1620*a* and 1620*b* are in their left position, routing 1636 to 1642 and 1612 to 1624, respectively.

Else, if reconstructed codevector 1636 is illegal, then illegal status tester 1630 generates a positive transmission error indicator (indicating a transmission error has been identified) and switches 1620*a* and 1620*b* are in their right position, routing 1640 to 1642 and 1644 to 1624, respectively. Concealment module 1628 generates the alternative output vector 1640 to be used as an alternative to reconstructed LSF codevector 1636 (that has been declared illegal by tester 1630). The alternative reconstructed LSF codevector may be a past, legal reconstructed LSF codevector. The alternative vector 1644 to update the MA predictor memory is obtained by subtracting the mean and predicted vectors from the alternative reconstructed LSF codevector 1640 in subtractor 1626*c*.

From the received indices $I_{d,1}$, $I_{d,2}$, and $I_{d,3}$ the inverse quantization, performed by inverse quantizer 1600, generates the composite codevector 1636 (reconstructed LSF codevector) at the decoder as $$\begin{aligned}\hat{\omega}_d &= \underline{c}_{\{I_{d,1},I_{d,2},I_{d,2}\}} \\ &= \underline{\overline{\omega}} + \underline{\tilde{e}}_d + \underline{c}_{I_{d,1}} + \left[\underline{c}_{I_{d,2}}, \underline{c}_{I_{d,3}}\right],\end{aligned} \tag{91}$$

where $$\tilde{e}_d(k) = \sum_{t=1}^{8} a_{k,i} \cdot \hat{r}_{d,t}(k). \tag{92}$$

The composite codevector, $\underline{\hat{\omega}}_d$, is subject to verification, at legal status tester 1630, according to $$\begin{aligned}b &= \hat{\omega}_d \notin \Omega_{ill} \\ &= \hat{\omega}_d(1) \geq 0 \wedge \hat{\omega}_d(2) - \hat{\omega}_d(1) \geq 0 \wedge \hat{\omega}_d(3) - \hat{\omega}_d(2) \geq 0\end{aligned} \tag{93}$$

which is the decoder equivalence of Eq. 87. If the composite codevector 1636 is not a member of the illegal space, i.e. b=true, the composite codevector is accepted, and the memory of the MA predictor 1624 is updated with $$\underline{\hat{r}}_d = \underline{c}_{I_{d1}} + [\underline{c}_{I_{d2}}, \underline{c}_{I_{d3}}], \tag{94}$$

and the ordering and spacing procedure of the encoder is applied. Else, if the composite codevector 1636 is a member of the illegal space, i.e. b=false, a transmission error is declared and indicated in signal 1622, and the composite codevector is replaced with the previous composite codevector from module 1628, for example, $\underline{\hat{\omega}}_{d,prev}$, i.e.

$$\underline{\hat{\omega}}_d = \underline{\hat{\omega}}_{d,prev}. \tag{95}$$

Furthermore, the memory of the MA predictor 1624 is updated with $$\underline{\hat{r}}_d = \underline{\hat{\omega}}_{d,prev} - \underline{\overline{\omega}} - \underline{\tilde{e}}_d \tag{96}$$

as opposed to Eq. 94.

4. WMSE Search of a Signed VQ a. General Efficient WMSE Search of a Signed VQ

This section presents an efficient method to search a signed VQ using the WMSE (Weighted Mean Squared Error) criterion. The weighting in WMSE criterion is typically introduced in order to obtain an error criterion that correlates better with the perception of the human auditory system than the MSE criterion, and hereby improve the performance of the VQ by selecting a codevector that is perceptually better. The weighting typically emphasizes perceptually important feature(s) of the parameter(s) being quantized, and often varies from one input vector to the next. First a signed VQ is defined, and secondly, the WMSE criteria to which the method applies are described. Subsequently, the efficient method is described.

The effectiveness of the methods is measured in terms of the floating point DSP-like operations required to perform the search, and is referred as floating point operations. An Addition, a Multiply, and a Multiply-and-Accumulate are all counted as requiring 1 operation.

A size N (total of N possible codevectors) signed VQ of dimension K is defined as a product code of two codes, referred as a sign-shape code.

The two codes are a 2-entry scalar code, $$C_{sign} = \{+1, -1\}, \tag{97}$$

and a N/2-entry $K^{th}$ dimensional code, $$\underline{C}_{shape} = \{\underline{c}_1, \underline{c}_2, \ldots, \underline{c}_{N/2}\}, \tag{98}$$

where $$\underline{c}_n = [c_n(1), c_n(2), \ldots, c_n(K)]. \tag{99}$$

The product code is then given by $$C = C_{sign} \times C_{shape}, \tag{100}$$

and the N possible codevectors are defined by $$\underline{c}_{n,s} = s \cdot \underline{c}_n,\ s \in C_{sign},\ \underline{c}_n \in C_{shape} \tag{101}$$

The efficient method applies to the popular WMSE criterion of the form $$d(\underline{x}, \underline{y}) = (\underline{x} - \underline{y}) \cdot \underline{\underline{W}} \cdot ((\underline{x} - \underline{y})^T, \tag{102}$$

where the weighting matrix, $\underline{\underline{W}}$, is a diagonal matrix. With that constraint the error criterion of Eq. 102 reduces to $$d(\underline{x}, \underline{y}) = \sum_{k=1}^{K} w(k) \cdot (x(k) - y(k))^2, \tag{103}$$

where the weighting vector, $\underline{w}$, contains the diagonal elements of the weighting matrix, $\underline{\underline{W}}$. The efficient method also applies to the common, very similar error criterion defined by $$d(\underline{x}, \underline{y}) = \sum_{k=1}^{K} (w(k) \cdot (x(k) - y(k)))^2. \tag{104}$$

In general, the search of a VQ defined by a set of codevectors, the code, C, involves finding the codevector, $\underline{c}_{n_{opt}}$, that minimizes the distance to the input vector, $\underline{x}$, according to some error criterion, $d(\underline{x},\underline{y})$:

$$\underline{c}_{n_{opt}} = \underset{\underline{c}_n \in C}{\arg\min}\{d(\underline{x}, \underline{c}_n)\}. \quad (105)$$

For the signed VQ the search involves finding the optimal sign, $s_{opt} \in C_{sign}$, and optimal shape vector, $\underline{c}_{n_{opt}} \in C_{shape}$, that provides the optimal joint codevector, $\underline{c}_{n_{opt},s_{opt}}$. This is expressed as $$\underline{c}_{n_{opt},s_{opt}} = \underset{\{\underline{c}_{n,s} = s \cdot \underline{c}_n | (s,\underline{c}_n) \in C_{sign} \times C_{shape}\}}{\arg\min}\{d(\underline{x}, \underline{c}_{n,s})\}. \quad (106)$$

If either of the error criteria of Eq. 103 and Eq. 104 is used the operation of searching the codebook would require $$F_1 = N \cdot K \cdot 3 \quad (107)$$

floating point operations. This is a straightforward implementation of the search given by finding the minimum of the explicit error criterion for each possible codevector.

However, a reduction in floating point operations is possible by exploiting the structure of the signed codebook. For simplicity the search of Eq. 106 is written as $$(s_{opt}, \underline{c}_{n_{opt}}) = \underset{(s,\underline{c}_n) \in C_{sign} \times C_{shape}}{\arg\min}\{d(\underline{x}, s \cdot \underline{c}_n)\}. \quad (108)$$

Without loss of generality the error criterion given by Eq. 104 is used for expansion of the search given by Eq. 108, $$\begin{aligned}(s_{opt}, \underline{c}_{n_{opt}}) &= \underset{(s,\underline{c}_n) \in C_{sign} \times C_{shape}}{\text{argmin}}\left\{\sum_{k=1}^{K} w(k) \cdot (x(k) - s \cdot c_n(k))^2\right\} \quad (109)\\ &= \underset{(s,\underline{c}_n) \in C_{sign} \times C_{shape}}{\text{argmin}}\left\{\sum_{k=1}^{K} (w(k) \cdot x(k)^2 + w(k) \cdot ((-s \cdot c_n(k))^2 - 2 \cdot x(k) \cdot s \cdot c_n(k)))\right\}\\ &= \underset{(s,\underline{c}_n) \in C_{sign} \times C_{shape}}{\text{argmin}}\left\{\sum_{k=1}^{K} w(k) \cdot x(k)^2 + \sum_{k=1}^{K} w(k) \cdot (c_n(k)^2 - 2 \cdot x(k) \cdot s \cdot c_n(k))\right\}\\ &= \underset{(s,\underline{c}_n) \in C_{sign} \times C_{shape}}{\text{argmin}}\left\{\sum_{k=1}^{K} w(k) \cdot x(k)^2 + \sum_{k=1}^{K} w(k) \cdot c_n(k)^2 - s \cdot 2 \cdot \sum_{k=1}^{K} w(k) \cdot c_n(k) \cdot x(k)\right\}\\ &= \underset{(s,\underline{c}_n) \in C_{sign} \times C_{shape}}{\text{argmin}}\{E_w(\underline{x}) + E_w(\underline{c}_n) - s \cdot R_w(\underline{c}_n, \underline{x})\},\end{aligned}$$

where

-continued $$E_w(\underline{x}) = \sum_{k=1}^{K} w(k) \cdot x(k)^2, \quad (110)$$

$$E_w(\underline{c}_n) = \sum_{k=1}^{K} w(k) \cdot c_n(k)^2, \quad (111)$$

and $$R_w(\underline{c}_n, \underline{x}) = 2 \cdot \sum_{k=1}^{K} w(k) \cdot c_n(k) \cdot x(k). \quad (112)$$

In Eq. 109 the error criterion has been expanded into three terms, the weighted energy of the input vector, $E_w(\underline{x})$, the weighted energy of the shape vector, $E_w(\underline{c}_n)$, and the sign multiplied by two times the weighted cross-correlation between the input vector and the shape vector, $R_w(\underline{c}_n,\underline{x})$. The weighted energy of the input vector is independent of the sign and shape vector and therefore remains constant for all composite codevectors. Consequently, it can be omitted from the search, and the search of Eq. 109 is reduced to $$\begin{aligned}(s_{opt}, \underline{c}_{n_{opt}}) &= \underset{(s,\underline{c}_n) \in C_{sign} \times C_{shape}}{\arg\min}\{E_w(\underline{c}_n) - s \cdot R_w(\underline{c}_n, \underline{x})\} \quad (113)\\ &= \underset{(s,\underline{c}_n) \in C_{sign} \times C_{shape}}{\arg\min}\left\{E_w(\underline{c}_n) \overset{s=\pm 1}{\mp} R_w(\underline{c}_n, \underline{x})\right\}\\ &= \underset{(s,\underline{c}_n) \in C_{sign} \times C_{shape}}{\arg\min}\{E(s, \underline{c}_n)\}\end{aligned}$$

while being mathematical equivalent. In Eq. 113 $E(s,\underline{c}_n)$ is denoted the minimization term and is given by $$E(s, \underline{c}_n) = E_w(\underline{c}_n) \overset{s=\pm 1}{\mp} R_w(\underline{c}_n, \underline{x}). \quad (114)$$

From Eq. 113 it is evident that for a given shape vector, $\underline{c}_n$, the sign of the cross-correlation term, $R_w(\underline{c}_n,\underline{x})$, determines which of the two signs, $s=\pm 1$, that will result in a smaller minimization term. Consequently, by examining the sign of the weighted cross-correlation term, $R_w(\underline{c}_n,\underline{x})$, it becomes sufficient to calculate and check the minimization term corresponding to only one of the two signs. If the weighted cross-correlation term is greater than zero, $R_w(\underline{c}_n,\underline{x})>0$, the positive sign, $s=+1$, will provide a smaller minimization term. Vice versa, if the weighted cross-correlation term is less than zero, $R_w(\underline{c}_n,\underline{x})<0$, the negative sign, $s=-1$, will provide a smaller minimization term. For $R_w(\underline{c}_n,\underline{x})=0$ the sign can be chosen arbitrarily since the two minimization terms become identical. Accordingly, the search can be expressed as $$(s_{opt}, \underline{c}_{n_{opt}}) = \underset{(s,\underline{c}_n) \in \{(i,\underline{c}) | \underline{c} \in C_{shape}, i = sgn(R_u(\underline{c}, \underline{x}))\}}{\text{argmin}}\{E_w(\underline{c}_n) - s \cdot R_w(\underline{c}_n, \underline{x})\}, \quad (115)$$

where the function sgn returns the sign of the argument.

Consequently, by arranging the search of a size N signed VQ, sign-shape VQ, according to the present invention it suffices to calculate and check the minimization term of only half, N/2, of the total number of codevectors.

If Eq. 111, Eq. 112, and Eq. 115 are used to calculate $E_w(\underline{c}_n)$ and $R_w(\underline{c}_n,\underline{x})$, respectively, a total of $$F_2 = N/2\cdot(2\cdot K\cdot 2+1) = N\cdot(K\cdot 2+1/2) \tag{116}$$

floating point operations are required to perform the search. However, Eq. 111 and Eq. 112 can be expressed as $$E_w(\underline{c}_n) = \sum_{k=1}^{K} c_{w,n}(k)\cdot c_n(k) \text{ and} \tag{117}$$

$$R_w(\underline{c}_n, \underline{x}) = 2\cdot\sum_{k=1}^{K} c_{w,n}(k)\cdot x(k), \tag{118}$$

respectively, where $$c_{w,n}(k)=w(k)\cdot c_n(k). \tag{119}$$

Using Eq. 115, Eq. 117, Eq. 118, and Eq. 119 to perform the search requires a total of $$F_3 = N/2\cdot(K\cdot 3+1) = N\cdot(K\cdot 3/2+1/2) \approx 1/2\cdot F_1 \tag{120}$$

floating point operations.

The steps of the preferred embodiment are, for each shape vector $\underline{c}_n$, n=1, 2, . . . N/2:

a. Calculate $c_{w,n}(k)$, k=1, 2, . . . K, and $R_w(\underline{c}_n,\underline{x})$, according to Eq. 119, and Eq. 118, respectively.

b. If $R_w(\underline{c}_n,\underline{x})>0$calculate and check the minimization term for the positive sign, i.e. $E(s=+1,\underline{c}_n)$ else calculate and check the minimization term for the negative sign, i.e. $E(s=-1,\underline{c}_n)$.

The term $E_w(\underline{c}_n)$ is calculated according to Eq. 117 under either step a or b above.

FIG. 17A is a flowchart of an example quantization search method 1700. Specifically, method 1700 represents a WMSE search of a signed codebook. For example, method 1700 performs the search in accordance with Eq. 113 or Eq. 115.

The codebook includes:

a shape code, $C_{shape}=\{\underline{c}_1, \underline{c}_2, \ldots, \underline{c}_{N/2}\}$, including N/2 shape codevectors $\underline{c}_n$; and a sign code, $C_{sign}=\{+1,-1\}$, including a pair of oppositely-signed sign values +1 and −1.

Thus, each shape codevector $\underline{c}_n$ can be considered to be associated with:

a positive signed codevector representing a product of the shape codevector $\underline{c}_n$ and the sign value +1; and a negative signed codevector representing a product of the shape codevector $\underline{c}_n$ and the sign value −1.

In other words, the positive and negative signed codevectors associated with each shape codevectors $\underline{c}_n$ each represent a product of the shape codevector $\underline{c}_n$ and a corresponding one of the sign values.

An initial step 1702 includes identifying a first shape codevector to be processed among a set of shape codevectors.

Method 1700 includes a loop for processing the identified shape codevector. A step 1704 includes calculating a weighted energy of the shape codevector, for example, in accordance with Eq. 111.

A next step 1706 includes calculating a weighted cross-correlation term between the shape codevector and an input vector, for example, in accordance with Eq. 112.

A next step 1708 includes determining, based on a sign (or sign value) of the weighted cross-correlation term, a preferred one of the positive and negative signed codevectors associated with the shape codevector. Thus, step 1708 includes determining the sign of the cross-correlation term. A negative cross-correlation term indicates the negative signed codevector is the preferred one of the positive and negative signed codevectors. Alternatively, a positive weighted cross-correlation term indicates the positive signed codevector is the preferred one of the positive and negative signed codevectors.

If the sign of the cross-correlation term is negative, then a next step 1710 includes calculating a minimization term corresponding to the negative signed codevector as the sum of (1) the weighted energy of the shape codevector, and (2) the weighted cross-correlation term. For example, the minimization term is calculated in accordance with Eq. 114.

Alternatively, if the sign of the cross-correlation term is positive, then a next step 1712 includes calculating a minimization term corresponding to the positive signed codevector as the weighted energy of the shape codevector minus the weighted cross-correlation term. For example, the minimization term is calculated in accordance with Eq. 114.

Flow proceeds from both steps 1710 and 1712 to updating step 1714. Step 1714 includes determining whether the minimization term calculated in either step 1710 or step 1712 is better than a current best minimization term.

If the minimization term calculated at step 1710 or 1712 is better than the current best minimization term, then flow proceeds to a next step 1716. At step 1716, the minimization term replaces the current best minimization term, and the preferred signed codevector, determined at step 1708, becomes the current best signed codevector. Flow proceeds to a next step 1718.

Alternatively, if the minimization term calculated at step 1710 or step 1712 is not better than the current best minimization term, than flow proceeds directly from step 1714 to step 1718.

Step 1718 includes determining whether all of the shape codevectors in the shape codebook have been processed. If all of the codevectors in the shape codebook have been processed, then the method is done. If more shape codevectors need to be processed, then a next step 1720 includes identifying the next codevector to be processed in the loop comprising steps 1704-1720, and the loop repeats.

Thus, the loop including steps 1704-1720 repeats for each shape codevector in the set of shape codevectors, thereby determining for each shape codevector a preferred signed codevector and a corresponding minimization term. As the loop repeats, steps 1714 and 1716 together include determining a best signed codevector among the preferred signed codevectors based on their corresponding minimization terms. The best signed codevector represents a quantized vector corresponding to the input vector.

FIG. 17B is a flowchart of a method 1730 of performing a WMSE search of a signed codebook. Method 1730 is similar to method 1700, except method 1730 includes an additional step 1701 included within the search loop. Step 1701 includes calculating a weighted shape codevector, for the shape codevector being processed in the loop, with the weighting function for the WMSE criteria, to produce a weighted shape codevector. For example, in accordance with Eq. 119. Subsequent steps 1704 and 1706 use the weighted shape codevector in calculating the weighted energy and the weighted cross-correlation term.

b. Efficient WMSE Search of a Signed VQ with Illegal Space

The efficient WMSE search method of the previous section provides a result that is mathematically identical to performing an exhaustive search of all combinations of signs and shapes. However, in combination with the enforcement of an illegal space this is not necessarily the case since the sign providing the lower WMSE may be eliminated by the illegal space, and the alternate sign may provide a legal codevector though of a higher WMSE yet better than any alternative codevector. Nevertheless, for some applications checking only the codevector of the sign according to the cross-correlation term as indicated by Eq. 115 provides satisfactory performance and saves significant computational complexity. This search procedure can be expressed as $$\left(s_{opt}, \underline{c}_{n_{opt}}\right) = \underset{(s,\underline{c}_n)\in\left\{(i,\underline{c})\,\middle|\,\underline{c}\in C_{shape}, i=sgn(R_w(\underline{c},\underline{x})), (\underline{z}+i\underline{c})\notin C_{ill}\right\}}{\arg\min} \{E_w(\underline{c}_n) - s\cdot R_w(\underline{c}_n, \underline{x})\}, \tag{121}$$

where is should be noted that the transformation vector, $\underline{z}$, has a similar meaning as in Eq. 55.

This method requires only half of the total number of codevectors to be evaluated, both in terms of WMSE and in terms of membership of the illegal space, compared to an exhaustive search of sign and shape. The flowcharts in FIGS. 18A through 18D are flow chart illustrations of the search procedure, performed in accordance with Eq. 121, for example.

FIG. 18A is a flowchart of an example method 1800 of performing a WMSE search of a signed codebook associated with an illegal space. Method 1800 has the same general form as methods 1700 and 1730, except method 1800 replaces steps 1710, 1712, 1714, and 1716 with corresponding steps 1810, 1812, 1814, and 1816. Step 1810 includes calculating the minimization term as in step 1710. In addition, step 1810 includes determining whether the preferred signed codevector, or a transformation thereof (if $\underline{z}\neq\underline{0}$), does not belong to an illegal space defining illegal vectors. Step 1810 also includes declaring the preferred signed codevector legal when the preferred signed codevector, or a transformation thereof, does not belong to the illegal space. Similarly, step 1812 includes these additional two steps.

Step 1814 includes determining whether the minimization term corresponding to the preferred signed shape codevector is better than the current best minimization term AND whether the preferred signed shape codevector is legal.

If the minimization term is better than the current best minimization term AND the preferred signed shaped codevector is legal, then step 1816 updates (1) the current best minimization term with the minimization term determined at either step 1810 or 1812, and (2) the current best preferred signed shape codevector with the signed codevector determined at step 1708 (that is, corresponding to the minimization term). Otherwise, neither the current best minimization term nor the current best signed codevector is updated.

FIG. 18B is a flowchart of another example method 1818 of performing a WMSE search of a signed codebook with an illegal space. Method 1818 is similar to method 1800 except that method 1818 determines the legal status of the preferred signed codevector at a step 1815, after steps 1710, 1712, and 1714, as depicted in FIG. 18B. Also, method 1818 includes a separate step 1820 following step 1815 to determine whether to update the current best minimization term and the current best preferred signed codevector.

FIG. 18C is a flowchart of another example method 1840 of performing a WMSE search of a signed codebook with an illegal space. Method 1840 is similar to method 1818, except method 1840 reverses the order of determining legality (steps 1815/1820) and determining error terms (1714) compared to method 1818.

FIG. 18D is a flowchart of another example method 1860 of performing a WMSE search of a signed codebook with illegal space. Method 1860 is similar to methods 1800 and 1830, except method 1860 includes steps 1862, 1864, and 1866. Step 1862 includes transforming the preferred signed shape codevector into a transformed codevector that corresponds to the preferred signed codevector, and that is in a domain of the illegal space representing illegal vectors.

A next step 1864 includes determining whether the transformed codevector does not belong to the illegal space defining illegal vectors. Step 1864 also includes declaring the transformed codevector legal when the transformed codevector does not belong to the illegal space.

Next, step 1866 includes determining whether the minimization term calculated in either step 1710 or step 1712 is better than a current best minimization term AND whether the transformed codevector is legal.

If the minimization term is better than the current best minimization term AND the transformed codevector is legal, then process flow leads to step 1816. Step 1816 includes updating the current best signed codevector with the preferred signed codevector determined at step 1708, and updating the current best minimization term with the minimization term determined at step 1710 or 1712.

Methods 1800, 1818, 1840 and 1860 may be performed in any of the quantizers described herein, including sub-quantizers and composite quantizers. Thus, the methods may represent methods of quantization performed by a quantizer and methods of sub-quantization performed by a sub-quantizer that is part of a composite quantizer.

c. Index Mapping of Signed VQ

A signed VQ results in two indices, one for the sign, $I_{e,sign}=\{1,2\}$, and one for the shape codebook, $I_{e,shape}=\{1, 2, \ldots, N/2\}$. The index for the sign requires only one bit while the size of the shape codebook determines the number of bits needed to uniquely specify the shape codevector. The final codevector is often relatively sensitive to a single bit-error affecting only the sign bit since it will result in a codevector in the complete opposite direction, i.e.

$$\begin{aligned}\hat{\underline{x}}_d &= Q^{-1}\left[\underset{sign\text{-}error}{T}[\{I_{e,sign}, I_{e,shape}\}]\right] \\ &= -s_{opt}\cdot\underline{c}_{n_{opt}} \\ &= -\hat{\underline{x}}_e.\end{aligned} \tag{122}$$

Consequently, it is often advantageous to use a mapping of the sign and shape indices providing a relatively lower probability of transmission errors causing the decoder to decode a final codevector in the complete opposite direction. This is achieved by transmitting a joint index, $I_e$, of the sign and shape given by $$I_e = \begin{cases} I_{e,shape} & I_{e,sign} = 1 \\ N+1-I_{e,shape} & I_{e,sign} = 2 \end{cases}. \quad (123)$$

With this mapping it will take all bits representing the joint index, $I_e$, to be in error in order to decode the complete opposite codevector at the decoder. The decoder will apply the inverse mapping given by $$(I_{d,sign}, I_{d,shape}) = \begin{cases} I_{d,sign} = 1; \; I_{d,shape} = I_d, & I_d \le N/2 \\ I_{d,sign} = 2; \; I_{d,shape} = N+1-I_d, & I_d > N/2 \end{cases} \quad (124)$$

to the received joint index, $I_d$, in order to derive the sign index, $I_{d,sign}$, and shape index, $I_{d,shape}$.

5. Example Narrowband LSF System

A second embodiment of the invention to the LSF VQ is described in detail in the context of a narrowband LPC system.

a. Encoder LSF Quantizer

FIG. 19 is a block diagram of an example LSF quantizer 1900 at an encoder. Quantizer 1900 utilizes both a search using an illegal space and a search of a signed codebook. Quantizer 1900 is similar to quantizer 1500 discussed above in connection with FIG. 15. Quantizer 1500 is a mean-removed, predictive VQ with a two-stage quantization of the residual vector. However, the second stage sub-quantization (represented at 1912) is a signed VQ of the full dimensional residual vector as opposed to the quantizer 1500 that employs a split VQ. Consequently, quantizer 1900 has only two sub-quantizers 1506 and 1912. With reference to FIG. 19, the LSF VQ (quantizer 1900) receives an $8^{th}$ dimensional input LSF vector, $$\underline{\omega}=[\omega(1), \omega(2), \ldots, \omega(8)], \quad (125)$$

and the quantizer produces the quantized LSF vector $$\underline{\hat{\omega}}_e=[\hat{\omega}_e(1), \hat{\omega}_e(2), \ldots, \hat{\omega}_e(8)], \quad (126)$$

and the two indices, $I_{e,1}$ and $I_{e,2}$, of the two sub-quantizers, $Q_1[\bullet]$ and $Q_2[\bullet]$, respectively. The sizes of the two sub-quantizers are $N_1$=128 and $N_2$=128 (64 shape vectors and 2 signs) and require a total of 14 bits. The respective codebooks are denoted $C_1$ and $C_2$, where the second stage sign and shape codebooks making up $C_2$ are denoted $C_{sign}$ and $C_{shape}$, respectively.

The residual vector, $\underline{r}$, after mean-removal and $8^{th}$ order MA prediction, is obtained according to Eq. 68 through Eq. 71 and is quantized as $$\hat{\underline{r}}_e=Q[\underline{r}]. \quad (127)$$

The quantization of the residual vector is performed in two stages.

Equivalently to quantizer 1500, the first stage sub-quantization is performed by quantizer 1506 according to $$\begin{aligned} \underline{c}_{I_{e,1}} &= Q_1[\underline{r}] \\ &= \arg\min_{\underline{c}_{n_1} \in C_1} \{ d_{MSE}(\underline{r}, \underline{c}_{n_1}) \}, \end{aligned} \quad (128)$$

and the residual after the first stage quantization is given by $$\begin{aligned} \underline{r}_1 &= \underline{r} - \underline{c}_{I_{e,1}} \\ &= \underline{\omega} - \underline{\overline{\omega}} - \underline{\tilde{e}}_e - \underline{c}_{I_{e,1}}. \end{aligned} \quad (129)$$

The first stage residual vector is quantized by quantizer 1912 according to $$\underline{c}_{I_{e2}}=Q_2[\underline{r}_1], \quad (130)$$

and, the final composite codevector is given by $$\begin{aligned} \underline{\hat{\omega}}_e &= \underline{c}_{\{I_{c,1}, I_{c,2}\}} \\ &= \underline{\overline{\omega}} + \underline{\tilde{e}}_e + \underline{c}_{I_{e,1}} + \underline{c}_{I_{e,2}}. \end{aligned} \quad (131)$$

The sub-quantization, $Q_2[\bullet]$, of the first stage residual vector, $\underline{r}_1$, is subject to an illegal space in order to enable detection of transmission errors at the decoder. The illegal space is defined in the domain of the LSF parameters as $$\Omega_{1ll}=\{\underline{\omega}|\omega(1)<0 \vee \omega(2)-\omega(1)<0 \vee \omega(3)-\omega(2)<0\} \quad (132)$$

affecting only a sub-vector of the final composite candidate codevectors. The elements subject to the illegal space are $$\begin{aligned} c_{n,2}(k) &= \overline{\omega}(k) + \tilde{e}_e(k) + c_{I_{e,1}}(k) + c_{n_2}(k) \\ &= z(k) + c_{n_2}(k), \end{aligned} \quad (133)$$

k=1, 2, 3, where $$z(k)=\overline{\omega}(k)+\tilde{e}_e(k)+c_{I_{e1}}(k). \quad (134)$$

The illegal space defined by Eq. 132 comprises all LSF vectors for which any of the three lower pairs are out-of-order. According to Eq. 56 the second stage quantization, $Q_2[\bullet]$, is expressed as $$\begin{aligned} \underline{c}_{I_{e,2}} &= Q_2[\underline{r}_1] \\ &= \arg\min_{\underline{c}_{n_2} \in \{\underline{c} | \underline{c} \in C_2, (\underline{z}+\underline{c}) \notin \Omega_{ill}\}} \{ d_{WMSE}(\underline{r}_1, \underline{c}_{n_2}) \}, \end{aligned} \quad (135)$$

With the notation of a signed VQ introduced in Eq. 97 through Eq. 101 this is expressed as $$\underline{c}_{I_{e2}}=s_{opt}\cdot\underline{c}_{n_{opt}}, \quad (136)$$

where $$(s_{opt}, \underline{c}_{n_{opt}}) = \arg\min_{(s, \underline{c}_n) \in \{(i, \underline{c}) | \underline{c} \in C_{shape}, i \in C_{sign}, (\underline{z}+i\underline{c}) \notin C_{ill}\}} \{ d_{WMSE}(\underline{r}_1, s \cdot \underline{c}_n) \}. \quad (137)$$

For a signed VQ it is sufficient to check the codevector of a given shape vector corresponding to only one of the signs, see Eq. 114 and Eq. 115. This will provide a result mathematically identical to performing the exhaustive search of all combinations of signs and shapes. However, as previously described, with the enforcement of an illegal space this is not necessarily the case. Nevertheless, checking only the codevector of the sign according to the cross-correlation term as indicated by Eq. 115 was found to provide satisfactory performance for this particular embodiment and saves significant computational complexity. Consequently, the second stage quantization, $Q_2[\bullet]$, is simplified according to Eq. 121 and is given by $$\underline{c}_{I_{e2}}=s_{opt}\cdot\underline{c}_{n_{opt}}, \tag{138}$$

where, $$\left(s_{opt},\underline{c}_{n_{opt}}\right)=\underset{(s,\underline{c}_n)\in\left\{(i,\underline{c})\middle|\underline{c}\in C_{shape},i=sgn(R_w(\underline{c},\underline{r}_1)),(\underline{z}+i\underline{c})\notin C_{ill}\right\}}{\arg\min}\{E_w(\underline{c}_n)-s\cdot R_w(\underline{c}_n,\underline{r}_1)\}. \tag{139}$$

During the search, according to the sign of the cross-correlation term, $R_w(\underline{c}_n,\underline{r}_1)$ either the composite candidate codevector corresponding to the sub-codevector of the positive sign, i.e $\underline{c}_{n,2}=(\underline{z}+\underline{c}_n)$, or the composite candidate codevector corresponding to the sub-codevector of the negative sign, $\underline{c}_{n,2}=(\underline{z}-\underline{c}_n)$, must be verified to not belong to the illegal space. The logical expression to verify that the composite candidate codevector corresponding to the candidate sub-codevector, $\underline{c}_{n_2}=s\cdot\underline{c}_n$, is legal, is given by $$\begin{aligned}
b &= \underline{c}_{n,2}\notin\Omega_{ill} \\
&= c_{n,2}(1)\geq 0\wedge c_{n,2}(2)-c_{n,2}(1)\geq 0\wedge c_{n,2}(3)-c_{n,2}(2)\geq 0 \\
&= (z(1)+c_{n_2}(1))\geq 0\wedge(z(2)+c_{n_2}(2))-(z(1)+c_{n_2}(1))\geq 0\wedge(z(3)+c_{n_2}(3))-(z(2)+c_{n_2}(2))\geq 0 \\
&= \begin{cases}(z(1)+c_n(1))\geq 0\wedge(z(2)+c_n(2))-(z(1)+c_n(1))\geq 0\wedge(z(3)+c_n(3))-(z(2)+c_n(2))\geq 0 & R_w(\underline{c}_n,\underline{r}_1)>0\\(z(1)-c_n(1))\geq 0\wedge(z(2)-c_n(2))-(z(1)-c_n(1))\geq 0\wedge(z(3)-c_n(3))-(z(2)-c_n(2))\geq 0 & \text{otherwise}\end{cases}
\end{aligned} \tag{140}$$

The mapping of Eq. 123 is applied to generate the joint index, $I_{e,2}$, of the sign and shape indices, $I_{e,2,sign}$ and $I_{e,2,shape}$, of the second stage signed VQ. The memory of the MA predictor is updated with $$\begin{aligned}\hat{\underline{r}}_e &= \underline{c}_{I_{e,1}}+\underline{c}_{I_{e,2}}\\ &= \underline{c}_{I_{e,1}}+s_{I_{e,2,sign}}\cdot\underline{c}_{I_{e,2,shape}},\end{aligned} \tag{141}$$

and a regular ordering and spacing procedure is applied to the final composite codevector, $\hat{\underline{\omega}}_e$, given by Eq. 131 in order to properly order, in particular the upper part, and space the LSF parameters.

The two indices $I_{e,1}$ and $I_{e,2}$ of the two sub-quantizers, $Q_1[\bullet]$ and $Q_2[\bullet]$ are transmitted to the decoder providing the two indices $I_{d,1}$ and $I_{d,2}$ at the decoder:

$$\{I_{d,3},I_{d,2}\}=T[\{I_{e,1},I_{e,3}\}]. \tag{142}$$

b. Decoder Inverse LSF Quantizer

FIG. 20 is a block diagram of an example inverse LSF quantizer 2000, $Q^{-1}[\bullet]$, at a decoder. The composite codevector at the decoder is generated as $$\begin{aligned}\hat{\underline{\omega}}_d &= \underline{c}_{\{I_{d,1},I_{d,2},I_{d,2}\}}\\ &= \overline{\underline{\omega}}+\tilde{\underline{e}}_d+\underline{c}_{I_{d,1}}+\underline{c}_{I_{d,2}}\end{aligned} \tag{143}$$

-continued $$= \overline{\underline{\omega}}+\tilde{\underline{e}}_d+\underline{c}_{I_{d,1}}+s_{I_{d,2,sign}}\cdot\underline{c}_{I_{d,2,shape}},$$

where the second stage sign and shape indices, $I_{d,2,sign}$ and $I_{d,2,shape}$, are decoded by inverse sub-quantizer 2004 from the received second stage index, $I_{d,2}$ according to Eq. 124. Furthermore, the MA prediction at the decoder, $\tilde{\underline{e}}_d$, is given by Eq. 92. The composite codevector, $\hat{\underline{\omega}}_d$, is subject to verification by legal tester 1630 according to $$\begin{aligned}b &= \hat{\underline{\omega}}_d\notin\Omega_{ill}\\ &= \hat{\omega}_d(1)\geq 0\wedge\hat{\omega}_d(2)-\hat{\omega}_d(1)\geq 0\wedge\hat{\omega}_d(3)-\hat{\omega}_d(2)\geq 0\end{aligned} \tag{144}$$

which is the decoder equivalence of Eq. 140. If the composite codevector is not a member of the illegal space, i.e. b=true, the composite codevector is accepted, the memory of the MA predictor 1624 is updated with $$\hat{\underline{r}}_d=\underline{c}_{I_{di}}+s_{I_{d2,sign}}\cdot\underline{c}_{I_{d,2\ shape}}, \tag{145}$$

and the ordering and spacing procedure of the encoder is applied. Else, if the composite codevector is a member of the illegal space, i.e. b=false, a transmission error is declared, and the composite codevector is replaced (by concealment module 1628) with the previous composite codevector, $\hat{\underline{\omega}}_{d,prev}$, i.e.

$$\hat{\underline{\omega}}_d=\hat{\underline{\omega}}_{d,prev}. \tag{146}$$

Furthermore, the memory of the MA predictor 1624 is updated with $$\hat{\underline{r}}_d=\hat{\underline{\omega}}_{d,prev}-\overline{\underline{\omega}}-\tilde{\underline{e}}_d \tag{147}$$

as opposed to Eq. 145.

Inverse sub-quantizer 2004, illegal tester 1630 and the illegal space definition(s) associated with the tester, collectively form an inverse sub-quantizer with illegal space of inverse quantizer 2000. This inverse sub-quantizer with illegal space corresponds to sub-quantizer with illegal space 1912 of quantizer 1900.

6. Hardware and Software Implementations

Figure 21:
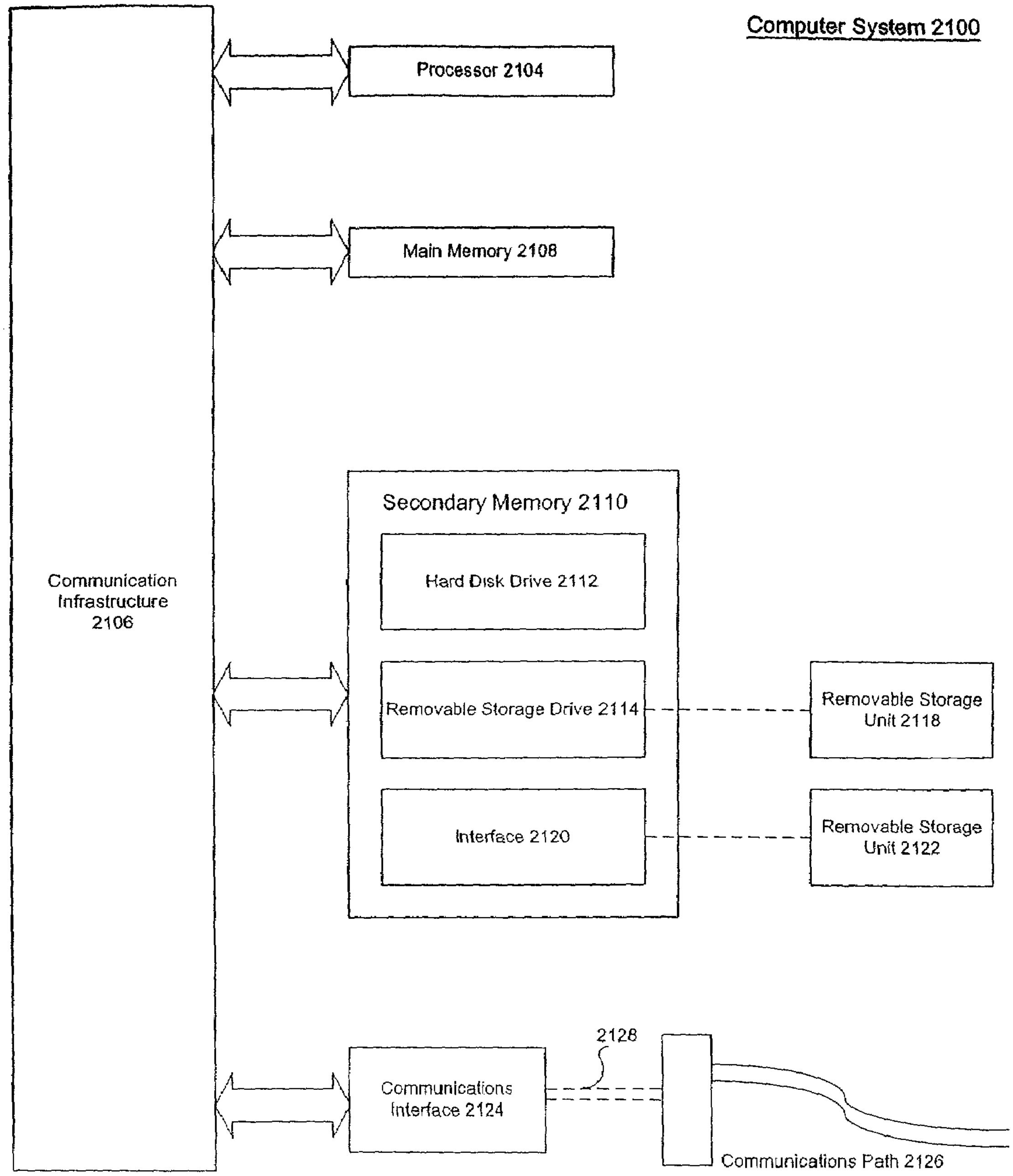
FIG. 21 is a block diagram of a computer system on which the present invention can operate.

The following description of a general purpose computer system is provided for completeness. The present invention can be implemented in hardware, or as a combination of software and hardware. Consequently, the invention may be implemented in the environment of a computer system or other processing system. An example of such a computer system 2100 is shown in FIG. 21. In the present invention, all of the signal processing blocks depicted in FIGS. 1-5B, 15-16, and 19-20, for example, can execute on one or more distinct computer systems 2100, to implement the various methods of the present invention. The computer system 2100 includes one or more processors, such as processor 2104. Processor 2104 can be a special purpose or a general purpose digital signal processor. The processor 2104 is connected to a communication infrastructure 2106 (for example, a bus or network). Various software implementations are described in terms of this exemplary computer system. After reading this description, it will become apparent to a person skilled in the relevant art how to implement the invention using other computer systems and/or computer architectures.

Computer system 2100 also includes a main memory 2108, preferably random access memory (RAM), and may also include a secondary memory 2110. The secondary memory 2110 may include, for example, a hard disk drive 2112 and/or a removable storage drive 2114, representing a floppy disk drive, a magnetic tape drive, an optical disk drive, etc. The removable storage drive 2114 reads from and/or writes to a removable storage unit 2118 in a well known manner. Removable storage unit 2118, represents a floppy disk, magnetic tape, optical disk, etc. which is read by and written to by removable storage drive 2114. As will be appreciated, the removable storage unit 2118 includes a computer usable storage medium having stored therein computer software and/or data.

In alternative implementations, secondary memory 2110 may include other similar means for allowing computer programs or other instructions to be loaded into computer system 2100. Such means may include, for example, a removable storage unit 2122 and an interface 2120. Examples of such means may include a program cartridge and cartridge interface (such as that found in video game devices), a removable memory chip (such as an EPROM, or PROM) and associated socket, and other removable storage units 2122 and interfaces 2120 which allow software and data to be transferred from the removable storage unit 2122 to computer system 2100.

Computer system 2100 may also include a communications interface 2124. Communications interface 2124 allows software and data to be transferred between computer system 2100 and external devices. Examples of communications interface 2124 may include a modem, a network interface (such as an Ethernet card), a communications port, a PCM-CIA slot and card, etc. Software and data transferred via communications interface 2124 are in the form of signals 2128 which may be electronic, electromagnetic, optical or other signals capable of being received by communications interface 2124. These signals 2128 are provided to communications interface 2124 via a communications path 2126. Communications path 2126 carries signals 2128 and may be implemented using wire or cable, fiber optics, a phone line, a cellular phone link, an RF link and other communications channels. Examples of signals that may be transferred over interface 2124 include: signals and/or parameters to be coded and/or decoded such as speech and/or audio signals; signals to be quantized and/or inverse quantized, such as speech and/or audio signals, LPC parameters, pitch prediction parameters, and quantized versions of the signals/parameters and indices identifying same; any signals/parameters resulting from the encoding, decoding, quantization, and inverse quantization processes described herein.

In this document, the terms "computer program medium" and "computer usable medium" are used to generally refer to media such as removable storage drive 2114, a hard disk installed in hard disk drive 2112, and signals 2128. These computer program products are means for providing software to computer system 2100.

Computer programs (also called computer control logic) are stored in main memory 2108 and/or secondary memory 2110. Also, quantizer (and sub-quantizer) and inverse quantizer (and inverse sub-quantizer) codebooks, codevectors, sub-codevectors, and illegal space definitions used in the present invention may all be stored in the above-mentioned memories. Computer programs may also be received via communications interface 2124. Such computer programs, when executed, enable the computer system 2100 to implement the present invention as discussed herein. In particular, the computer programs, when executed, enable the processor 2104 to implement the processes of the present invention, such as the methods implemented using either quantizer or inverse quantizer structures, such as the methods illustrated in FIGS. 6A-14, and 17A-18D, for example. Accordingly, such computer programs represent controllers of the computer system 2100. By way of example, in the embodiments of the invention, the processes/methods performed by signal processing blocks of quantizers and/or inverse quantizers can be performed by computer control logic. Where the invention is implemented using software, the software may be stored in a computer program product and loaded into computer system 2100 using removable storage drive 2114, hard drive 2112 or communications interface 2124.

In another embodiment, features of the invention are implemented primarily in hardware using, for example, hardware components such as Application Specific Integrated Circuits (ASICs) and gate arrays. Implementation of a hardware state machine so as to perform the functions described herein will also be apparent to persons skilled in the relevant art(s).

7. Conclusion

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Also, the order of method steps may be rearranged. Any such alternate boundaries are thus within the scope and spirit of the claimed invention. One skilled in the art will recognize that these functional building blocks can be implemented by discrete components, application specific integrated circuits, processors executing appropriate software and the like or any combination thereof. Thus, the breadth and scope of the present invention should not be limited by any of the above-described exemplary embodiments, but should be defined only in accordance with the following claims and their equivalents.

What is claimed is:

1. A method of quantizing a vector representative of a portion of a speech or audio signal in an encoder, comprising:

(a) determining legal candidate codevectors among a set of candidate codevectors based upon one or more illegal space definitions, the candidate codevectors including line spectral frequencies (LSFs), wherein the one or more illegal space definitions define invalid spacing characteristics of LSFs;

(b) determining a best legal candidate codevector among the legal candidate codevectors, whereby the best legal candidate codevector corresponds to a quantization of the vector; and (c) transmitting to a decoder a signal representative of the portion of the speech or audio signal based on the best legal candidate codevector.

2. The method of claim 1, wherein step (c) comprises:

transmitting to the decoder at least one of:

the best legal candidate codevector, and an index identifying the best legal candidate codevector.

3. The method of claim 1, wherein step (a) comprises:

(a)(i) determining whether each candidate codevector among the set of candidate codevectors corresponds to an illegal space that represents illegal vectors, wherein the illegal space is defined by the one or more illegal space definitions; and (a)(ii) declaring as a legal candidate codevector each candidate codevector that does not correspond to the illegal space.

4. The method of claim 3, wherein:

step (a)(i) comprises determining whether each candidate codevector among the set of candidate codevectors belongs to the illegal space; and step (a)(ii) comprises declaring as a legal candidate codevector each candidate codevector that does not belong to the illegal space.

5. The method of claim 4, wherein:

the illegal space is represented as an illegal vector criterion; and step (a)(i) includes determining whether each candidate codevector satisfies the illegal vector criterion.

6. The method of claim 3, wherein:

step (a)(i) comprises determining whether each candidate codevector among the set of candidate codevectors corresponds to a vector that belongs to the illegal space; and step (a)(ii) comprises declaring as a legal candidate codevector each candidate codevector that corresponds to a vector that does not belong to the illegal space.

7. The method of claim 3, wherein:

the vector is a line spectral frequency (LSF) vector including line spectral frequencies (LSFs);

the illegal space represents illegal LSF vectors; and each candidate codevector is an LSF vector.

8. The method of claim 1, further comprising, prior to step (b):

deriving a separate error term corresponding to each legal candidate codevector, each error term being a function of the vector and the corresponding legal candidate codevector, wherein step (b) comprises determining the best legal candidate codevector among the legal candidate codevectors based on the error terms.

9. A method of quantizing a vector representative of a portion of a speech or audio signal in an encoder, comprising:

(a) determining legal candidate codevectors among a set of candidate codevectors based upon one or more illegal space definitions, the candidate codevectors including line spectral frequencies (LSFs), wherein the one or more illegal space definitions define invalid spacing characteristics of LSFs;

(b) deriving a separate error term corresponding to each legal candidate codevector, each error term being a function of the vector and the corresponding legal candidate codevector;

(c) determining a best legal candidate codevector among the legal candidate codevectors based on the error terms, whereby the best legal candidate codevector corresponds to a quantization of the vector; and (d) transmitting to a decoder a signal representative of the portion of the speech or audio signal based on the best legal candidate codevector.

10. The method of claim 9, wherein step (d) comprises:

transmitting to the decoder at least one of the best legal candidate codevector, and an index identifying the best legal candidate codevector.

11. The method of claim 9, wherein step (a) comprises:

(a)(i) determining whether each candidate codevector among the set of candidate codevectors belongs to an illegal space representing illegal vectors, wherein the illegal space is defined by the one or more illegal space definitions; and (a)(ii) declaring as a legal candidate codevector each candidate codevector that does not belong to the illegal space.

12. The method of claim 11, wherein:

the illegal space is represented as an illegal vector criterion; and step (a)(i) includes determining whether each candidate codevector satisfies the illegal vector criterion.

13. The method of claim 11, wherein:

the illegal space is represented as an illegal vector criterion corresponding to only a portion of a codevector; and step (a)(i) includes determining whether only a portion of each candidate codevector satisfies the illegal vector criterion.

14. The method of claim 9, wherein each candidate codevector is a composite codevector including a first component vector and a second component vector.

15. The method of claim 9, wherein each candidate codevector is a composite codevector that is a function of at least one codebook vector.

16. The method of claim 9, wherein each candidate codevector is a sub-codevector of a composite codevector.

17. The method of claim 9, wherein step (a) further comprises determining that no legal candidate codevector exists among the set of candidate codevectors, the method further comprising, when no legal candidate codevector exists:

transmitting to the decoder at least one of a default codevector, and an index identifying the default codevector.

18. The method of claim 9, wherein step (a) further comprises determining that no legal candidate codevector exists among the set of candidate codevectors, the method further comprising, when no legal candidate codevector exists:

determining a best one of the candidate codevectors that is not a legal candidate codevector based on the error terms; and thereafter transmitting to the decoder at least one of the best one of the candidate codevectors that is not legal, and an index identifying the best one of the candidate codevectors that is not legal.

19. The method of claim 9, wherein:

the vector is an input line spectral frequency (LSF) vector including line spectral frequencies (LSFs); and each candidate codevector is an LSF vector.

20. The method of claim 9, wherein step (a) comprises:

determining whether each candidate codevector belongs to an illegal space representing illegal candidate codevectors, wherein the illegal space is defined by the one ore more illegal space definitions; and declaring as a legal candidate codevector each candidate codevector that does not belong to the illegal space.

21. The method of claim 20, wherein the illegal space is represented as an illegal criterion for LSF vectors, and the illegal criterion includes first and second successive LSFs in a pair of LSFs being out-of-order.

22. The method of claim 20, wherein the illegal space is represented as an illegal criterion for LSF vectors, and the illegal criterion for LSF vectors includes first and second successive LSFs in a pair of LSFs being closer to each other than a minimum separation distance.

23. A method of quantizing a vector representative of a portion of a speech or audio signal in an encoder, comprising:

(a) determining an error term corresponding to a candidate codevector of a set of candidate codevectors, the error term being a function of the candidate codevector and the vector;

(b) determining whether the candidate codevector is legal based upon one or more illegal space definitions, when the error term is better than a current best error term;

(c) updating the current best error term with the error term, when the error term is better than the current best error term and the codevector is legal;

(d) repeating steps (a), (b) and (c) for all of the candidate codevectors, thereby establishing a best legal candidate codevector corresponding to the best current error term, whereby the best legal candidate codevector corresponds to a quantization of the vector; and (e) transmitting to a decoder a signal representative of the portion of the speech or audio signal based on the best legal candidate codevector.

24. The method of claim 23, wherein step (e) further comprises:

transmitting to the decoder at least one of the best legal candidate codevector corresponding to the best current error term, and an index identifying the best legal candidate codevector.

25. The method of claim 23, wherein step (b) comprises:

(b)(i) determining whether the candidate codevector belongs to an illegal space representing illegal vectors; and (b)(ii) declaring the candidate codevector legal when the candidate codevector does not belong to the illegal space.

26. The method of claim 25, wherein:

the illegal space is represented as an illegal vector criterion; and step (b)(i) includes determining whether the candidate codevector satisfies the illegal vector criterion.

27. The method of claim 25, wherein:

the illegal space is represented as an illegal vector criterion corresponding to only a portion of a codevector; and step (b)(i) includes determining whether only a portion of the candidate codevector satisfies the illegal vector criterion.

28. The method of claim 23, wherein each candidate codevector is a composite codevector including a first component vector and a second component vector.

29. The method of claim 23, wherein each candidate codevector is a composite codevector that is a function of at least one codebook vector.

30. The method of claim 23, wherein each candidate codevector is a sub-codevector of a composite codevector.

31. The method of claim 23, further comprising: determining that no legal candidate codevector exists among the set of candidate codevectors; and thereafter transmitting to the decoder at least one of a default codevector, and an index identifying the default codevector.

32. The method of claim 23, further comprising:

determining that no legal candidate codevector exists among the set of candidate codevectors; thereafter determining a best one of the candidate codevectors that are not legal based on the error terms; and thereafter transmitting to the decoder at least one of the best one of the candidate codevectors that are not legal, and an index identifying the best one of the candidate codevectors that are not legal.

33. The method of claim 23, wherein the vector is an input line spectral frequency (LSF) vector including line spectral frequencies (LSFs), and each candidate codevector is an LSF vector including LSFs.

34. The method of claim 33, wherein the illegal space is represented as an illegal criterion for LSF vectors, and the illegal criterion includes first and second successive LSFs in a pair of LSFs being out-of-order.

35. The method of claim 33, wherein the illegal space is represented as an illegal criterion for LSF vectors, and the illegal criterion for LSF vectors includes first and second successive LSFs in a pair of LSFs being closer to each other than a minimum separation distance.

36. The method of claim 23, wherein step (b) comprises:

determining whether the LSF vector belongs to an illegal space representing illegal LSF vectors; and declaring the LSF vector legal when the LSF vector does not belong to the illegal space.

37. A method of inverse quantizing a vector representative of a portion of a speech or audio signal in a decoder, the vector being quantized in an encoder according to the steps of:

determining, among a set of candidate codevectors that include line spectral frequencies (LSFs), a best candidate codevector not belonging to an illegal space representative of illegal vectors, wherein the illegal space is defined by invalid spacing characteristics of LSFs, and transmitting to the decoder a quantizer index identifying the best legal candidate codevector, where the best legal candidate codevector corresponds to a quantization of the vector, the method of inverse quantizing comprising:

(a) producing a reconstructed codevector based on a received quantizer index;

(b) determining whether the reconstructed codevector does not belong to the illegal space; and (c) outputting a reconstructed portion of the speech or audio signal based on the reconstructed codevector when the reconstructed codevector does not belong to the illegal space.

38. The method of claim 37, further comprising:

(d) declaring a transmission error when the reconstructed codevector belongs to the illegal space.

39. The method of claim 38, further comprising:

(e) performing an error concealment technique responsive to the transmission error.

40. The method of claim 39, wherein step (e) includes:

deriving an alternative reconstructed codevector; and outputting the alternative reconstructed codevector.

41. The method of claim 37, wherein the reconstructed codevector is a composite codevector that is a function of at least one codebook vector.

42. The method of claim 41, wherein the illegal space is in a transformed domain of at least one codebook vector.

43. The method of claim 37, wherein:

step (b) comprises determining whether at least a portion of the reconstructed codevector does not belong to the illegal space; and step (c) comprises outputting a reconstructed portion of the speech or audio signal based on the reconstructed codevector when at least a portion thereof does not belong to the illegal space.

44. The method of claim 37, wherein:

the vector is a line spectral frequency (LSF) vector including line spectral frequencies (LSFs);

the illegal space represents illegal LSF vectors;

each candidate codevector is an LSF vector; and the reconstructed codevector is a reconstructed LSF vector including LSFs.

45. A computer program product (CPP) comprising a computer usable medium having computer readable program code (CRPC) means embodied in the medium for causing an application program to execute on a computer processor to perform quantization of a vector representative of a portion of a speech or audio signal, the CRPC means comprising:

first CRPC means for causing the processor to determine legal candidate codevectors among a set of candidate codevectors based upon one or more illegal space definitions, the candidate codevectors including line spectral frequencies (LSFs), wherein the one or more illegal space definitions define invalid spacing characteristics of LSFs;

second CRPC means for causing the processor to determine a best legal candidate codevector among the legal candidate codevectors, whereby the best legal candidate codevector corresponds to a quantization of the vector; and third CRPC means for causing the processor to transmit to a decoder a signal representative of the portion of the speech or audio signal based on the best legal candidate codevector.

46. The CPP of claim 45, wherein the third CRPC means comprises means for causing the processor to transmit to the decoder at least one of the best legal candidate codevector, and an index identifying the best legal candidate codevector.

47. The CPP of claim 45, wherein the first CRPC means comprises:

fourth CRPC means for causing the processor to determine whether each candidate codevector among the set of candidate codevectors corresponds to an illegal space that represents illegal vectors, wherein the illegal space is defined by the one or more illegal space definitions; and fifth CRPC means for causing the processor to declare as a legal candidate codevector each candidate codevector that does not correspond to the illegal space.

48. The CPP of claim 47, wherein:

the fourth CRPC means includes CRPC means for causing the processor to determine whether each candidate codevector among the set of candidate codevectors belongs to the illegal space; and the fifth CRPC means includes CRPC means for causing the processor to declare as a legal candidate codevector each candidate codevector that does not belong to the illegal space.

49. The CPP of claim 48, wherein:

the illegal space is represented as an illegal vector criterion; and the fourth CRPC means includes CRPC means for causing the processor to determine whether each candidate codevector satisfies the illegal vector criterion.

50. The CPP of claim 47, wherein:

the fourth CRPC means includes CRPC means for causing the processor to determine whether each candidate codevector among the set of candidate codevectors corresponds to a vector that belongs to the illegal space; and the fifth CRPC means includes CRPC means for causing the processor to declare as a legal candidate codevector each candidate codevector that corresponds to a vector that does not belong to the illegal space.

51. The CPP of claim 47, wherein:

the vector is a line spectral frequency (LSF) vector including line spectral frequencies (LSFs);

the illegal space represents illegal LSF vectors; and each candidate codevector is an LSF vector.

52. The CPP of claim 45, further comprising:

fourth CRPC means for causing the processor to derive a separate error term corresponding to each legal candidate codevector, each error term being a function of the vector and the corresponding legal candidate codevector, wherein the second CRPC means includes CRPC means for causing the processor to determine the best legal candidate codevector among the legal candidate codevectors based on the error terms.

53. A computer program product (CPP) comprising a computer usable medium having computer readable program code (CRPC) means embodied in the medium for causing an application program to execute on a computer processor to perform quantization of a vector representative of a portion of a speech or audio signal, the CRPC means comprising:

first CRPC means for causing the processor to determine legal candidate codevectors among a set of candidate codevectors based upon one or more illegal space definitions, the candidate codevectors including line spectral frequencies (LSFs), wherein the one or more illegal space definitions define invalid spacing characteristics of LSFs;

second CRPC means for causing the processor to derive a separate error term corresponding to each legal candidate codevector, each error term being a function of the vector and the corresponding legal candidate codevector;

third CRPC means for causing the processor to determine a best legal candidate codevector among the legal candidate codevectors based on the error terms, whereby the best legal candidate codevector corresponds to a quantization of the vector; and fourth CRPC means for causing the processor to transmit to a decoder a signal representative of the portion of the speech or audio signal based on the best legal candidate codevector.

54. The CPP of claim 53, wherein the fourth CRPC means comprise means for causing the processor to transmit to the decoder at least one of the best legal candidate codevector, and an index identifying the best legal candidate codevector.

55. The CPP of claim 53, wherein the first CRPC means comprises:

fifth CRPC means for causing the processor to determine whether each candidate codevector among the set of candidate codevectors belongs to an illegal space representing illegal vectors, wherein the illegal space is defined by the one or more illegal space definitions; and sixth CRPC means for causing the processor to declare as a legal candidate codevector each candidate codevector that does not belong to the illegal space.

56. The CPP of claim 55, wherein:

the illegal space is represented as an illegal vector criterion; and the fifth CRPC means includes CRPC means for causing the processor to determine whether each candidate codevector satisfies the illegal vector criterion.

57. The CPP of claim 55, wherein:

the illegal space is represented as an illegal vector criterion corresponding to only a portion of a codevector; and the fifth CRPC means includes CRPC means for causing the processor to determine whether only a portion of each candidate codevector satisfies the illegal vector criterion.

58. The CPP of claim 53, wherein each candidate codevector is a composite codevector including a first component vector and a second component vector.

59. The CPP of claim 53, wherein each candidate codevector is a composite codevector that is a function of at least one codebook vector.

60. The CPP of claim 53, wherein each candidate codevector is a sub-codevector of a composite codevector.

61. The CPP of claim 53, wherein the first CRPC means includes CRPC means for causing the processor to determine that no legal candidate codevector exists among the set of candidate codevectors, the CRPC means further comprising:

fifth CRPC means for causing the processor to transmit to the decoder at least one of a default codevector, and an index identifying the default codevector, when no legal candidate codevector exists.

62. The CPP of claim 53, wherein the first CRPC means includes CRPC means for causing the processor to determine that no legal candidate codevector exists among the set of candidate codevectors, the CPP means further comprising:

fifth CRPC means for causing the processor to determine a best one of the candidate codevectors that is not a legal candidate codevector based on the error terms, when no legal candidate codevector exists; and sixth CRPC means for causing the processor to transmit to the decoder at least one of the best one of the candidate codevectors that is not legal, and an index identifying the best one of the candidate codevectors that is not legal.

63. The CPP of claim 53, wherein:

the vector is an input line spectral frequency (LSF) vector including line spectral frequencies (LSFs); and each candidate codevector is an LSF vector.

64. The CPP of claim 53, wherein the first CRPC means comprises:

fifth CRPC means for causing the processor to determine whether each candidate codevector belongs to an illegal space representing illegal candidate codevectors, wherein the illegal space is defined by the illegal space definitions; and sixth CRPC means for causing the processor to declare as a legal candidate codevector each candidate codevector that does not belong to the illegal space.

65. The CPP of claim 64, wherein the illegal space is represented as an illegal criterion for LSF vectors, and the illegal criterion includes first and second successive LSFs in a pair of LSFs being out-of-order.

66. The CPP of claim 64, wherein the illegal space is represented as an illegal criterion for LSF vectors, and the illegal criterion for LSF vectors includes first and second successive LSFs in a pair of LSFs being closer to each other than a minimum separation distance.

67. A computer program product (CPP) comprising a computer usable medium having computer readable program code (CRPC) means embodied in the medium for causing an application program to execute on a computer processor to perform quantization of a vector representative of a portion of a speech or audio signal, the CRPC means comprising:

first CRPC means for causing the processor to determine an error term corresponding to a candidate codevector of a set of candidate codevectors, the error term being a function of the candidate codevector and the vector;

second CRPC means for causing the processor to determine whether the candidate codevector is legal based upon one or more illegal space definitions, when the error term is better than a current best error term;

third CRPC means for causing the processor to update the current best error term with the error term, when the error term is better than the current best error term and the codevector is legal, wherein the first, second and third CRPC means repeat their respective functions for all of the candidate codevectors, thereby establishing a best legal candidate codevector corresponding to the best current error term, whereby the best legal candidate codevector corresponds to a quantization of the vector; and fourth CRPC means for causing the processor to transmit to a decoder a signal representative of the speech or audio signal based on the best legal candidate codevector.

68. The CPP of claim 67, wherein the-fourth CRPC means comprises means for causing the processor to transmit to the decoder at least one of the best legal candidate codevector corresponding to the best current error term, and an index identifying the best legal candidate codevector.

69. The CPP of claim 67, wherein the second CRPC means comprises:

fifth CRPC means for causing the processor to determine whether the candidate codevector belongs to an illegal space representing illegal vectors; and sixth CRPC means for causing the processor to declare the candidate codevector legal when the candidate codevector does not belong to the illegal space.

70. The CPP of claim 69, wherein:

the illegal space is represented as an illegal vector criterion; and the fifth CRPC means includes means for causing the processor to determine whether the candidate codevector satisfies the illegal vector criterion.

71. The CPP of claim 69, wherein:

the illegal space is represented as an illegal vector criterion corresponding to only a portion of a codevector; and the fifth CRPC means includes means for causing the processor to determine whether only a portion of the candidate codevector satisfies the illegal vector criterion.

72. The CPP of claim 67, wherein each candidate codevector is a composite codevector including a first component vector and a second component vector.

73. The CPP of claim 67, wherein each candidate codevector is a composite codevector that is a function of at least one codebook vector.

74. The CPP of claim 67, wherein each candidate codevector is a sub-codevector of a composite codevector.

75. The CPP of claim 67, further comprising: fifth CRPC means for causing the processor to determine that no legal candidate codevector exists among the set of candidate codevectors; and sixth CRPC means for causing the processor to transmit to the decoder at least one of a default codevector, and an index identifying the default codevector.

76. The CPP of claim 67, further comprising: fifth CRPC means for causing the processor to determine that no legal candidate codevector exists among the set of candidate codevectors;

sixth CRPC means for causing the processor to determine a best one of the candidate codevectors that are not legal based on the error terms; and seventh CRPC means for causing the processor to transmit to the decoder at least one of the best one of the candidate codevectors that are not legal, and an index identifying the best one of the candidate codevectors that are not legal.

77. The CPP of claim 67, wherein the vector is an input line spectral frequency (LSF) vector including line spectral frequencies (LSFs), and each candidate codevector is an LSF vector including LSFs.

78. The CPP of claim 77, wherein the second CRPC means comprises:

CRPC means for causing the processor to determine whether the LSF vector belongs to an illegal space representing illegal LSF vectors; and CRPC means for causing the processor to declare the LSF vector legal when the LSF vector does not belong to the illegal space.

79. The CPP of claim 77, wherein the illegal space is represented as an illegal criterion for LSF vectors, and the illegal criterion includes first and second successive LSFs in a pair of LSFs being out-of-order.

80. The CPP of claim 77, wherein the illegal space is represented as an illegal criterion for LSF vectors, and the illegal criterion for LSF vectors includes first and second successive LSFs in a pair of LSFs being closer to each other than a minimum separation distance.

81. A computer program product (CPP) comprising a computer usable medium having computer readable program code (CRPC) means embodied in the medium for causing an application program to execute on a computer processor to perform inverse quantization of a vector representative of a portion of a speech or audio signal, the vector being quantized according to the steps of determining, among a set of candidate codevectors that include line spectral frequencies (LSFs), a best candidate codevector not belonging to an illegal space representative of illegal vectors, wherein the illegal space is defined by invalid spacing characteristics of LSF parameters, wherein the best candidate codevector corresponds to a quantization of the vector, and outputting a quantizer index identifying the best legal candidate codevector, the CRPC means comprising:

producing CRPC means for causing the processor to produce a reconstructed codevector based on a received quantizer index;

determining CRPC means for causing the processor to determine whether the reconstructed codevector does not belong to the illegal space; and outputting CRPC means for causing the processor to output a reconstructed portion of the speech or audio signal based on the reconstructed codevector when the reconstructed codevector does not belong to the illegal space.

82. The CPP of claim 81, further comprising:

declaring CRPC means for causing the processor to declare a transmission error when the reconstructed codevector belongs to the illegal space.

83. The CPP of claim 82, further comprising:

performing CRPC means for causing the processor to perform an error concealment technique responsive to the transmission error.

84. The CPP of claim 83, wherein the performing means includes:

CRPC means for causing the processor to derive an alternative reconstructed codevector; and CRPC means for causing the processor to output the alternative reconstructed codevector.

85. The CPP of claim 81, wherein the reconstructed codevector is a composite codevector that is a function of at least one codebook vector.

86. The CPP of claim 85, wherein the illegal space is in a transformed domain of at least one codebook vector.

87. The CPP of claim 81, wherein:

the determining CRPC means comprises CRPC means for causing the processor to determine whether at least a portion of the reconstructed codevector does not belong to the illegal space; and the outputting CRPC means comprises CRPC means for causing the processor to output a reconstructed portion of the speech or audio signal based on the reconstructed codevector when at least a portion thereof does not belong to the illegal space.

88. The CPP of claim 81, wherein:

the vector is a line spectral frequency (LSF) vector including line spectral frequencies (LSFs);

the illegal space represents illegal LSF vectors;

each candidate codevector is an LSF vector; and the reconstructed codevector is a reconstructed LSF vector including LSFs.

89. An encoder for quantizing a vector representative of a portion of a speech or audio signal, comprising:

a codevector generator that generates a set of candidate codevectors that include line spectral frequencies (LSFs);

a memory for storing an illegal space definition representing illegal vectors, wherein the illegal space definition defines invalid spacing characteristics of LSFs;

a legal status tester that determines legal candidate codevectors among the set of candidate codevectors using the illegal space definition;

a codevector selector that determines a best legal candidate codevector among the one or more legal candidate codevectors, whereby the best legal candidate codevector corresponds to a quantization of the vector; and a transmitter that transmits to a decoder a signal representative of the portion of the speech or audio signal based on the best legal candidate codevector.

90. The encoder of claim 89, further comprising:

an error calculator that generates an error term corresponding to each legal candidate codevector, each error term being a function of the vector and the corresponding legal candidate codevector, wherein the codevector selector is configured to determine the best legal candidate codevector based on the error terms.

91. The encoder of claim 89, wherein:

the illegal space definition includes an illegal vector criterion; and the legal status tester determines whether each candidate codevector satisfies the illegal vector criterion.

92. An encoder for quantizing a vector representative of a portion of a speech or audio signal, comprising:

first means for generating a set of candidate codevectors that include line spectral frequencies (LSFs);

second means for storing an illegal space definition representing illegal vectors, wherein the illegal space definition defines invalid spacing characteristics of LSFs;

third means for determining legal candidate codevectors among the set of candidate codevectors using the illegal space definition;

fourth means for determining a best legal candidate codevector among the one or more legal candidate codevectors, whereby the best legal candidate codevector corresponds to a quantization of the vector; and fifth means for transmitting to a decoder a signal representative of the portion of the speech or audio signal based on the best legal candidate codevector.

93. The encoder of claim 92, further comprising:

sixth means for generating an error term corresponding to each legal candidate codevector, each error term being a function of the vector and the corresponding legal candidate codevector, wherein the fourth means includes means for determining the best legal candidate codevector based on the error terms.

* * * * *

UNITED STATES PATENT AND TRADEMARK OFFICE

CERTIFICATE OF CORRECTION

PATENT NO. : 7,617,096 B2
APPLICATION NO. : 10/163378
DATED : November 10, 2009
INVENTOR(S) : Jes Thyssen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1024 days.

Signed and Sealed this

Fourteenth Day of December, 2010

David J. Kappos

*Director of the United States Patent and Trademark Office*

UNITED STATES PATENT AND TRADEMARK OFFICE

CERTIFICATE OF CORRECTION

PATENT NO. : 7,617,096 B2
APPLICATION NO. : 10/163378
DATED : November 10, 2009
INVENTOR(S) : Jes Thyssen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1024 days.

Column 1
Line 15, please replace "10,163,995, to Jes Thyssen" with --10/163,995, to Jes Thyssen--.

Column 1
Lines 18-19, please replace "10,162,344, Jes Thyssen" with --10/162,344, to Jes Thyssen--.

Column 45
Line 56, please replace "$\{I_{d,3},I_{d,2}\}$" with --$\{I_{d,1},I_{d,2}\}$---

Column 50
Line 62, please replace "ore" with --or--.

Signed and Sealed this
Fourth Day of January, 2011

David J. Kappos
*Director of the United States Patent and Trademark Office*